US005613058A

United States Patent [19]
Koppolu et al.

[11] Patent Number: 5,613,058
[45] Date of Patent: Mar. 18, 1997

[54] METHOD AND SYSTEM FOR IN-PLACE INTERACTION WITH CONTAINED OBJECTS

[75] Inventors: Srinivasa R. Koppolu; C. Douglas Hodges, both of Redmond; Barry B. MacKichan, Bainbridge Island, all of Wash.; Richard McDaniel, Pittsburg, Pa.; Rao V. Remala, Woodinville; Antony S. Williams, Redmond, both of Wash.

[73] Assignee: Microsoft Corporation, Redmond, Wash.

[21] Appl. No.: 229,264

[22] Filed: Apr. 15, 1994

Related U.S. Application Data

[63] Continuation-in-part of Ser. No. 984,868, Dec. 1, 1992, abandoned.

[51] Int. Cl.⁶ .............................. G06F 15/00; G06F 1/00
[52] U.S. Cl. ..................... 395/376; 395/340; 395/348; 395/352; 395/601
[58] Field of Search ................................. 395/155–157, 395/159, 160, 161, 600

[56] References Cited

U.S. PATENT DOCUMENTS 5,079,695  1/1992  Dysart et al. ............................ 395/700

FOREIGN PATENT DOCUMENTS 0215203  3/1987  European Pat. Off. .
0304071  2/1989  European Pat. Off. .

OTHER PUBLICATIONS

"IBM Technical Disclosure Bulletin", vol. 27, No. 10B, p. 5998, Mar. 1985.
Gore, Andrew, "Claris and Beagle Bros. shoot for the Works", *MacWEEK 5* (25):1 & 124, 1991.
Marshak, R., "ClarisWorks Is a Strong Tool for the Individual", *Office Computing Report 14* (9):25, 1991.
"FullWrite Professional: A User Guide", Thompson et al., 1988, pp. 1–286.
Object Linking & Embedding, Microsoft Corporation, Redmond, Washington, Nov. 6, 1991.
Andrew J. Palay et al., "The Andrew Toolkit—An Overview", *USENIX Winter Conference,* Dallas, Texas, Feb. 9–12, 1988.
Terrence Crowley et al., "The Diamond Multimedia Editor", *Proceedings of the Summer USENIX Conference,* 1987.
Robert H. Thomas et al., "Diamond: A Multimedia Message System Built on a Distributed Architecture" *Computer,* Dec. 1985, pp. 65–77.
Harry Forsdick et al., "Initial Experience with Multimedia Documents in Diamond", Elsevier Science Publishers B.V. (North Holland), 1984.
James Donahue et al., "Whiteboards: A Graphical Database Tool" *ACM Transactions on Office Information Systems,* vol. 4, Jan. 1986, pp. 24–41.
Lotus Works For Windows 3.0 User's Guide, Spinnaker Software Corporation, pp. 1–5, 3–3, 3–4 and A–2, 1991.
Microsoft® Windows™ Software Development Kit, Guide to Programming Version 3.0, Microsoft Corporation, pp. 21–1 through 21–10, 1990.

*Primary Examiner*—Kee M. Tung
*Assistant Examiner*—Huynh Ba
*Attorney, Agent, or Firm*—Seed and Berry LLP

[57] ABSTRACT

A computer method and system for interacting with a containee object contained within a container object. In a preferred embodiment of the present invention, the container object has a container application with a container window environment that has container resources for interacting with the container object. The containee object has a server application with a server window environment with server resources for interacting with the containee object. The method of the present invention displays the container window environment on a display device. A user then selects the containee object. In response to selecting the containee object, the method integrates a plurality of the server resources with the displayed container window environment. When a user then selects a server resource, the method invokes the server application to process the server resource selection. Conversely, when a user selects a container resource, the method invokes the container application to process the container resource selection.

48 Claims, 57 Drawing Sheets

101

VAC1.DOC

VAC1 PROJECT   July 1, 1990

Schedule:

_____
_____
_____
_____

|        | WK1 | WK2 | WK3 | WK4 | WK5 |   |
|--------|-----|-----|-----|-----|-----|---|
| MODULE2|  ■  |  ■  |     |     |     |   |
| MODULE1|  ■  |  ■  |  ■  |  ■  |  ■  |   |
| GLOBAL |  ■  |  ■  |  ■  |  ■  |     |   |

TABLE 1: SCHEDULE — 102

_____
_____
_____
_____
_____
_____
_____ — 104

Budget:

_____
_____
_____
_____

| ITEM | EST $ | EXP TO DATE | DELTA | RUNNING |
|------|-------|-------------|-------|---------|
| SUPPLIES | 100.00 | 50.00 | +50.00 | 50.00 |
| COMPUTERS | 4000.00 | 3895.00 | +195.00 | 3945.00 |
| MANUALS | 500.00 | 500.00 | 0.00 | 4445.00 |
| TOTAL | 5600.00 | 4445.00 | +245.00 | 4445.00 |

TABLE 2: VAC1 BUDGET — 103

*Figure 1* for a Non-Participant in Menu-Sharing

METHOD AND SYSTEM FOR IN-PLACE INTERACTION WITH CONTAINED OBJECTS

CROSS-REFERENCE TO RELATED APPLICATION

This application is a continuation-in-part for U.S. patent application Ser. No. 07/984,868, entitled "A METHOD AND SYSTEM FOR IN-PLACE INTERACTION WITH EMBEDDED OBJECTS," which was filed on Dec. 1, 1992, abandoned and which is hereby incorporated by reference.

TECHNICAL FIELD

This invention relates generally to a computer method and system for interacting with linked and embedded objects and, more specifically, to a method and system for editing and otherwise interacting with a contained object within the context of its container application.

BACKGROUND OF THE INVENTION

Current document processing computer systems allow a user to prepare compound documents. A compound document is a document that contains information in various formats. For example, a compound document may contain data in text format, chart format, numerical format, etc. FIG. 1 is an example of a compound document. In this example, the compound document 101 is generated as a report for a certain manufacturing project. The compound document 101 contains scheduling data 102, which is presented in chart format; budgeting data 103, which is presented in spreadsheet format; and explanatory data 104, which is presented in text format. In typical prior systems, a user generates the scheduling data 102 using a project management computer program and the budgeting data 103 using a spreadsheet computer program. After this data has been generated, the user creates the compound document 101, enters the explanatory data 104, and incorporates the scheduling data 102 and budgeting data 103 using a word processing computer program.

FIG. 2 shows how the scheduling data, budgeting data, and explanatory data can be incorporated into the compound document. The user generates scheduling data using the project management program 201 and then stores the data in the clipboard 203. The user generates budgeting data using the spreadsheet program 204 and then stores the data in the clipboard 203. The clipboard 203 is an area of storage (disk or memory) that is typically accessible by any program. The project management program 201 and the spreadsheet program 204 typically store the data into the clipboard in a presentation format. A presentation format is a format in which the data is easily displayed on an output device. For example, the presentation format may be a bitmap that can be displayed with a standard bitmap block transfer operation (BitBit). The storing of data into a clipboard is referred to as "copying" to the clipboard.

After data has been copied to the clipboard 203, the user starts up the word processing program 206 to create the compound document 101. The user enters the explanatory data 104 and specifies the locations in the compound document 101 to which the scheduling data and budgeting data that are in the clipboard 203 are to be copied. The copying of data from a clipboard to a document is referred to as "pasting" from the clipboard. The word processing program 206 then copies the scheduling data 102 and the budgeting data 103 from the clipboard 203 into the compound document 101 at the specified locations. Data that is copied from the clipboard into a compound document is referred to as "embedded" data. The word processing program 206 treats the embedded data as simple bitmaps that it displays with a BitBlt operation when rendering the compound document 101 on an output device. In some prior systems, a clipboard may only be able to store data for one copy command at a time. In such a system, the scheduling data can be copied to the clipboard and then pasted into the compound document. Then, the budgeting data can be copied to the clipboard and then pasted into the compound document.

Since word processors typically process only text data, users of the word processing program can move or delete embedded data, but cannot modify embedded data, unless the data is in text format. Thus, if a user wants to modify, for example, the budgeting data 103 that is in the compound document 101, the user starts the spreadsheet program 204, loads in the budgeting data 103 from a file, makes the modifications, copies the modifications to the clipboard 203, starts the word processing program 206, loads in the compound document 101, and pastes the modified clipboard data into the compound document 101. The spreadsheet program "implements" the spreadsheet data, that is, the spreadsheet program can be used to manipulate data that is in spreadsheet format. The format that a program implements is referred to as native format.

Some prior systems store links to the data to be included in the compound document rather than actually embedding the data. When a word processing program pastes the data from a clipboard into a compound document, a link is stored in the compound document. The link points to the data (typically residing in a file) to be included. These prior systems typically provide links to data in a format that the word processing program recognizes or treats as a presentation format. For example, when the word processing program 206 is directed by the user to paste the scheduling data and budgeting data into the compound document by linking, rather than embedding, the names of files in which the scheduling data and budgeting data reside in presentation format are inserted into the document. Several compound documents can contain links to the same data to allow one copy of the data to be shared by several compound documents.

SUMMARY OF THE INVENTION

It is an object of the present invention to provide a method and system for interacting with a contained object within a window environment of a container application of a container object.

It is another object of the present invention to provide a method and system for combining menus of the container application with menus of a server application of the contained object.

These and other objects, which will become apparent as the invention is more fully described below, are provided by a computer method and system for interacting with a containee object contained within a container object. In a preferred embodiment, the container object has a container application with a container window environment that has container resources for interacting with the container object. The containee object has a server application with a server window environment with server resources for interacting with the containee object. The method of the present invention displays the container window environment on a display device. A user then activating the containee object. In response to activating the containee object, the method integrates a plurality of the server resources with the displayed container window environment. When a user then selects a server resource, the method invokes the server application to process the server resource selection. Conversely, when a user selects a container resource, the method invokes the container application to process the container resource selection.

BRIEF DESCRIPTION OF THE DRAWINGS

FIG. 1 is an example of a compound document.

DETAILED DESCRIPTION OF THE INVENTION

Table of Contents

Figure 2:
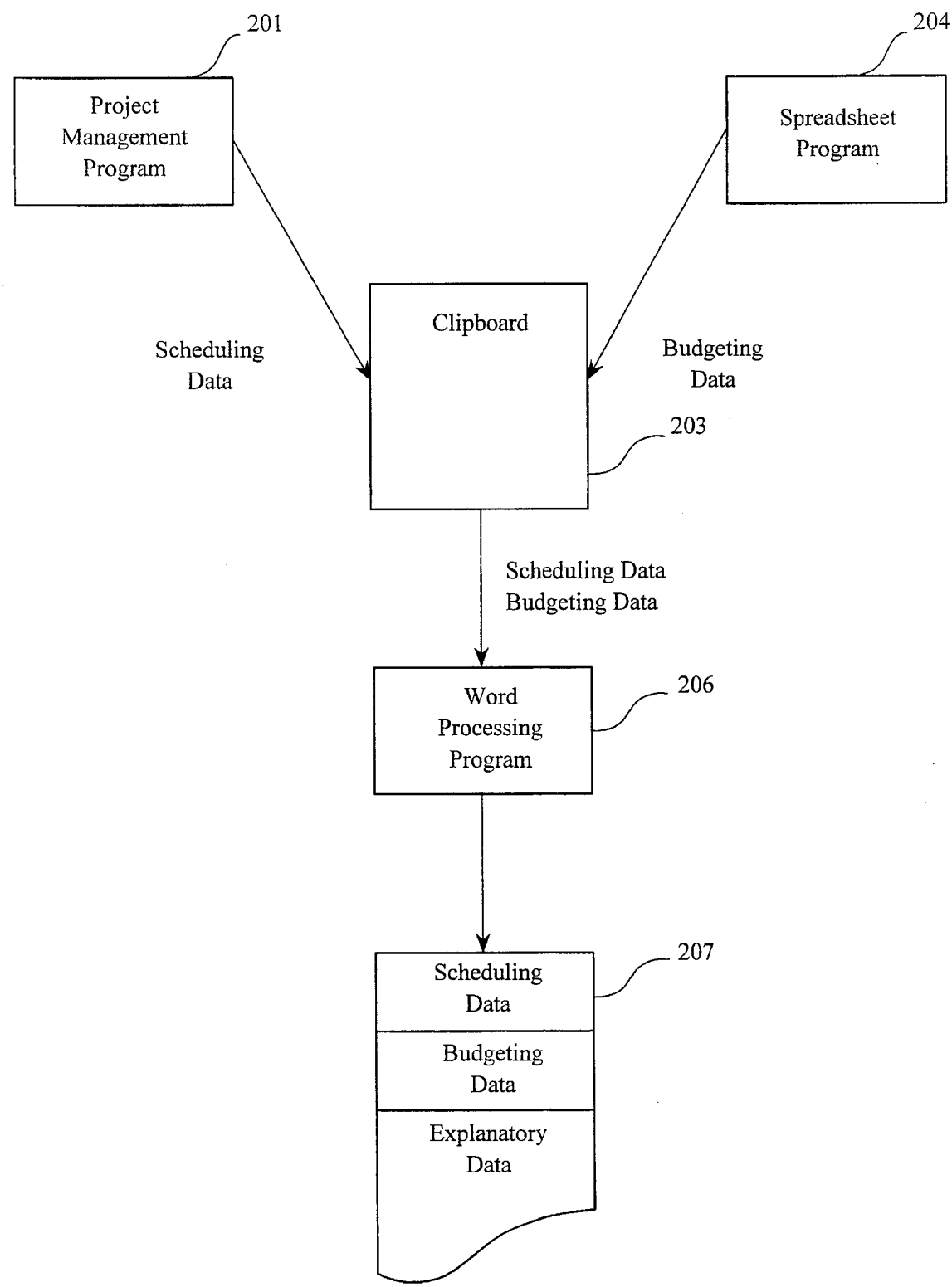
FIG. 2 is a diagram showing how the scheduling data, budgeting data, and explanatory data can be incorporated into the compound document.

1. Overview
2. In-Place Interaction Overview
3. Window Support for In-Place Interaction
4. In-Place Interaction API
   4.1 IOLEWindow Interface
      4.1.1 IOLEWindow::GetWindow
   4.2 IOLEInPlaceUIWindow Interface
      4.2.1 IOLEInPlaceUIWindow::GetBorder
      4.2.2 IOLEInPlaceUIWindow::QueryBorderSpace
      4.2.3 IOLEInPlaceUIWindow::SetBorderSpace
   4.3 IOLEInPlaceFrame Interface
      4.3.1 IOLEInPlaceFrame::SetMenu
      4.3.2 IOLEInPlaceFrames:: InsertMenus
      4.3.3 IOLEInPlaceFrame::RemoveMenus
      4.3.4 IOLEInPlaceFrame:: SetStatusText
      4.3.5 IOLEInPlaceFrame::EnableModeless
      4.3.6 IOLEInPlaceFrame::TranslateAccelerator
   4.4 IOLEInPlaceParent Interface
      4.4.1 IOLEInPlaceParent::CanInPlaceDeactivate
      4.4.2 IOLEInPlaceParent::OnInPlaceActivate
      4.4.3 IOLEInPlaceParent::OnUIActivate
      4.4.4 IOLEInPlaceParent::OnUIDeactivate
      4.4.5 IOLEInPlaceParent::OnDeactivate
      4.4.6 IOLEInPlaceParent::ShadeBorder
      4.4.7 IOLEInPlaceParent::GetWindowContext
   4.5 IOLEInPlaceObject Interface
      4.5.1 IOLEInPlaceObject::InPlaceDeactivate
      4.5.2 IOLEInPlaceObject::InPlaceUIDeactivate
      4.5.3 IOLEInPlaceObject::TranslateAccelerator
      4.5.4 IOLEInPlaceObject::Activate
      4.5.5 IOLEInPlaceObject::ResizeBorder
      4.5.6 IOLEInPlaceObject::EnableModeless
      4.5.7 IOLEInPlaceObject::SetVisRect
   4.6 Other Server Application Functions
      4.6.1 ActivateUI
      4.6.2 CreateNewMenu
      4.6.3 CreateObject Toolbars
      4.6.4 RemoveMenus
   4.7 Object Linking and Embedding API Helper Functions
      4.7.1 SetActiveObjectHwnd
      4.7.2 GetActiveObjectHwnd
      4.7.3 ObjectCreateSharedMenu
      4.7.4 ObjectDestroySharedMenu
      4.7.5 ObjectShade
      4.7.6 ObjectSetMenu
5. Use of In-Place Interaction API
   5.1 Procedure for Activation in Place
      5.1.1 Activation In Place Within a Multiple Document Interface Application
   5.2 User Selection of Pulldown Menus Message Handling
   5.3 In-Place Deactivation Procedure
   5.4 Closing the Container Application
   5.5 Interacting with Modeless Dialogs
   5.6 Handling Accelerator Key Combinations
6.0 Alternative Embodiment for In-Place Interaction
   6.1 Activation Model Support
   6.2 Windows Support for the Inside-Out Activation Model
   6.3 In-Place Interaction API Support for Inside-Out Activation
      6.3.1 IOLEWindow Interface
      6.3.2 IOLEInPlaceUIWindow Interface
      6.3.2.1 IOLEInPlaceUIWindow::SetActiveObject
      6.3.3 IOLEInPlaceFrame Interface
      6.3.3.1 IOLEInPlaceFrame::SetMenu
      6.3.4 IOLEInPlaceParent Interface
      6.3.4.1 IOLEParent::OnInPlaceActivate
      6.3.4.2 IOLEInPlaceParent::OnUIActivate
      6.3.4.3 IOLEInPlaceParent::OnUIDeactivate
      6.3.4.4 IOLEInPlaceParent::OnDeactivate
      6.3.4.5 IOLEInPlaceParent::GetWindowContext
      6.3.4.6 IOLEInPlaceParent::Scroll
      6.3.4.7 IOLEInPlaceParent::OnPosRectChanged
      6.3.5 IOLEInPlaceObject Interface
      6.3.5.1 IOLEInPlaceObject::InPlaceDeactivate
      6.3.5.2 Server Application Function - DeactivateUI
      6.3.5.3 Server Application- UIDeactivateContainedObject
      6.3.5.4 Server Application- DoInPlaceHide
      6.3.5.5 Server Application- InPlaceDeactivateContainedObjects
      6.3.5.6 IOLEInPlaceObject::UIDeactivate
      6.3.5.7 IOLEInPlaceObject::SetVisRects
      6.3.6 IOLEInPlaceActiveObject Interface
      6.3.6.1 IOLEInPlaceActiveObject::Activate
      6.3.6.2 IOLEInPlaceActiveObject::ResizeBorder
      6.3.6.3 Server Application- ActivateUI
      6.3.7 Object Linking and Embedding Facilities Helper Functions
   6.4 Use of In-Place Interaction API With Inside-Out Objects
      6.4.1 Determining the Activation Model of Objects
      6.4.2 Activating Objects
         6.4.2.1 Activating Inside-Out Objects Within a Multiple Document Interface Application
      6.4.3 Deactivating Objects
      6.4.4 Closing the Container Application

1. Overview

The present invention provides a generalized method, referred to as in-place interaction, for interacting with embedded or linked data in the context of a compound document. That is, the application to be used to interact with the embedded or linked data is made accessible to the user through the window environment (for example menus and windows) of the application that implements the compound document. This accessibility is referred to as activation in place. In a preferred embodiment, when embedded or linked (contained) data is activated in place, the menus of the application that implements the contained data are merged with the menus of the application that implements the compound document to create a composite menu bar. The order of the menus in the composite menu bar is determined by a set of menu groups. Each application categorizes its menus into these menu groups and places its menus in the composite menu bar in the order of the menu groups. The composite menu bar is then installed as the menu bar of the application implementing the compound document, and a message handler is installed to filter messages sent to the windows of this application. When the user selects a menu item, the message handler determines whether the menu item belongs to a menu of the application implementing the contained data or the application implementing the compound document. The message handler then sends the input message corresponding to the selected menu item to the correct application.

The present invention defines a set of abstract classes (interfaces) and thnctions through which contained data is activated in place. (In the C++ programming language, an abstract class is a class with a definition of its data and methods, but with no implementation for those methods. It is the responsibility of the application implementing the class to provide the actual code for the methods available to manipulate the class instance data.) The application implementing the compound document is responsible for implementing some of these interfaces and the application implementing the contained data is responsible for implementing others.

In a preferred embodiment of the present invention, an application program that creates a compound document controls the manipulation of linked or embedded data generated by another application. In object-oriented parlance, this data is referred to as an object. (The reference Budd, T., "An Introduction to ObjectOriented Programming," Addison-Wesley Publishing Co., Inc., 1991, provides an introduction to object-oriented concepts and terminology.) An object that is either linked or embedded into a compound document is "contained" within the document. Also, a compound document is referred to as a "container" object and the objects contained within a compound document are referred to as "contained" or "containee" objects. Referring to FIGS. 1 and 2, the scheduling data 102 and budgeting data 103 are containee objects and the compound document 101 is a container object. The user can indicate to the word processor that the user wants to edit a containee object, such as the budgeting data 103. When the user indicates that the budgeting data 103 is to be edited, the word processing program determines which application should be used to edit the budgeting data (e.g., the spreadsheet program) and launches (starts up) that application. The user can then manipulate the budgeting data using the launched application, and changes are reflected in the compound document. The same procedure is used. whether the budgeting data is stored as an embedded or linked object.

Figure 3:
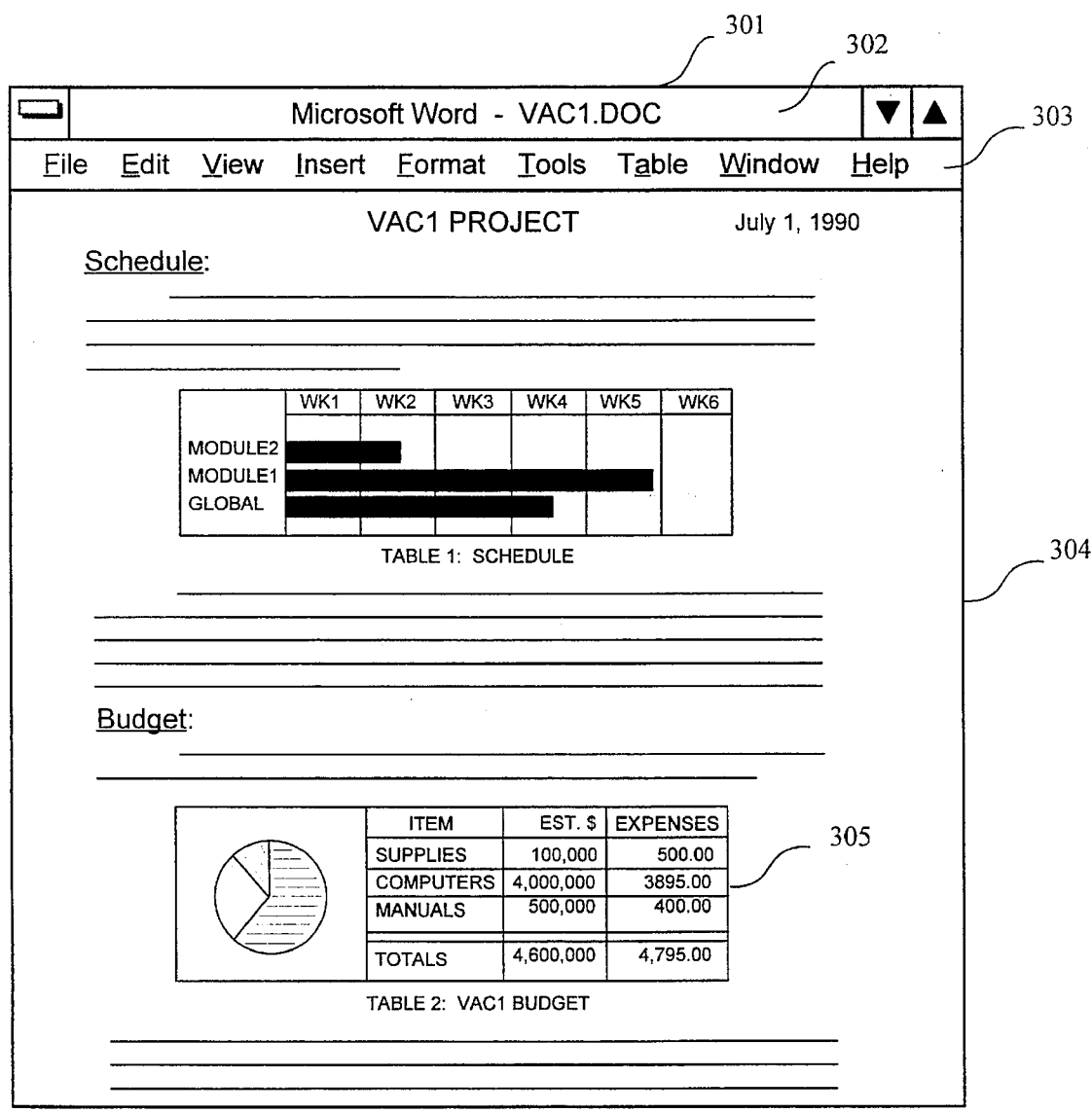
FIG. 3 is a diagram of the sample compound document shown in FIG. 1 as it appears when edited within the word processing application before in-place interaction occurs.
Figure 4:
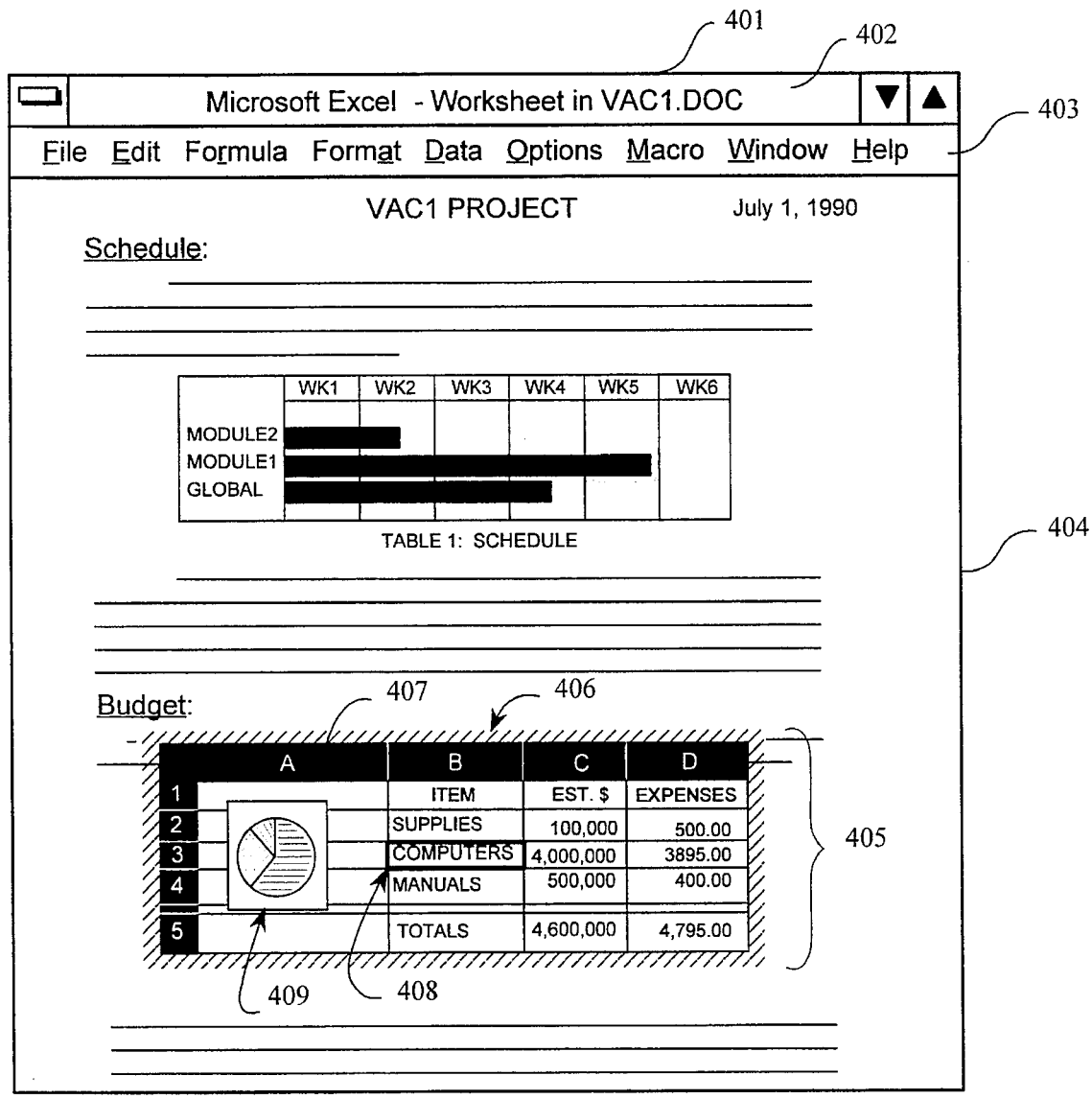
FIG. 4 is a diagram of the embedded spreadsheet object as it appears when activated in place within the compound document.

If the application used to edit the budgeting data supports in-place interaction, then, when it is launched by the word processing program, it is activated within the window environment of the word processing program. FIGS. 3 and 4 illustrate the process of activating the embedded budgeting data 103 in place.

FIG. 3 is a diagram of the sample compound document shown in FIG. 1 as it appears when edited within the word processing application before in-place interaction occurs. The main window of the container application 301 contains a title bar 302, a menu bar 303, and a client window 304. The client window 304 displays the manufacturing project report discussed in FIG. 1. The compound document contains an embedded spreadsheet object (the budgeting data 305). When the user edits the native text data of the compound document, the menu bar 303 appears as shown: it includes all of the commands necessary to interact with the word processing application.

When the user decides to edit the budgeting data 305, the user selects the spreadsheet object 305 and requests the word processing application to edit the object (e.g., by double clicking on the object using the mouse). The word processing application then launches the spreadsheet application requesting that it edit the spreadsheet object 305. The spreadsheet application negotiates with the word processing application to edit the spreadsheet object 305 using windows 301 and 304 and the menu bar 303 of the word processing application.

FIG. 4 is a diagram of the embedded spreadsheet object as it appears when activated in place within the compound document. The spreadsheet object 405 is edited directly in the client window 404 of the word processing application. The title bar 402 is changed to reflect that the application implementing the compound document, in this case a word processing application, is editing a spreadsheet worksheet within the compound document "VAC1.DOC." Also, the menu bar 403 is changed to a new composite menu bar, which comprises menus from the word processing application and menus from the spreadsheet application. In addition, various aspects of the embedded spreadsheet object 405 are changed to reflect that it is being edited within its container compound document. A selection highlight 406 in the form of a hatched border pattern is placed around the object. Also, the standard tools of the spreadsheet application, in this case the row and column markers 407, are placed around the spreadsheet object. Also, the spreadsheet selection cursor 408 is placed around the currently selected cell. At this point, the user is ready to edit the spreadsheet object 405 using all of the spreadsheet application commands.

In a preferred embodiment, application programs ("applications") cooperate using object linking and embedding facilities to create and manipulate compound documents. An application that creates a compound document is referred to as a container (or client) application, and an application that creates and manipulates containee objects is referred to as a server application. An application can behave as both a container and server. That is, an application can contain objects and the objects that the application implements can be contained within other objects. Referring to FIG. 2, the project management program 201 and the spreadsheet program 204 are server applications, and the word processing program 206 is a container application. A container application is responsible for selection of the various objects within the container object and for invoking the proper server applications to manipulate the containee objects. Server applications are responsible for manipulating the contents of the containee objects.

In a preferred embodiment, applications are provided with an implementation-independent Application Programming Interface (API) that provides object linking and embedding functionality. The API is a set of functions that are invoked by container and server applications. These functions manage, among other things, the setup and initialization necessary for container applications to send and receive messages and data to and from server applications. The API provides functions to invoke server applications to manipulate containee objects.

The invoking of a server application can be relatively slow when the server application executes as a separate process from the container application. In certain situations this slowness may be particularly undesirable. For example, if a user wants to print a compound document that includes many containee objects, it may take an unacceptably long time to invoke the server process for each containee object and request each server process to print the object. To ameliorate this unacceptable performance, a server application can provide code that can be dynamically linked during runtime into the process of the container application to provide certain functionality more efficiently. This code is called an "object handler." Object handlers provide functionality on behalf of the server application so that the object linking and embedding API can avoid starting up server processes and passing messages to the server process. In the above example, an object handler could provide a print function that the object linking and embedding API could invoke to print a containee object.

Figure 5:
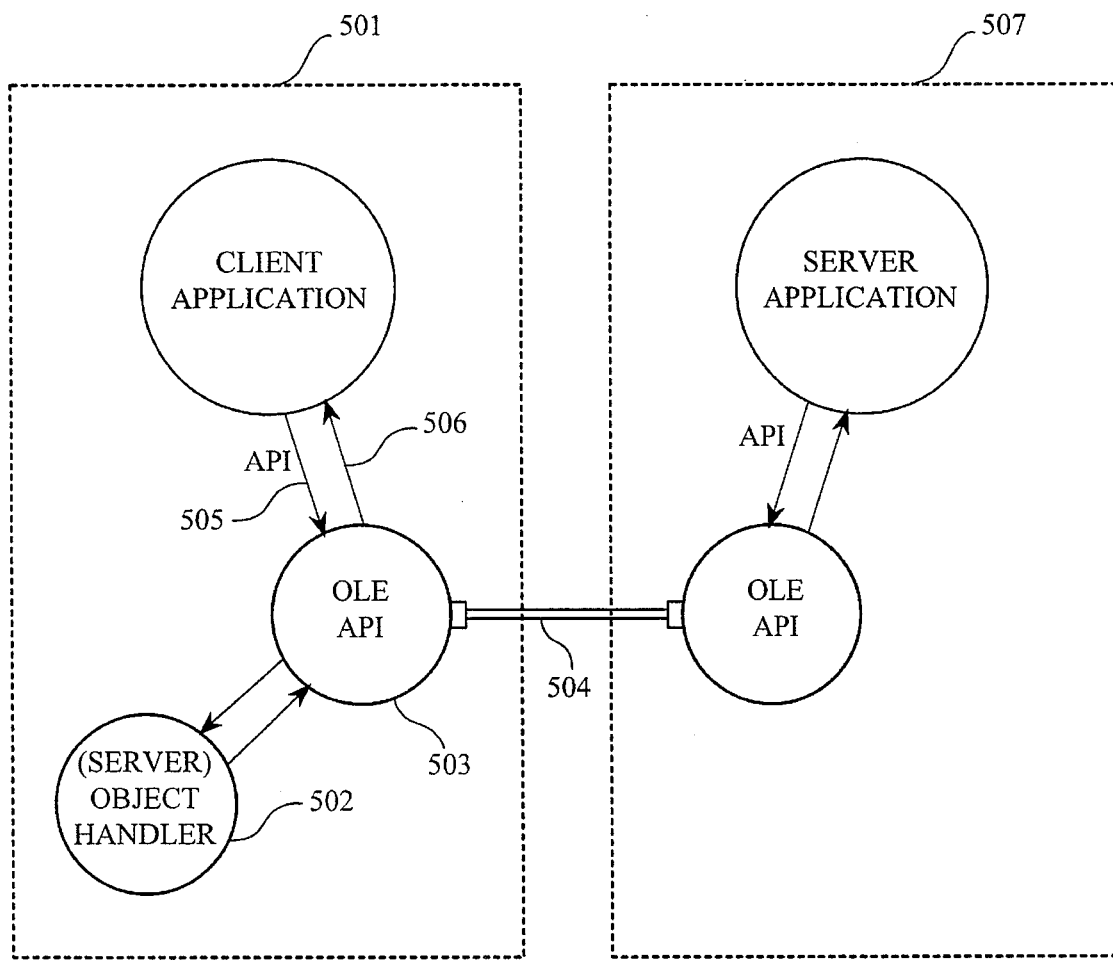
FIG. 5 is a diagram which shows the relationship between an object handler and the container and server processes.

FIG. 5 is a diagram which shows the relationship between an object handler and the container and server processes. The object handler 502 is linked into the container process address space 501 during runtime by the object linking and embedding API 503. Typically, the object linking and embedding API 503 invokes the object handler 502 directly, and the container application code need not be aware that a handler is providing the functionality, rather than a server process 507.

In addition to providing a set of functions, the object linking and embedding ("OLE") API defines "interfaces" through which container applications can communicate with their contained objects. An interface is a set of methods (in C++ parlance) which abide by certain input, output, and behavior rules. If a contained object supports (provides an instrumentation for) a particular interface, the container application can invoke the methods of that interface to effect the defined behavior. In a preferred embodiment, the container application does not directly access the object data. Rather, it preferably accesses the object data using the supported interfaces. A container application is bound to a contained object through a pointer to an interface instance. The container application accesses the object data by invoking the methods of the interface instance. To access the object data, the methods may send messages to the server application requesting the specified access. In a preferred embodiment, messages are sent between container and server applications when the server application is implemented as a separate process using interprocess communications mechanisms provided by the underlying operating system.

Figure 6:
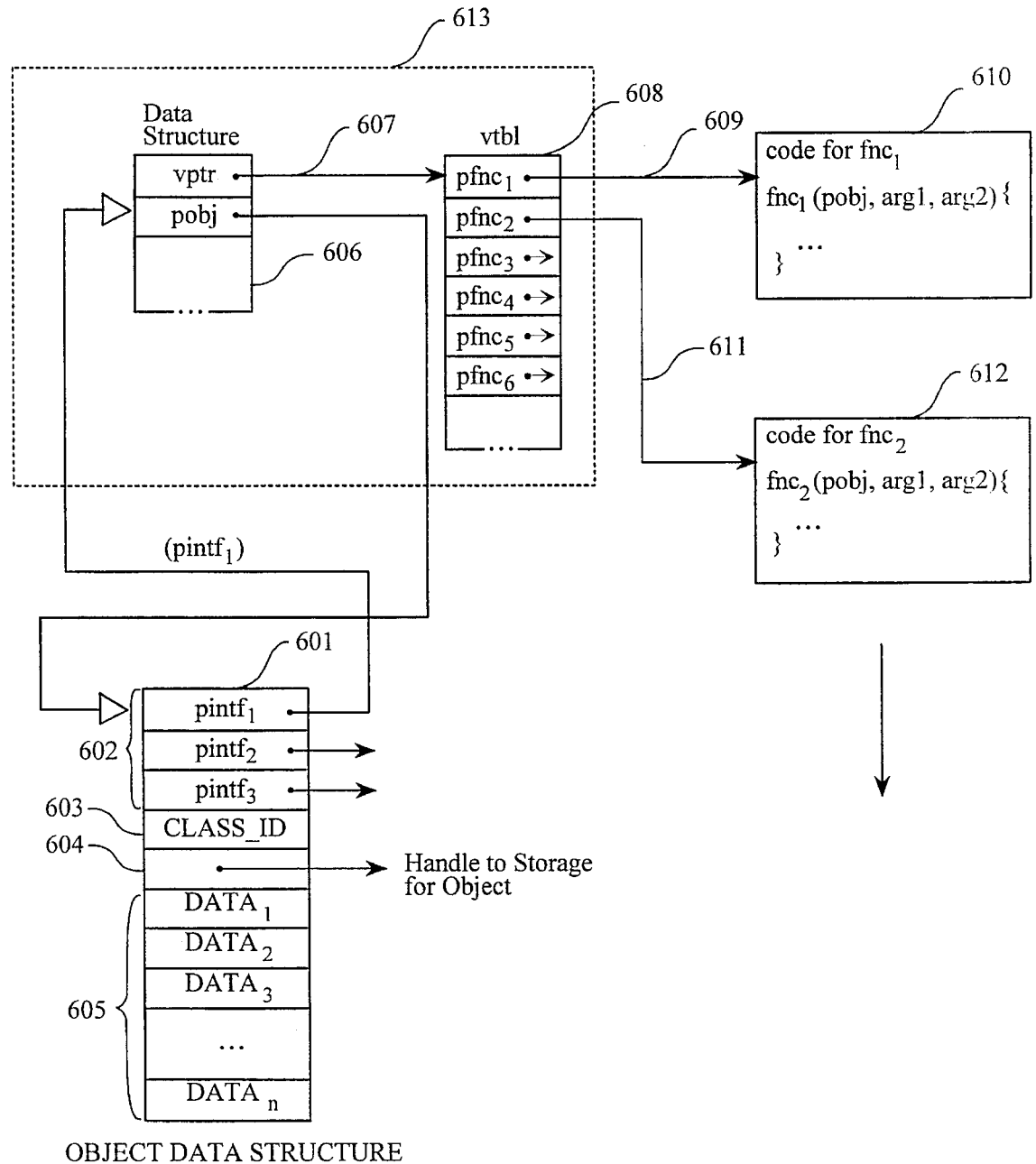
FIG. 6 is a block diagram of a sample instance of a linked or embedded object.

FIG. 6 is a block diagram of a sample instance of a linked or embedded object. In a preferred embodiment, the layout of the instance conforms to the model defined in U.S. Pat. No. 5,297,284, entitled "A Method for Implementing Virtual Functions and Virtual Bases in a Compiler for an Object Oriented Programming Language" which is hereby incorporated by reference. The instance contains object data structure 601 and interface data structure 613 for each supported interface. The object data structure 601 contains pointers 602 to the interface data structures 613 and may contain private data of the instance. The private data of this sample instance includes a class identifier 603, handle 604 to the storage for the object, and data 605 for tracking the state of the object. The class identifier (CLASS_ID) is used to access the appropriate server application for the object. It is similar to a data structure "type" used in programming languages. A method can determine this server application for the object by using its CLASS_ID as an index into a persistent global registry. The persistent global registry is discussed further below. As shown in FIG. 6, each interface data structure 613 contains a private data structure 606 and a virtual function table 608. The private data structure 606 contains a pointer 607 to the virtual function table 608. The virtual function table 608 contains pointers 609 and 611 to the code 610, 612 that implements the methods of the interface.

TABLE 1 define interface class
interface intf {public:
    virtual RETCODE fnc$_1$ (arg1, arg2) = 0;
    virtual RETCODE fnc$_2$ (arg1, arg2) = 0;
    virtual RETCODE fnc$_3$ ( ) = 0;
    . . .
};

Table 1 represents the definition for the interface for the first entry pintf$_1$ in the object data structure 601. In Table 1, the word "interface" is defined to mean a C++ class. The definition shows three methods with their parameters. The word "virtual" indicates that the declared method can be overridden by a method of the same name and type in a derived class. (A derived class is a class that inherits the data members and methods of its base class.) The "=0" at the end of each parameter list indicates that the method has no code implementation. In the C++ programming language, these methods are termed "pure virtual functions". In C++ a class with at least one pure virtual function is referred to as an abstract class. In a preferred embodiment, an interface is an abstract class with no data members and whose virtual functions are all pure. Thus, an interface provides a protocol for two programs to communicate. To support an interface, a program implements a class that provides an implementation for the interface (through derivation). Thereafter, objects are created as instances of this class.

Figure 7:
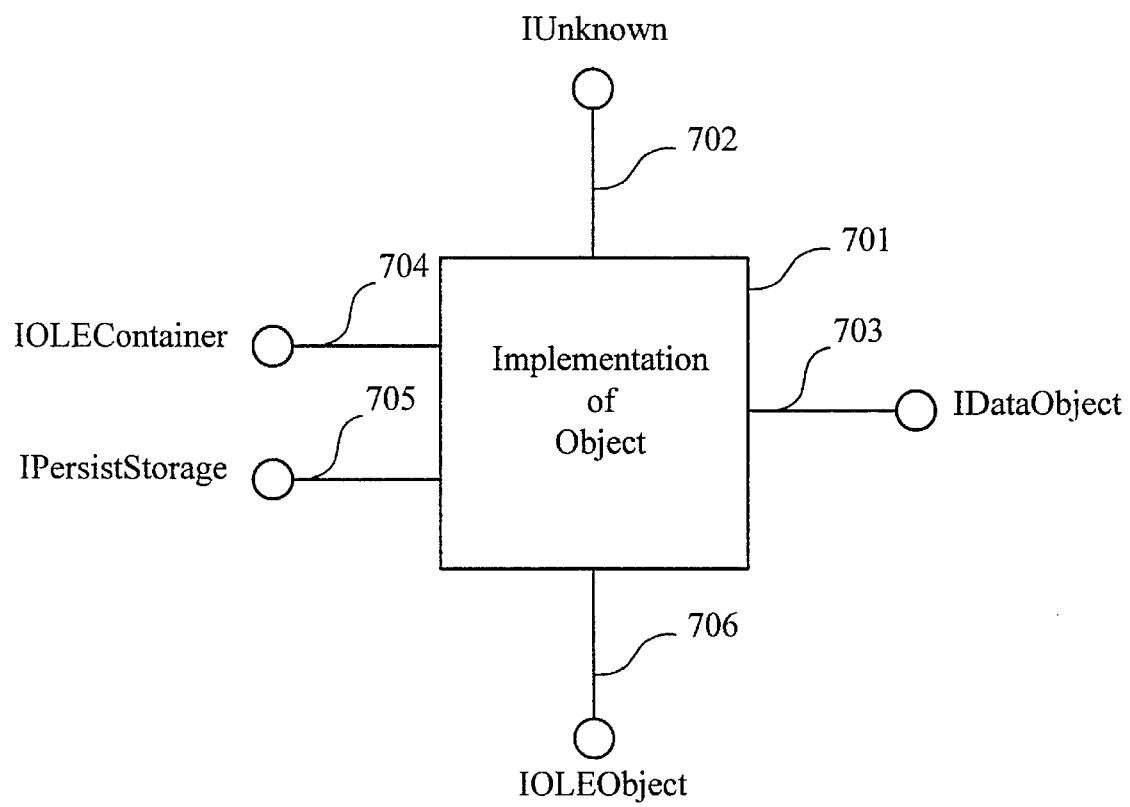
FIG. 7 is a block diagram showing a public view of an object.

FIG. 7 is a block diagram showing a public view of an object. The public view of an object is the various interfaces that the object supports 702–706. Each interface provides methods through which container applications can access the object. Each object supports an IUnknown interface 702. Container applications use the IUnknown interface 702 to determine which other interfaces the object supports. The implementation of IUnknown interface 702 for a particular object knows what other interfaces the object supports and returns to the invoking application pointers to those interfaces. In a preferred embodiment, the method IUnknown-::QueryInterface is used tbr this purpose. Interfaces 703 through 706 are examples of typical interfaces that can be supported by an object. These imerfaces derive from the IUnknown interface. For example, the IDataObject interface 703 provides methods for storing data in and retrieving data from the object. The IOLEContainer interface 704 provides methods for listing the containee objects that are contained within the object. The IPersistStorage interface 705 provides methods for storing the object to and retrieving the object from persistent storage. The IOLEObject interface 706 provides methods through which a container application invokes the functionality of an object that corresponds to a user-selected action.

In addition to the API, the object linking and embedding facilities of the present invention provide information to container and server applications through a persistent global "registry." This registry is a database of information such as (1) for each type of object, the server application that implements the object type, (2) the actions (verbs) that each server application provides to container applications, (3) where the executable files for each server application are located, and (4) whether each server application has an associated object handler.

2. In-Place Interaction Overview

Once objects have been linked or embedded into a document, a user can select objects and request that certain actions be performed upon the selected objects. A user requests actions by first selecting the object and then selecting an action (e.g., a menu item) to be performed upon the object. The implementing server application is then invoked to perform the selected action. One skilled in the art will appreciate that there are many ways to display the choices of possible actions to a user and allow the user to select an action. In a preferred embodiment, the container application determines from the global registry what actions hre supported by the server application implementing the selected object and then displays the actions in a menu.

Figure 8:
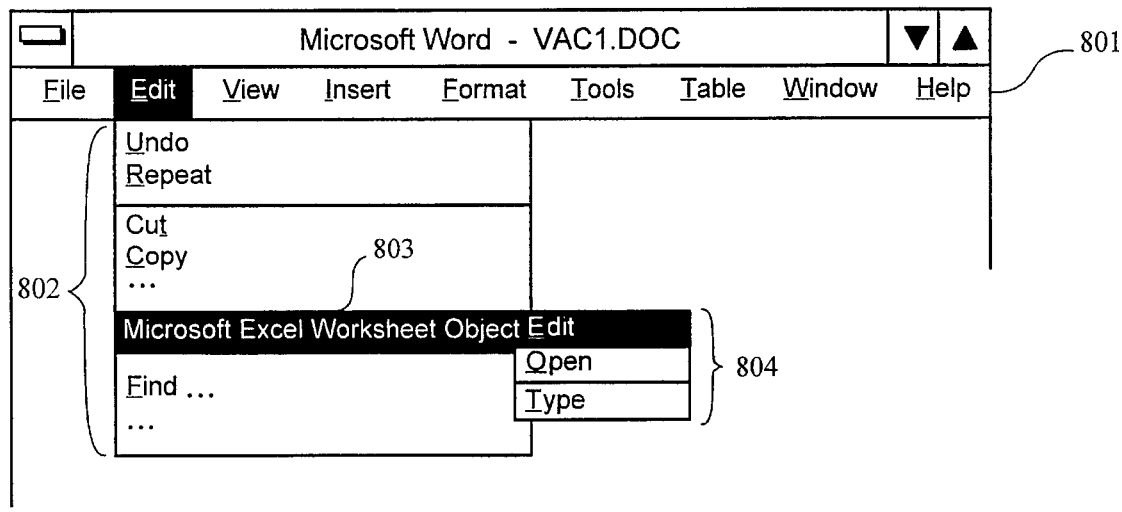
FIG. 8 is a sample user menu provided by a container application to display and select the actions available for an object.

FIG. 8 is a sample user menu provided by a container application to display and select the actions available for an object. Menu item 803 is the entry for the object on the container application Edit menu 802. The entry varies based on the currently selected object. When no embedded or linked objects are selected, menu item 803 is not displayed. Submenu 804 displays the actions supported by an "Excel Worksheet Object." In this example, the supported actions are "Edit," "Open," and "Type." The first action (e.g., "Edit") on a submenu is the default action, which is performed when a user double-clicks with a mouse pointing device on the object, or enters functionally equivalent keys.

Once a user has selected a desired action (from the menu or by double-clicking on the object), the container application can then invoke the server application passing it an indication on the action to perform on behalf of the container application. The container application does this by obtaining the IOLEObject interface for the object and then invoking the object's DoVerb method passing it the selected action. (The DoVerb method performs the object-specific actions on the object.) The server application in turn determines whether the object can be activated in place within the window environment of the container application. If so, the server application and container application merge their menus into a composite menu bar, negotiate the placement of server application tool bars, palettes, formula bars, etc., and set up merged message handling. At this point, the server application is ready to receive user input.

Figure 9:
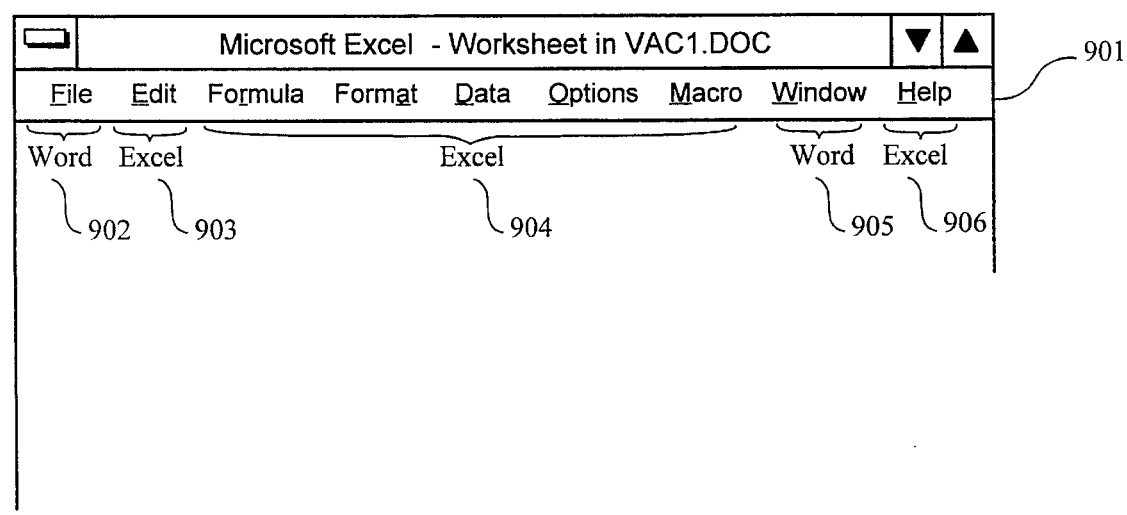
FIG. 9 is a diagram showing the composite menu bar resulting from the merger of the server application menus with the container application menus of the example shown in FIG. 4.

Continuing the example of FIG. 4, FIG. 4 shows the user editing the spreadsheet object (the budgeting data 405) in place within the window environment of a word processing application. FIG. 9 is a diagram showing the composite menu bar resulting from the merger of the server application menus with the container application menus of the example shown in FIG. 4. The composite menu bar 901 comprises menus 902, 905 from the word processing application and menus 903, 904, 906 from the spreadsheet application. When the user selects a particular menu item from one of these menus, the container application through the merged message handler determines whether to dispatch the message to the word processing application or to the spreadsheet application.

In a preferred embodiment of the present invention, a composite menu bar is created based upon a set of predetermined conventions. Each application menu to be included in the composite menu bar is assigned to a menu group. The menus are then inserted into the composite menu bar according to the assigned menu group.

Figure 10:
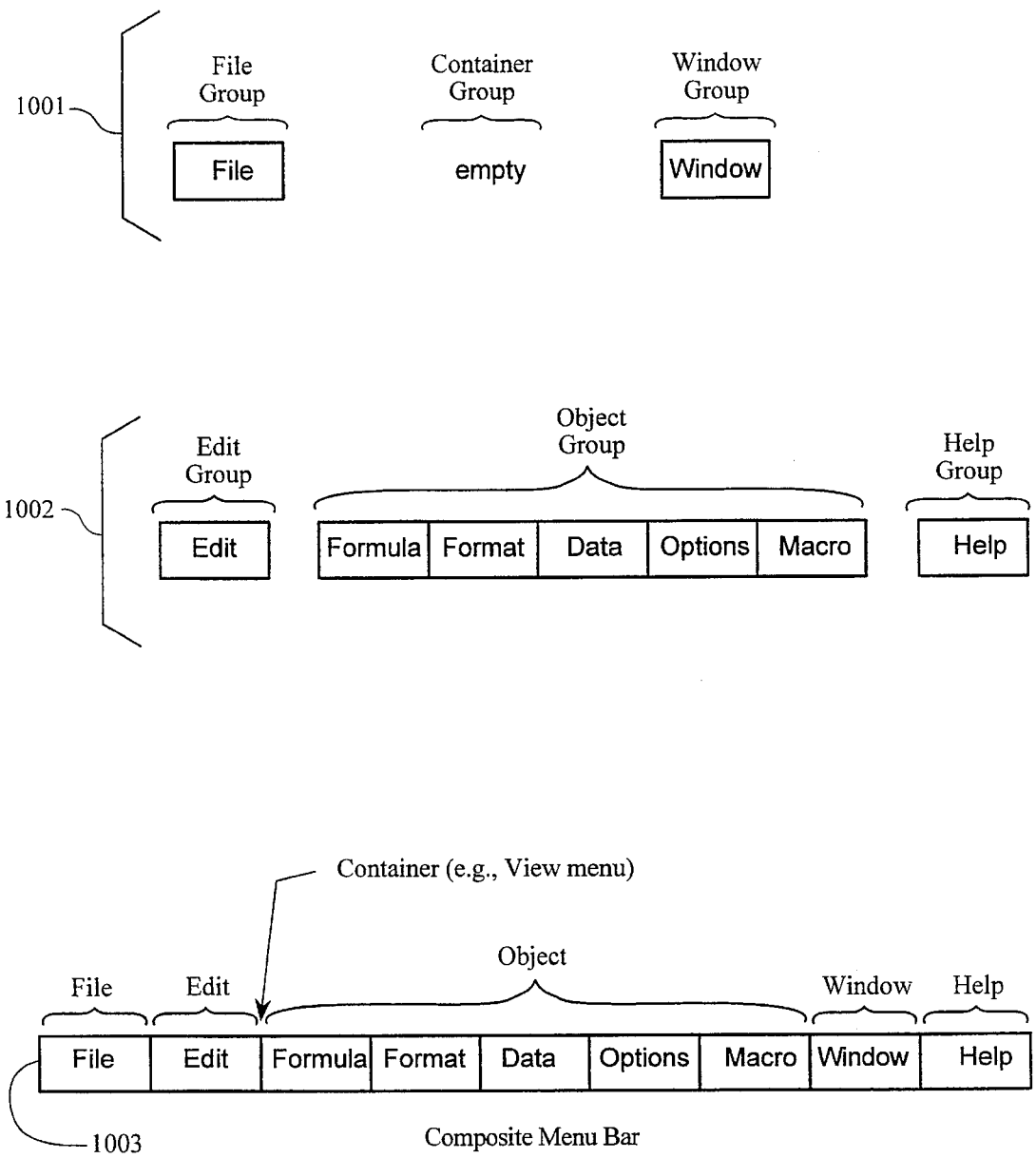
FIG. 10 is a diagram of the menu groups that compose a composite menu bar in a preferred embodiment of the present invention.

FIG. 10 is a diagram of the menu groups that compose a composite menu bar in a preferred embodiment of the present invention. The composite menu bar 1003 comprises menu groups 1001 from the container application and menu groups 1002 from the server application. The container application menu groups 1001 include the File group, the Container group, and the Window group. The server application menu groups 1002 include the Edit group, the Object group, and the Help group. In a preferred embodiment, the container and server application menus are interleaved in the final composite menu bar, according to the Microsoft application user interface style guidelines, which is specified in "The Windows Interface: An Application Design (Guide," Microsoft Corp., 1992, which is herein incorporated by reference. Specifically, in the composite menu bar 1003, the groups are arranged left to right in the following order: File, Edit, Container, Object, Window, and Help.

3. Window Support for In Place Interaction

In a preferred embodiment, the in-place interaction API is implemented using the capabilities of the underlying window system. The present invention is described assuming the underlying window system is similar to the Microsoft Windows 3.1 operating system ("Windows"), although one skilled in the art will appreciate that the present invention can be implemented in a different underlying window system. The Microsoft Windows 3.1 operating system is described in "Programmer's Reference, Volume 2: Functions," Microsoft Corp., 1992; "Programmer's Reference, Volume 3: Messages, Structures, and Macros," Microsoft Corp., 1992; and "Guide to Programming," Microsoft Corp., 1992, which are herein incorporated by reference.

In window environments, applications support a single document interface or a multiple document interface. A single document interface ("SDI") application interacts with one document (file) at a time. For example, a word processing application that supports SDI would display the file currently being edited in its primary window. A multiple document interface ("MDI") application interacts with multiple documents (files) by devoting at least one window to each document. For example, a word processing application that supports MDI might display each file currently being edited in a separate document window. The user selects the document window of the file the user wishes to edit either by clicking on the title bar of the desired document window or by selecting the window title from a list on the Window menu of the application.

Figure 11:
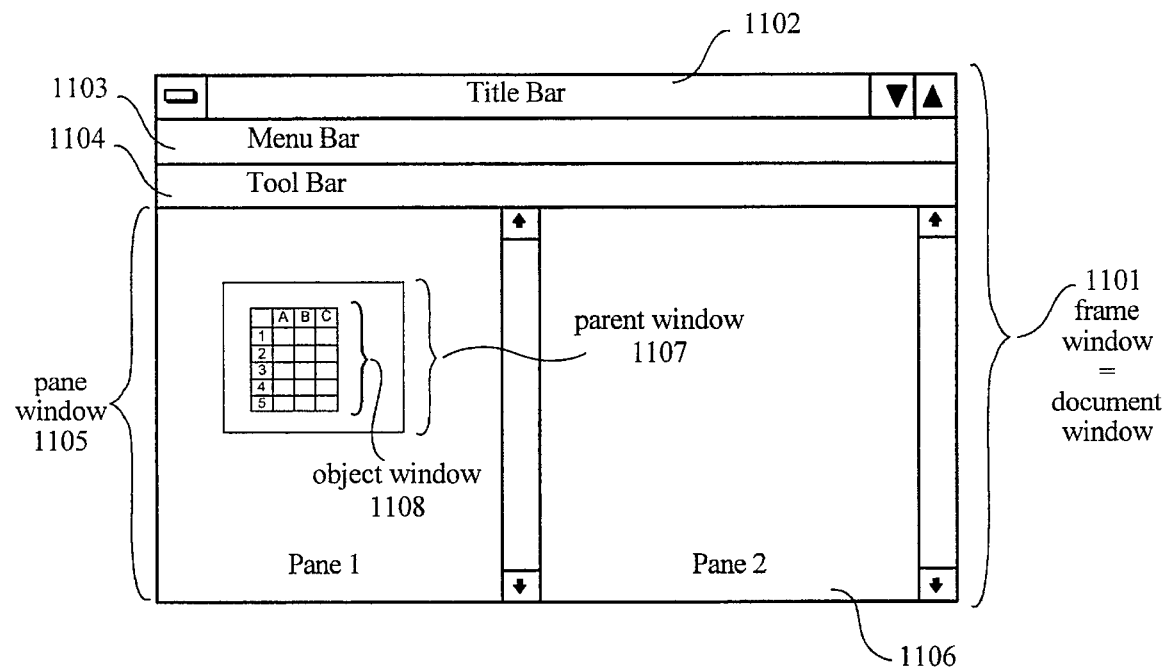
FIG. 11 is a diagram showing the component windows of a typical Single Document Interface application.

FIG. 11 is a diagram showing the component windows of a typical Single Document Interface application. A typical SDI application provides a frame window 1101, and, depending upon the application, may additionally provide pane windows 1105 and 1106 and a parent window 1107 for an embedded object resides. In the case of an SDI application, the frame window 1101 is also the document window. Pane windows 1105, 1106 provide multiple views of a compound document. A parent window 1107 may be created by the container application to delineate the object when the object is first inserted into the compound document. In the example shown in FIG. 11, the embedded object is a spreadsheet object, which is displayed within an object window 1108, which is contained within the parent window 1107 of the container application. The object window 1108 is owned by the server application. The frame window 1101 contains a title bar 1102, a menu bar 1103, and a tool bar 1104. Typically, tool bars and other application-specific tools are attached to either the frame window or a pane window of a container application. They may also appear as floating palettes, which are windows that are independent of the windows shown in FIG. 11 and thus appear to "float" on top.

Figure 12:
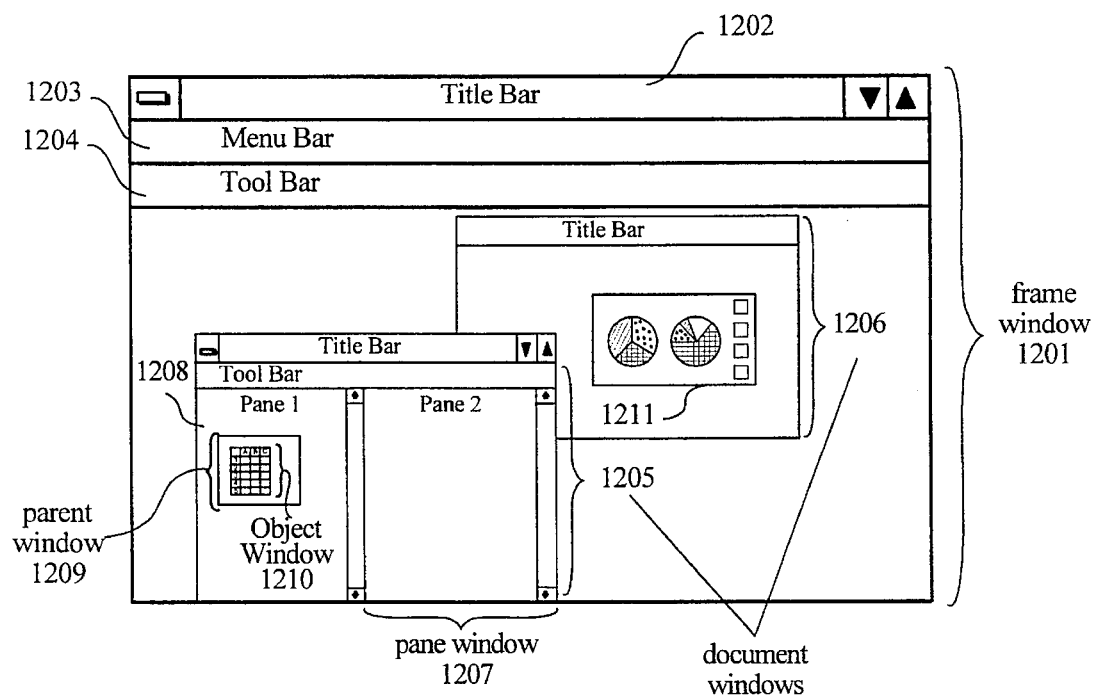
FIG. 12 is a diagram showing the component windows of an Multiple Document Interface application.

FIG. 12 is a diagram showing the component windows of a typical Multiple Document Interface application. A typical MDI application allows a user to edit multiple compound documents from within the same container application. In the example shown in FIG. 12, the user edits two separate compound documents in the two document windows 1205, 1206. Each document window can contain pane windows in a manner analogous to the SDI application. Document window 1205 contains two pane windows 1207, 1208. Also, the MDI application can provide a parent window 1209 for containing embedded objects in a manner analogous to the SDI application. FIG. 12 shows an embedded spreadsheet object presented within an object window 1210. As in the case of an SDI application, the application-specific tools may appear anywhere.

Figure 13:
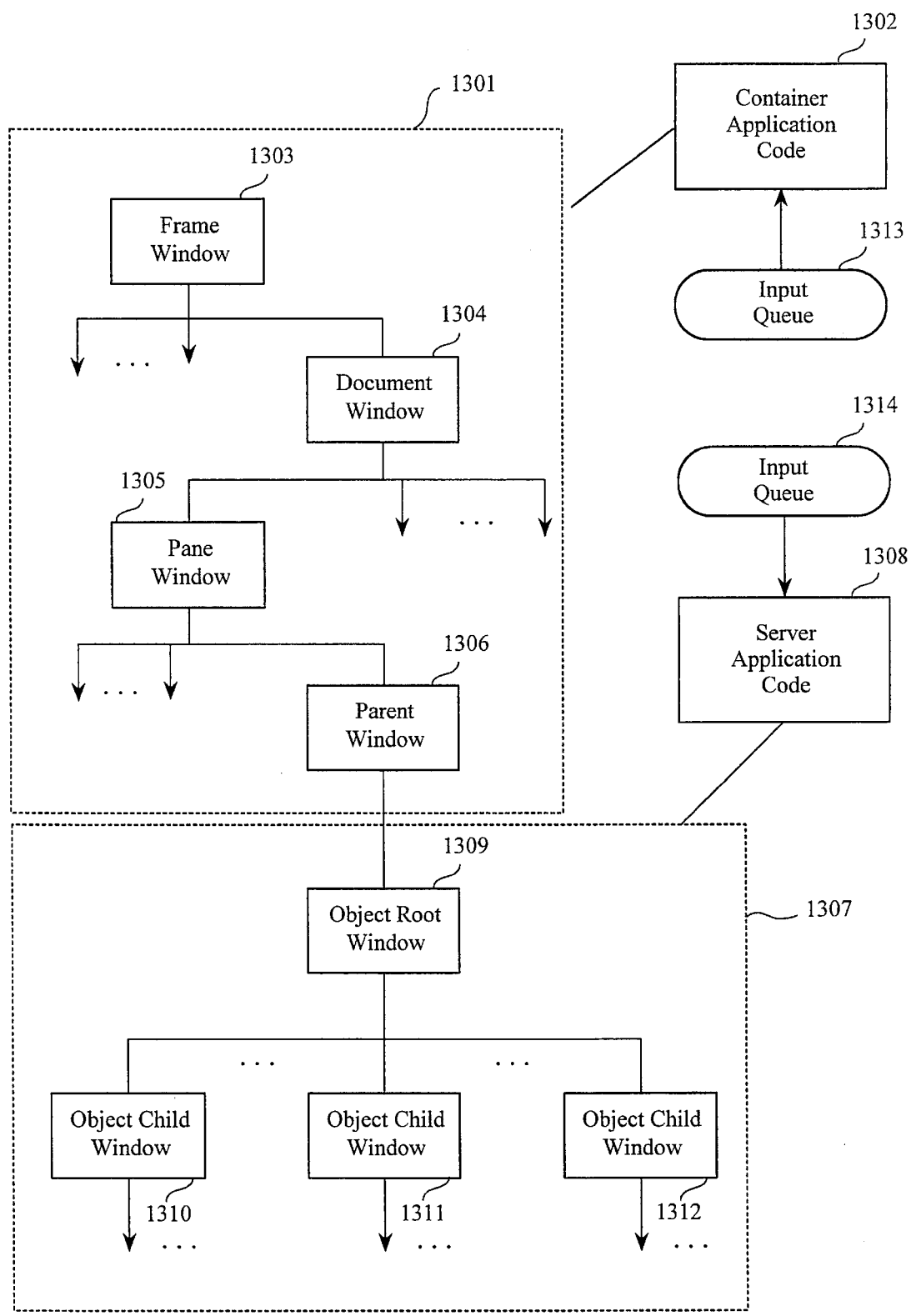
FIG. 13 is a block diagram showing the typical window hierarchy of a container application when it is editing an embedded object in place.

The windows managed by either an SDI or MDI application are created and maintained in a hierarchical fashion. FIG. 13 is a block diagram showing the typical window hierarchy of a container application when it is editing an embedded object in place. The window hierarchy comprises container application windows 1301 from the container application, and server application windows 1307 from the server application. The container application 1302 manages its frame window 1303, which contains a document window 1304, which may contain a pane window 1305, which may contain a parent window 1306. When an object is activated in place, the server application 1308 creates a root window 1309 for the embedded object and any child windows it requires. The object root window 1309 contains object child windows 1310, 1311, 1312.

Every application, when implemented as a separate process, contains an input queue for receiving events connected with the windows residing in the application's window hierarchy. The window hierarchy of FIG. 13 is supported by two different applications. Thus, there are separate input queues associated with the windows belonging to the container application and the windows belonging to the server application. Input queue 1313 is associated with the container application windows 1301. Input queue 13 14 is associated with the server application windows 1307. In order to receive user input, a window is displayed. When a user clicks with the mouse, or inputs keystrokes to one of these windows, the underlying window system puts an appropriate message on either the container input queue 1313 or the server application queue 1314.

4. In-Place Interaction API

The object linking and embedding API provides functions and defines interfaces through which the container and server applications communicate to support in-place interaction. The methods of these interfaces and the other API functions are invoked by application code in the usual course of processing user input. In an event-driven windowing system, an application invokes the appropriate method or function in response to receiving a message indicating that a user has selected a particular menu item or object.

Figure 14:
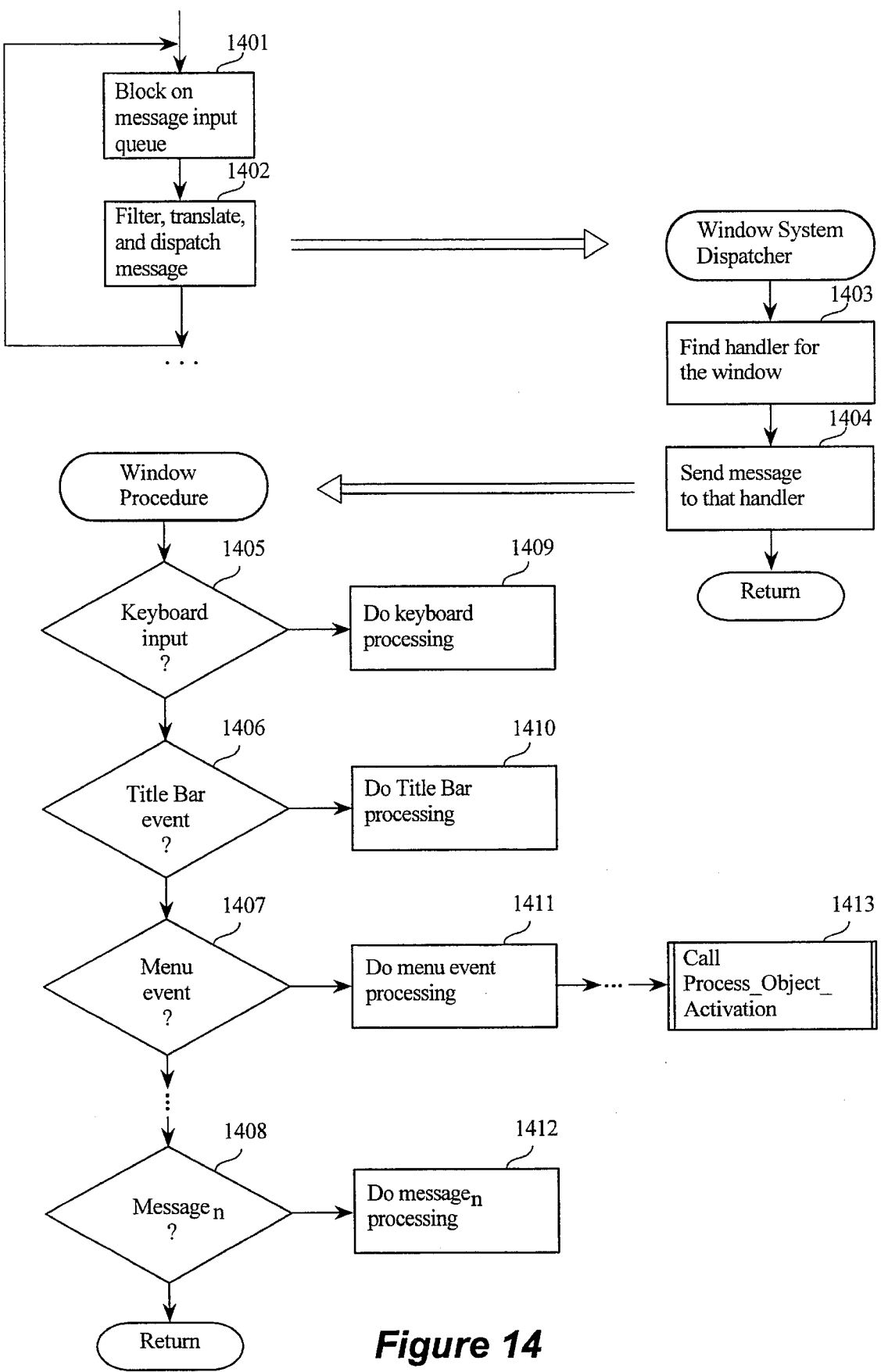
FIG. 14 is a flow diagram showing message processing in an event-driven windowing operating system environment.

FIG. 14 is a flow diagram showing message processing in an event-driven windowing operating system environment. Each window has its own message handler, which is registered with the underlying window system when the window is created. Several windows may share a single message handler. When messages are received on an application input queue (for example, the input queue of the container application 1313), the application filters, translates, or dispatches the message to the window system. The window system dispatcher in turn sends the message to the message handling function (the "message handler") that was previously registered for the particular window indicated in the message. Upon receipt of the message, the message handler processes the message. The processing may include using the object linking and embedding API. Steps 1401 and 1402 compose a message pump. In step 1401, the application waits for a message on its input queue. In step 1402, the application filters or translates the message, if appropriate, or dispatches the message to the window system dispatch function. Steps 1403 and 1404 are the steps in the window system dispatch function that dispatch the message to the appropriate window message handler. In step 1403, the window system dispatcher locates the message handler for the window that is indicated in the message. In step 1404, the window system dispatcher sends the message to the located message handler (e.g., by invoking the message handler).

Steps 1405 through 1412 compose a typical message handler for a window. A message handler is also referred to as a "window procedure." In a preferred embodiment, if an application does not provide a window procedure for a particular window, the underlying window system provides a default message handler called DefWindowProc. In steps 1405 through 1408, the application decodes the message to determine what type of event has occurred. Typically, for each type of event, the application invokes a different function, as shown in steps 1409 through 1412. These functions may in turn use the object linking and embedding API. For example, when a menu event is received, the application, in step 1411, invokes a function that processes menu events. If a contained object is selected before a menu event that can cause the object to be activated in place, then in step 1411 the application invokes the Process_Object_Activation function (shown as step 1413), which activates the selected containee object in place. As will be discussed further below, the Process_Object_Activation function uses the object linking and embedding API to activate a containee object in place.

Figure 14B:
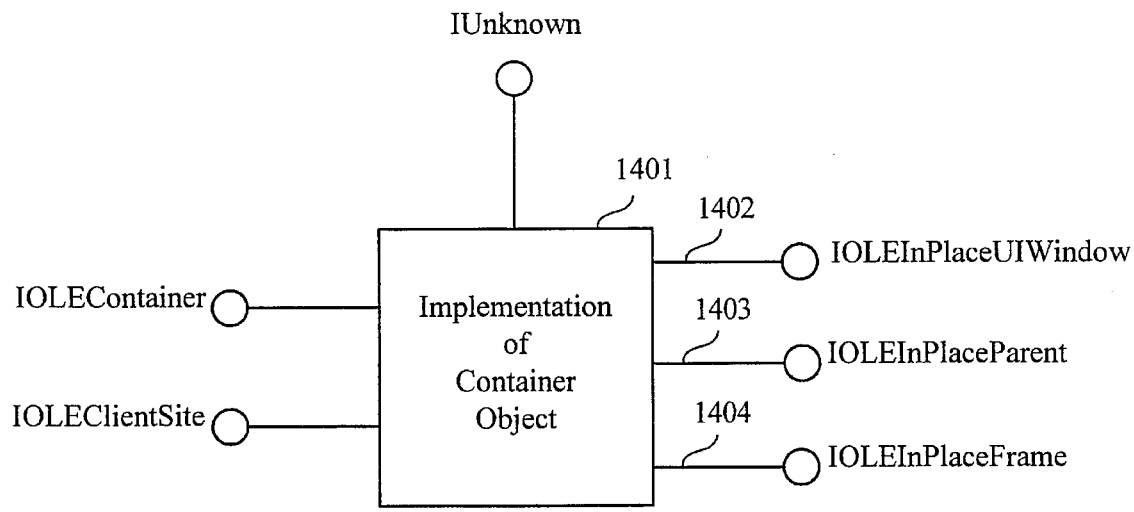
FIG. 14B is a block diagram showing the public interfaces required to support in place interaction.
Figure 14B:
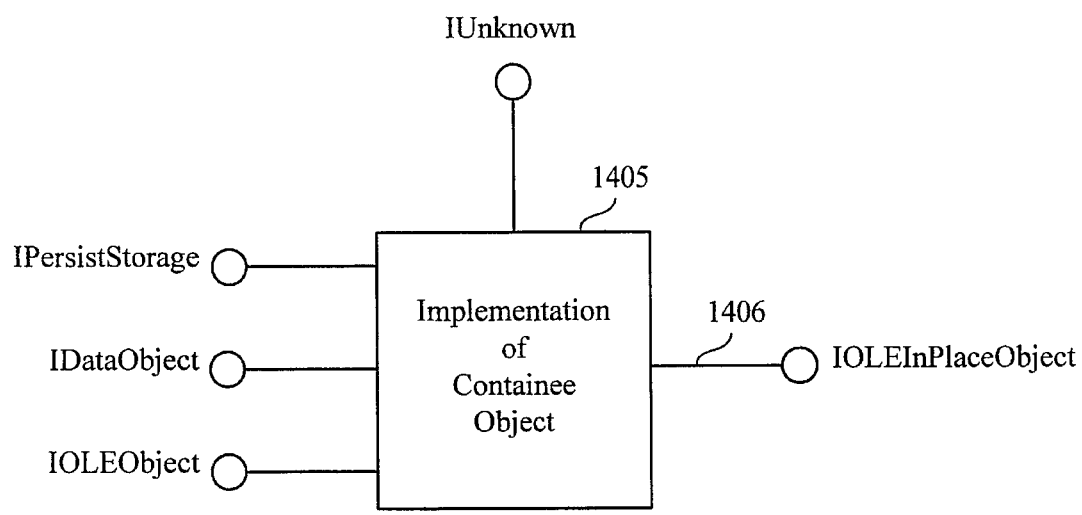

The in-place interaction API defines the following interfaces: IOLEWindow, IOLEInPlaceUIWindow, IOLEInPlaceFrame, IOLEInPlaceParent, and IOLEInPlaceObject. The IOLEWindow interface provides a method for retrieving the window handle associated with one of the other interfaces. The IOLEInPlaceUIWindow interface provides methods through which a server application negotiates with a container application for placement of window tools. The IOLEInPlaceFrame interface provides methods through which a server application communicates with the frame window of a container application. The IOLEInPlaceParent interface provides methods through which a server application communicates with the parent window of a container application. The IOLEInPlaceObject interface provides methods through which a container application activates and deactivates a server application. FIG. 14B is a block diagram showing the public interfaces required to support in-place interaction. The container object 14B01 supports the IOLEUIWindow interface 14B02, the IOLEInPlaceParent interface 14B03, and the IOLEInPlaceFrame interface 14B04. The containee object 14B05 supports the IOLEInPlaceObject interface 14B06. Each of these interfaces is described below in detail.

4.1 IOLEWindow Interface

Table 2 lists the IOLEWindow interface. In object-oriented parlance, the IOLEWindow interface is the "base class" for the other in-place interaction interfaces. Thus, the other interfaces are derived from the IOLEWindow interface and inherit its public methods. In the IOLEWindow interface there is only one public method called GetWindow.

TABLE 2

```
interface IOLEWindow: public IUnknown {public:
    virtual SCODE GetWindow (HWND FAR *phwnd) = 0;
}
```

4.1.1 IOLEWindow::GetWindow

The GetWindow method retrieves the window handle (unique window identifier) corresponding to the IOLEInPlaceUIWindow, IOLEInPlaceFrame, IOLEInPlaceParent, or IOLEInPlaceObject interface from which it was invoked. The retrieved window handle is typically used when invoking underlying window system functions.

4.2 IOLEInPlaceUIWindow Interface

Table 3 lists the IOLEInPlaceUIWindow interface. The IOLEInPlaceUIWindow interface methods are invoked by a server application to negotiate tool placement within the document and pane windows of a container application.

TABLE 3

```
interface IOLEInPlaceUIWindow: public IOLEWindow {public:
    virtual SCODE GetBorder (RECT borderRect) = 0;
    virtual SCODE QueryBorderSpace (RECT widthRect) = 0;
    virtual SCODE SetBorderSpace (RECT widthRect) = 0;
}
```

4.2.1 IOLEInPlaceUIWindow::GetBorder

The GetBorder method retrieves the location where the server application is allowed to place its tools (which are implemented as child windows). This method returns a rectangle located inside the frame of either a document or pane window, depending upon whether the document or pane interface was invoked. Once the server application has retrieved this rectangle, it can determine the width of space it needs to place any tools and can then request this space using the QueryBorderSpace method. If the rectangle returned by the container application is rejected, the server application can choose not to continue with activation in place or can choose to not activate its tools.

4.2.2 IOLEInPlaceUIWindow::QueryBorderSpace

The QueryBorderSpace method retrieves the designated amount of space in a pane or document window where the server application can place its tools. The method takes one parameter, a rectangle of border space, within the rectangle retrieved from a previous call to GetBorder, that the server application needs for its tool placement. The method returns an indication as to whether the document or pane window is able to accommodate the request. If the request cannot be accommodated, the server application can invoke the method again with a different rectangle, can choose not to continue activation in place, or can choose to not activate its tools.

4.2.3 IOLEInPlaceUIWindow::SetBorderSpace

The SetBorderSpace method informs its associated container application that it is actually allocating the designated space in the pane or document window to place the server application's tools. This method is called after the space has been successfully requested from the pane or document window in a previous call to QueryBorderSpace. The server application is responsible for allocating the space it needs. The method takes one parameter, the rectangle of space the server application is allocating to its tool child window. The designated rectangle may be smaller than that successfully previously requested. The term "designated" refers to a passed in parameter and "specified" refers to the interface, class, window, or object to which a particular method belongs. The method moves or sizes, as necessary, any of the specified pane or document window user interface resources.

4.3 IOLEInPlaceFrame Interface

Table 4 lists the IOLEInPlaceFrame interface. The IOLEInPlaceFrame interface provides methods invoked by a server application to communicate with the frame window of its container application.

TABLE 4

```
interface IOLEInPlaceFrame: public
IOLEInPlaceUIWindow {public:
    virtual SCODE SetMenu (HANDLE hSharedMenu,
      HWND hwndObject) = 0;
    virtual SCODE InsertMenus (HANDLE hmenu,
      UINT FAR *lpiMenuCounts) = 0;
    virtual SCODE RemoveMenus (HANDLE hmenu) = 0;
    virtual SCODE SetStatusText (LPSTR lpszStatusText) = 0;
    virtual SCODE EnableModeless (BOOL fEnable) = 0;
    virtual SCODE TranslateAccelerator
      (LPMSG lpmsg, WORD WID) = 0;
}
```

4.3.1 IOLEInPlaceFrame::SetMenu

Figure 15:
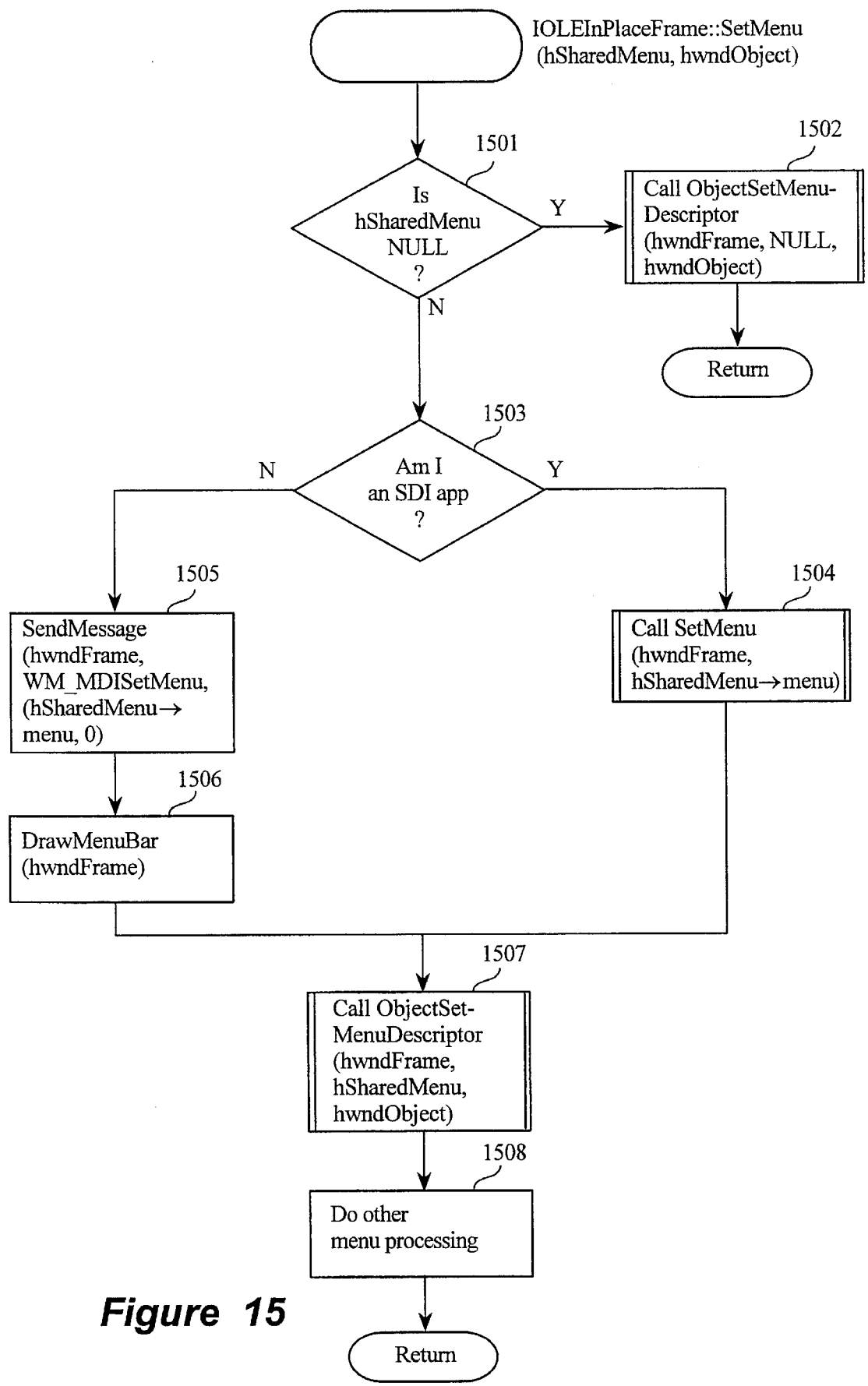
FIG. 15 is a flow diagram of an implementation of the IOLEInPlaceFrame::SetMenu method.

The SetMenu method installs and removes the designated composite menu bar as the menu bar of the container application and installs a message handler for the composite menu bar. FIG. 15 is a flow diagram of an implementation of the IOLEInPlaceFrame::SetMenu method. This method uses different mechanisms to install the composite menu bar depending upon whether the container application is an MDI or SDI application. In step 1501, the method determines whether the designated composite menu bar is NULL and, if so, continues at step 1502, else continues at step 1503. In step 1502, the method invokes the helper function ObjectSetMenuDescriptor to remove the message handler for the composite menu bar, and returns. In step 1503, the method determines whether the container application is an SDI application, and if it is, continues at step 1504, else continues at step 1505. In step 1504, the method invokes the underlying window system function SetMenu to install the composite menu bar as the menu bar of the container application frame window, and then it continues at step 1507. In step 1505, the method sends a message to the frame window telling it to perform its MDI menu setup. In step 1506, the method invokes the underlying window system function DrawMenuBar to redraw the menu bar. In step 1507, the method invokes the helper function ObjectSetMenuDescriptor to install the message handler for the composite menu bar. In step 1508, the method performs any other processing that may be required at the time of changing its menu bar and then returns.

4.3.2 IOLEInPlaceFrame::InsertMenus

CODE TABLE 1

```
VOID IOleInPlaceFrame::InsertMenus (hmenu, ContrCounts) {
1    if there are File Group menus present {
2        for each filegroupmenu {
3            hfilemenu = CreateMenu ( );
4            InsertMenu (hmenu, MF_APPEND, MF_BYPOSITION|MF_POPUP, hfilemenu);
5            ContrCounts[0] = ContrCounts[0] + 1;
6            for each filegroupmenu_item {
7                InsertMenu (hfilemenu, MF_APPEND, MF_BYPOSITION|MF_STRING,
8                        item_id, "string to be displayed");
9            }
10       };
11   if there are Container Group menus present {
12       for each containergroupmenu {
13           hcontmenu = CreateMenu ( );
14           InsertMenu (hmenu, MF_APPEND, MF_BYPOSITION|MF_POPUP, hcontmenu);
15           ContrCounts[1] = ContrCounts[1] + 1;
16           for each contgroupmenu_item {
17               InsertMenu (hcontmenu, MF_APPEND, MF_BYPOSITION|MF_STRING,
18                       item_id, "string to be displayed");
19           }
20       };
21   if there are Window Group menus present {
22       for each windowgroupmenu {
23           hwndmenu = CreateMenu ( );
24           InsertMenu (hmenu, MF_APPEND, MF_BYPOSITION|MF_POPUP, hwndmenu);
25           ContrCounts[2] = ContrCounts[2] + 1;
26           for each wndgroupmenu_item {
27               InsertMenu (hwndmenu, MF_APPEND, MF_BYPOSITION|MF_STRING,
28                       item_id, "string to be displayed");
29           }
30       };
31   return( );
}
```

The InsertMenus method inserts the menus of the container application into the composite menu bar being created by the server application. Code Table 1 shows pseudo-code for an implementation of the IOLEInPlaceFrame::InsertMenus method. The method takes two parameters: a composite menu bar and an array of menu counts. For each of the menu groups represented by the menus of the container application, there is a loop which inserts the menus for that group. In lines 1–10, if there are any File group menus, then the method inserts these menus in the composite menu bar, and increments the menu count array at the index corresponding to the File group. (For example, index=0 if the menu bar presented in the example of FIG. 4 is used.) In lines 11–20, if there are any Container group menus, the method inserts these menus into the composite menu bar and increments the menu count array at the index corresponding to the Container group. Finally, in lines 21–30, if there are any Window group menus to be added, the method inserts these menus into the composite menu bar and. then increments the menu count array at the index corresponding to the Window group. At the completion of this method, the value stored at each index in the menu count array indicates the number of menus that the container application inserted for that particular menu group. The method invokes standard functions from the underlying window system (CreateMenu and InsertMenu) to create the menus for the container application and to insert them in the composite menu bar.

4.3.3 IOLEInPlaceFrame::RemoveMenus

The RemoveMenus method allows the container application to remove its menus from the composite menu bar before the server application deallocates the composite menu bar. This method is invoked from the IOLEInPlaceObject::InPlaceDeactivate method. The RemoveMenus method takes one parameter: the handle of the composite menu bar where the container menus are stored. The composite menu bar is expected to be clear of all server menus before this method is invoked.

4.3.4 IOLEInPlaceFrame::SetStatusText

The SetStatusText method allows the server application to set the status window (if there is one) of the container application's frame window. Typically, the status window is located at the bottom of the frame window and contains status or hinting information corresponding to the current selection. The SetStatusText method is container application specific and will perform whatever operations the container application usually performs to set its status window. The method takes one parameter: the text string to insert in the status window.

4.3.5 IOLEInPlaceFrame::EnableModeless

The EnableModeless method enables or disables the currently displayed modeless dialog for the container application. A modeless dialog is an input window which is displayed until it is explicitly closed by the user. While this window is displayed, the user is able to interact with other windows. A modal dialog, on the other hand, is an input window which blocks out other window processing until the user enters acceptable input. This method is invoked by a server application when it wants to display a modal dialog, but and its associated container application is already displaying a modeless dialog.

Figure 16:
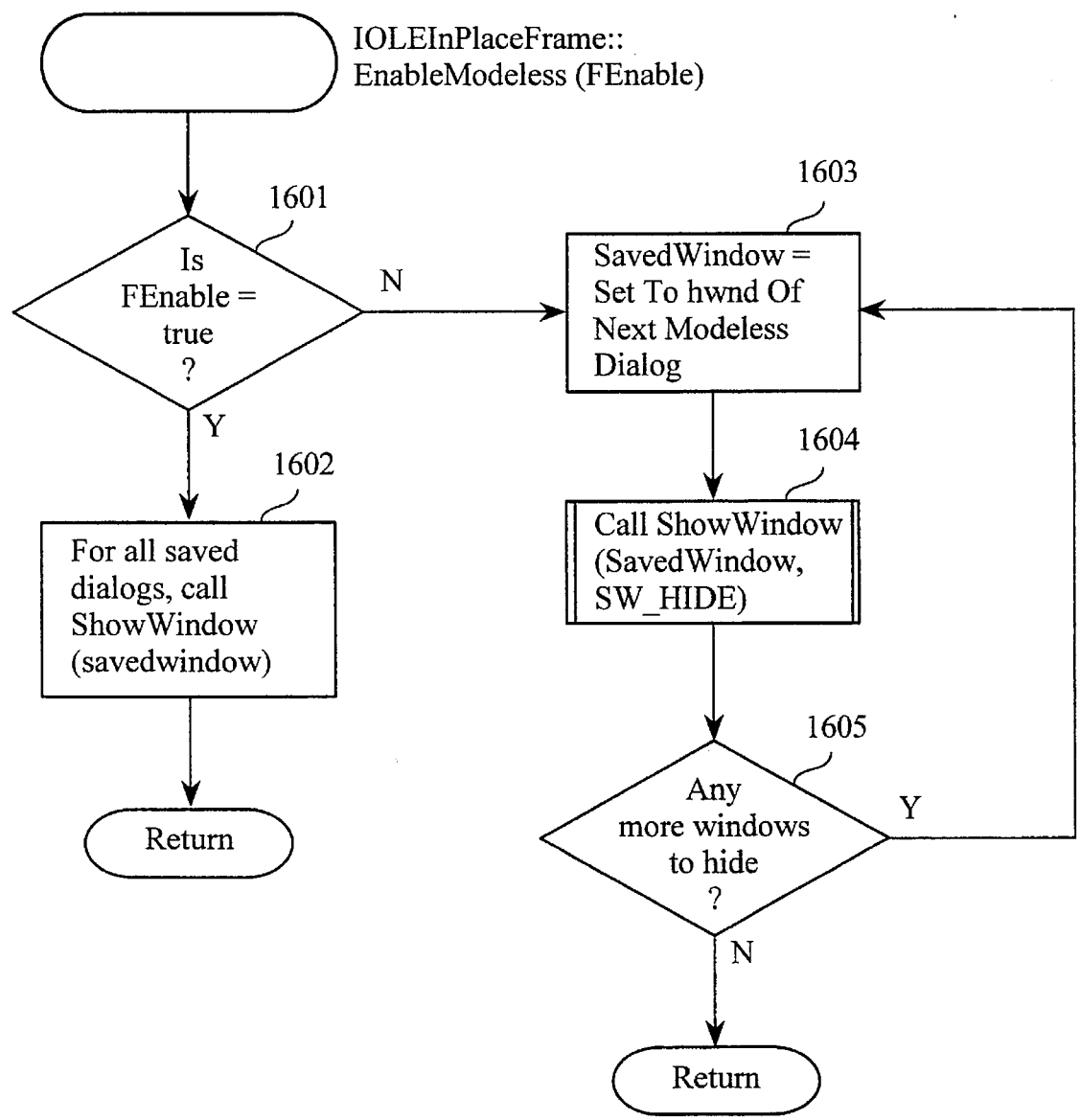
FIG. 16 is a flow diagram of an implementation of the IOLEInPlaceFrame::EnableModeless method.

FIG. 16 is a flow diagram of an implementation of the IOLEInPlaceFrame::EnableModeless method. This method hides the modeless dialog of the container application, and when called again restores the modeless dialogs. If the designated flag fEnable is true, then the hidden dialogs are displayed, otherwise any currently displayed modeless dialogs are hidden (removed from display, but in-memory data structures not deallocated). In step 1601, the method determines whether FEnable is true, and, if it is, continues at step 1602, else continues at step 1603. In step 1602, the method invokes an underlying window system function ShowWindow to restore the windows associated with the previously saved modeless dialogs, and then returns. In step 1603, the method saves the window handle of the next currently displayed modeless dialog. In step 1604, the method invokes an underlying window system function ShowWindow to hide the window associated with the modeless dialog. In step 1605, the function checks to see if there are any more modeless dialogs displayed, and, if there are, the function loops back to step 1603, otherwise the function returns.

4.3.6 IOLEInPlaceFrame::TranslateAccelerator

The TranslateAccelerator method allows a container application to process accelerator key combinations when a server application receives a keystroke it does not recognize. Accelerator key combinations are keyboard shortcuts for menu commands and are discussed further below. The TranslateAccelerator method is invoked indirectly by the function ObjectTranslateAccelerator which is called in the server application message pump. The container application should perform its normal accelerator processing and then return an indication of whether or not the accelerator was processed. This value is then passed on to the server application by the function ObjectTranslateAccelerator. Note that because the message has been transferred from the server application to the container application, the underlying window system may not have retained any additional key state or message information associated with the designated message.

4.4 IOLEInPlaceParent Interface

Table 5 lists the IOLEInPlaceParent interface. The IOLEInPlaceParent interface provides the methods invoked by the server application to communicate with the parent window. This window is also referred to as the in-place "container site" for the object.

TABLE 5 interface IOLEInPlaceParent:
public IOLEWindow {public:
    virtual SCODE CanInPlaceActivate ( ) = 0;
    virtual SCODE OnInPlaceActivate ( ) = 0;
    virtual SCODE OnUIActivate ( ) = 0;
    virtual SCODE OnUIDeactivate ( ) = 0;
    virtual SCODE OnDeactivate ( ) = 0;
    virtual SCODE ShadeBorder (LPRECT lprect,
    DWORD grfState) = 0;
    virtual SCODE GetWindowContext
    (IOLEInPlaceFrame *pFrame, IOLEInPlaceUIWindow
*pDoc, IOLEInPlaceUIWindow *pPane, LPRECT
lprectChildPosition, HANDLE *hAccelTable) = 0;
}

4.4.1 IOLEInPlaceParent::CanInPlaceActivate

The CanInPlaceActivate method is used by the server application to determine whether the container application supports in-place interaction. This method gives the container application a chance to accept or refuse the activation in place of a selected containee object. The method returns an indication of whether the container application is allowing in-place interaction.

4.4.2 IOLEInPlaceParent::OnInPlaceActivate

Figure 17:
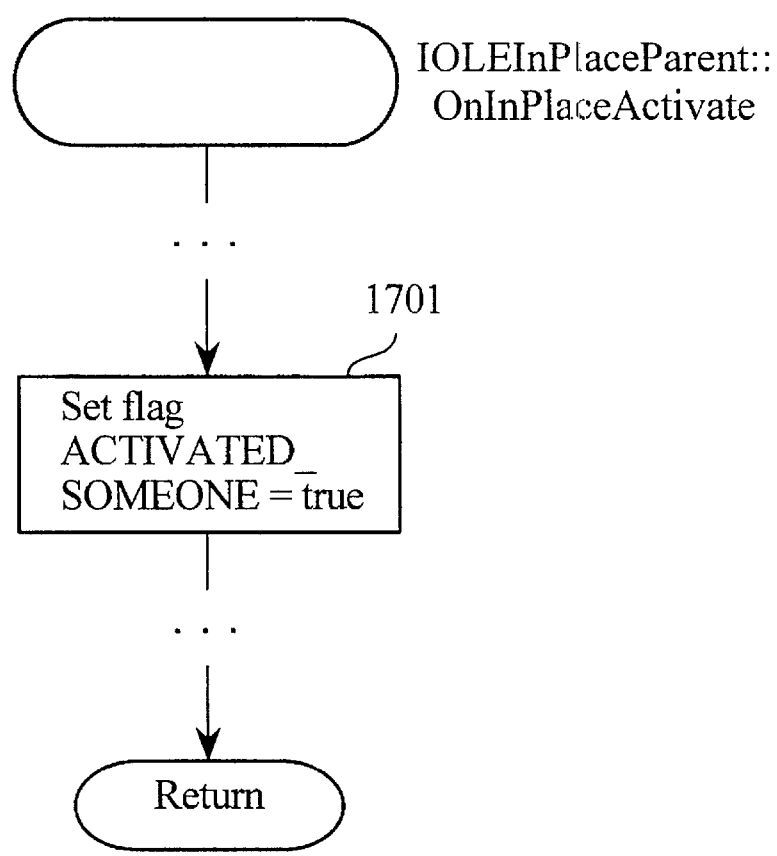
FIG. 17 is a flow diagram of an implementation of the IOLEInPlaceParent::OnInPlaceActivate method.

The OnInPlaceActivate method is invoked by a server application to give its container application a chance to perform any necessary operations before the server application creates the new composite menu bar (at activation time). FIG. 17 is a flow diagram of an implementation of the IOLEInPlaceParent:: OnInPlaceActivate method. In this implementation, the only operation performed is setting a flag in step 1701 indicating that a containee object has been activated. This information is used later, whenever the specified object's parent container object is asked to activate or deactivate. This flag tells the parent container application whether it needs to activate or deactivate an object contained within it (a nested object), instead of activating or deactivating its own user interface.

4.4.3 IOLEInPlaceParent::OnUIActivate

Figure 18:
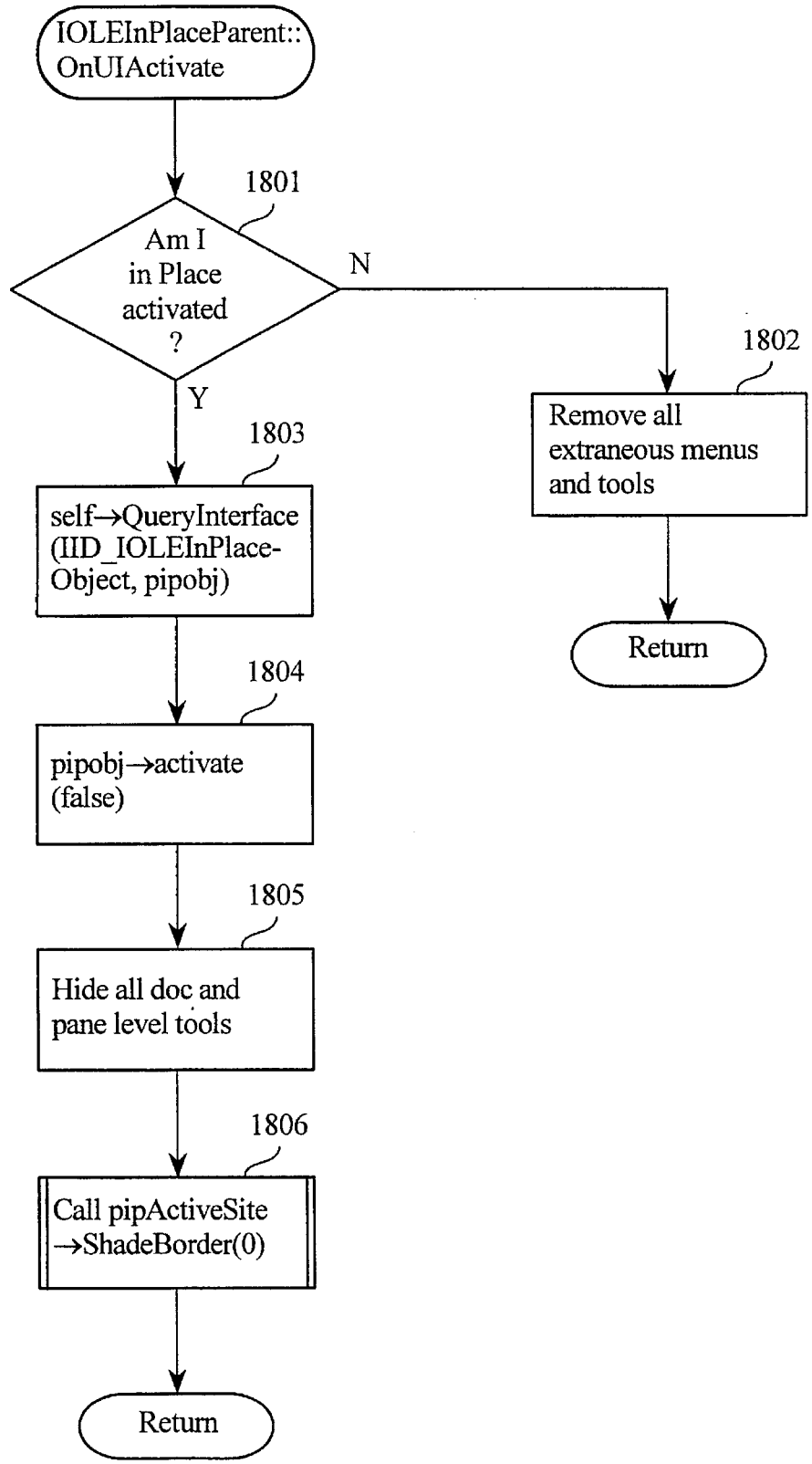
FIG. 18 is a flow diagram of an implementation of the IOLEInPlaceParent::OnUIActivate method.

The OnUIActivate method removes all of the container application menus and tools in preparation for activation of a containee object in place. FIG. 18 is a flow diagram of an implementation of the IOLEInPlaceParent::OnUIActivate method. The steps performed by the method depend on whether the container object is itself an object that has been activated in place. In step 1801, the method determines whether the container object has been activated in place. If it has not, the method continues at step 1802, else it continues at step 1803. In step 1802, because the container object is a top level container object (not activated in place), the method uses its normal procedure to remove the container application menus and any extraneous tools, and then returns. In step 1803, because the container object is also a containee object, the method retrieves the object's own IOLEInPlaceObject interface to access the methods that treat the container object as a containee object. In step 1804, the method invokes the activate method of the container object to deactivate itself. In step 1805, the method hides all of the container object's document and pane window level tools. In step 1806, the method invokes the shade border method of the parent container object to remove the in-place interaction user feedback from around the container object and returns. The container object's object window is actually deactivated at a later time (e.g., when the containee object deactivates).

4.4.4 IOLEInPlaceParent::OnUIDeactivate

Figure 19:
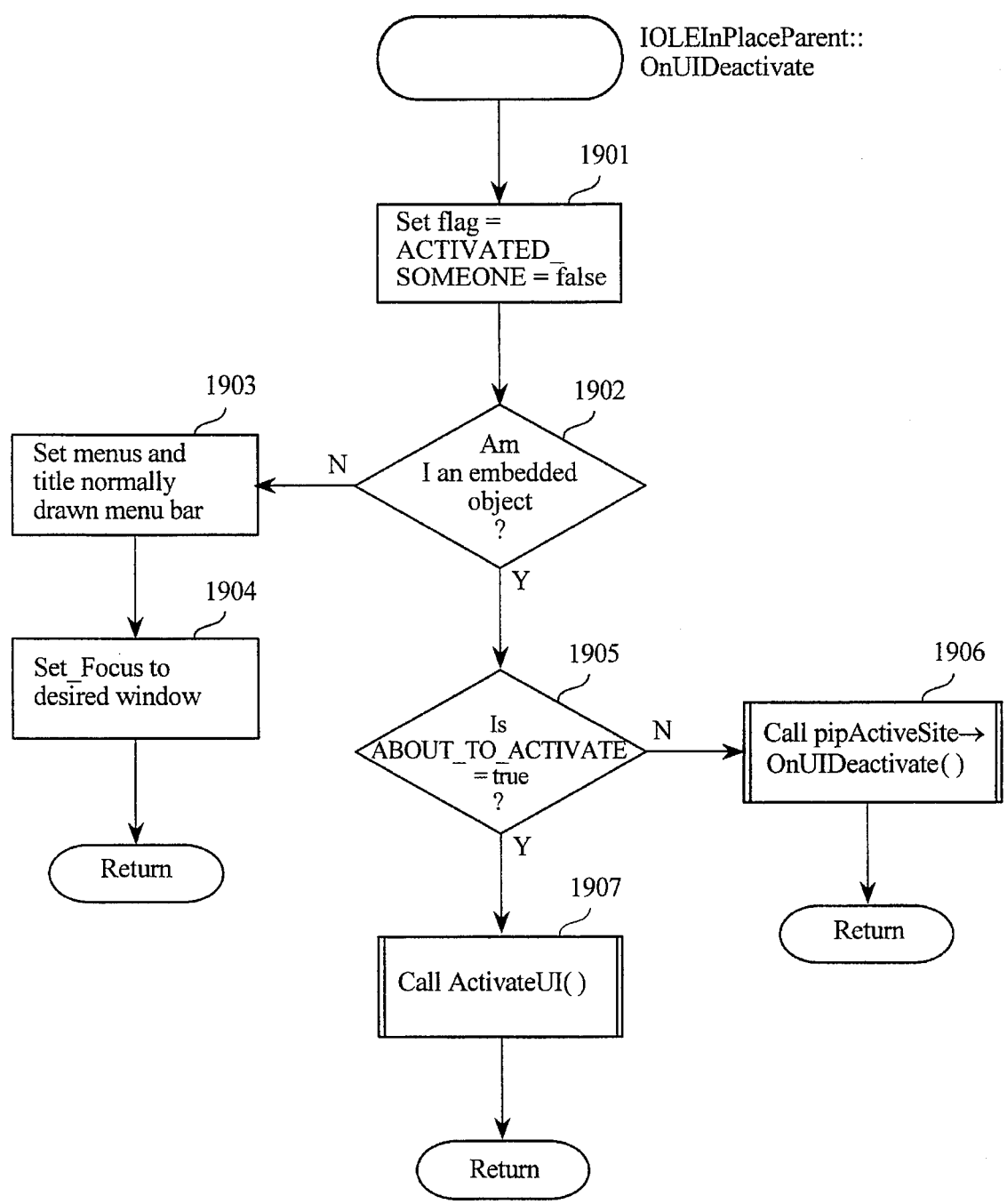
FIG. 19 is a flow diagram of an implementation of the IOLEInPlaceParent::OnUIDeactivate method.

The OnUIDeactivate method is invoked by a server application at the erid of deactivating its user interface resources to allow its parent container application to either activate its own user interface or invoke its parent container application to allow the parent container application to activate its user interface. FIG. 19 is a flow diagram of an implementation of the IOLEInPlaceParent::OnUIDeactivate method. This method provides two different behaviors depending upon whether the container object is itself a containee object or is a top level container object. In the former case, if this container is to become the new object activated in place, then its own user interface is activated, otherwise the container requests its parent container application to activate its user interface. In the latter case, the container application restores its user interface using normal procedures. In step 1901, the method clears the flag indicating that the container application has activated a .containee object. In step 1902, the method determines whether the specified container object is a containee object, and if it is not, continues at step 1903, else continues at step 1905. In step 1903, the method sets the container application menus and its title bar using normal procedures, and continues in step 1904 to set the input focus to the desired window, and returns. The input focus is set to a particular window when that window is to receive keyboard input. In step 1905, the method examines the flag ABOUT_TO_ACTIVATE to determine whether the container object is about to become the activated object, and if it is not, continues at step 1906, else continues at step 1907. (The ABOUT_TO_ACTIVATE flag is set when the container application is selected by the user, e.g., in the Process_Mouse_LButtonUp function discussed in detail below.) In step 1906, the method invokes the IOLEInPlaceParent::OnUIDeactivate method of the container object to activate the user interface of the container application of the parent container object, and returns. In step 1907, the method invokes function ActivateUI to activate the user interface of the container application, and returns.

4.4.5 IOLEInPlaceParent::OnDeactivate

The OnDeactivate method is invoked by the server application to give its associated container application a chance to free any resources or set flags associated with the activated containee object before the containee object is fully deactivated. The method is invoked from the OLEInPlaceObject::InPlaceDeactivate method of the containee object.

4.4.6 IOLEInPlaceParent::ShadeBorder

The ShadeBorder method draws or removes a hatched pattern border from around the selected, or about to be deselected, containee object. The hatched pattern border is used to give the user feedback that the containee object has been activated in place. This method can invoke the helper object linking and embedding API function ObjectShade to create the proper shading pattern. The method takes two parameters: a rectangle surrounding the object where the border should be placed and a set of flags. The set of flags indicates whether the border should be on (SHADEBORDER_ON=1) or off and whether the border should be drawn in the same color as the text contained in the title bar of the active window (SHADEBORDER_ACTIVE=1) or the same color as disabled text. The active window is the window that has input focus.

4.4.7 IOLEInPlaceParent::GetWindowContext

The GetWindowContext method returns the set of container application interfaces associated with a particular containee object. Specifically, it returns the following parameters:

pFrame, which is a pointer to an IOLEInPlaceFrame interface;

pDoc, which is a pointer to an IOLEInPlaceUIWindow interface;

pPane, which is a pointer to an IOLEInPlaceUIWindow interface;

lprectChildPosn, which is a pointer to the location where the associated IOLEInPlaceParent instance will display the object window of the object within the parent window; and hAccelTable, which is a handle to the container application's accelerator table (described below).

These values are used by the server application to negotiate and handle activation and deactivation. This method creates and associates instances of these interfaces with the relevant frame, document, pane, and parent windows of the container application.

4.5 IOLEInPlaceObject Interface

Table 6 lists the IOLEInPlaceObject interface. The IOLEInPlaceObject interface methods are invoked by a container application to activate and deactivate a contained object. Some of these methods access contained objects in a nested fashion, through the containment hierarchy. Others access only the current active object, which is the containee object displaying the editing menus. An alternative implementation would split this interface into two others: one to access only the active object and another to access a containee object through the containment hierarchy.

TABLE 6

```
interface IOLEInPlaceObject: public IOLEWindow {public:
    virtual SCODE InPlaceDeactivate ( ) = 0;
    virtual SCODE InPlaceUIDeactivate ( ) = 0;
    virtual SCODE TranslateAccelerator (LPMSG lpmsg) = 0;
    virtual SCODE Activate (BOOL fActivate,
    BOOL fDocActivate) = 0;
    virtual SCODE ResizeBorder (RECT borderRect) = 0;
    virtual SCODE EnableModeless (BOOL fEnable) = 0;
    virtual SCODE SetVisRect (LPRECT lprect) = 0;
}
```

4.5.1 IOLEInPlaceObject::InPlaceDeactivate

Figure 20:
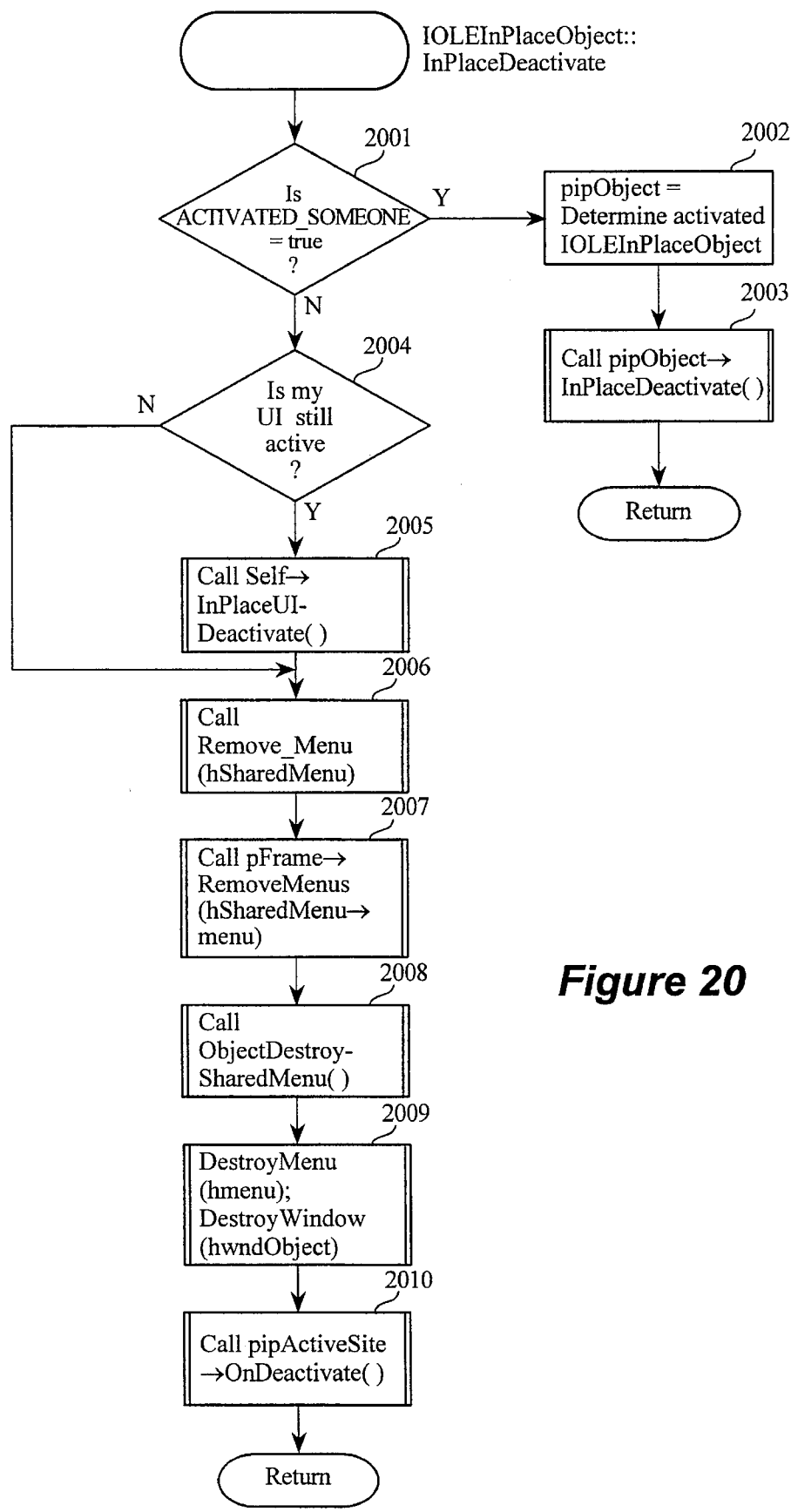
FIG. 20 is a flow diagram of an implementation of the IOLEInPlaceObject::InPlaceDeactivate method.

The InPlaceDeactivate method is invoked by a container application to completely deactivate a containee object after an "undo" operation no longer needs to access the containee object and before the container application closes. This method performs the final deallocation of any resources associated with the activation of the containee object in place. FIG. 20 is a flow diagram of an implementation of the IOLEInPlaceObject:: InPlaceDeactivate method. The method first determines whether it has activated a (nested) object contained within it, and if it has, it invokes the nested object's InPlaceDeactivate method. Otherwise, the object deactivates itself. In step 2001, the method determines whether the specified object is also a container object and has activated a nested containee object. If it has, the method continues at step 2002, else it continues at step 2004. In step 2002, the method retrieves the IOLEInPlaceObject interface of the activated containee object (which the server application of the specified object has previously stored), and in step 2003 invokes IOLEInPlaceObject::InPlaceDeactivate method of the retrieved interface, and then returns. In step 2004, the method checks to see whether the specified object's user interface is still active, and if it is, continues at step 2005, else continues at step 2006. In step 2005, the method invokes the specified object's InPlaceUIDeactivate method to deactivate its own user interface, and then continues at step 2006. In step 2006, the method invokes a server application function Remove_Menus to remove the server application menus from the composite menu bar. In step 2007, the method invokes the IOLEInPlaceFrame::RemoveMenus method of the specified object's container object to allow the parent container application to remove its menus from the composite menu bar. In step 2008, the method invokes the object linking and embedding API function ObjectDestroySharedMenu to deallocate the structure for the composite menu bar. The ObjectDestroySharedMenu function is window system specific and invokes whatever underlying window system functions are necessary to deallocate structures associated with a composite menu bar. In step 2009, the method invokes the underlying window system function DestroyMenu to deallocate the composite menu bar structure and to deallocate the window associated with the specified object. Finally, in step 2010, the method invokes the IOLEInPlaceParent:: OnDeactivate method of the specified object's container object, and returns.

4.5.2 IOLEInPlaceObject::InPlaceUIDeactivate

Figure 21:
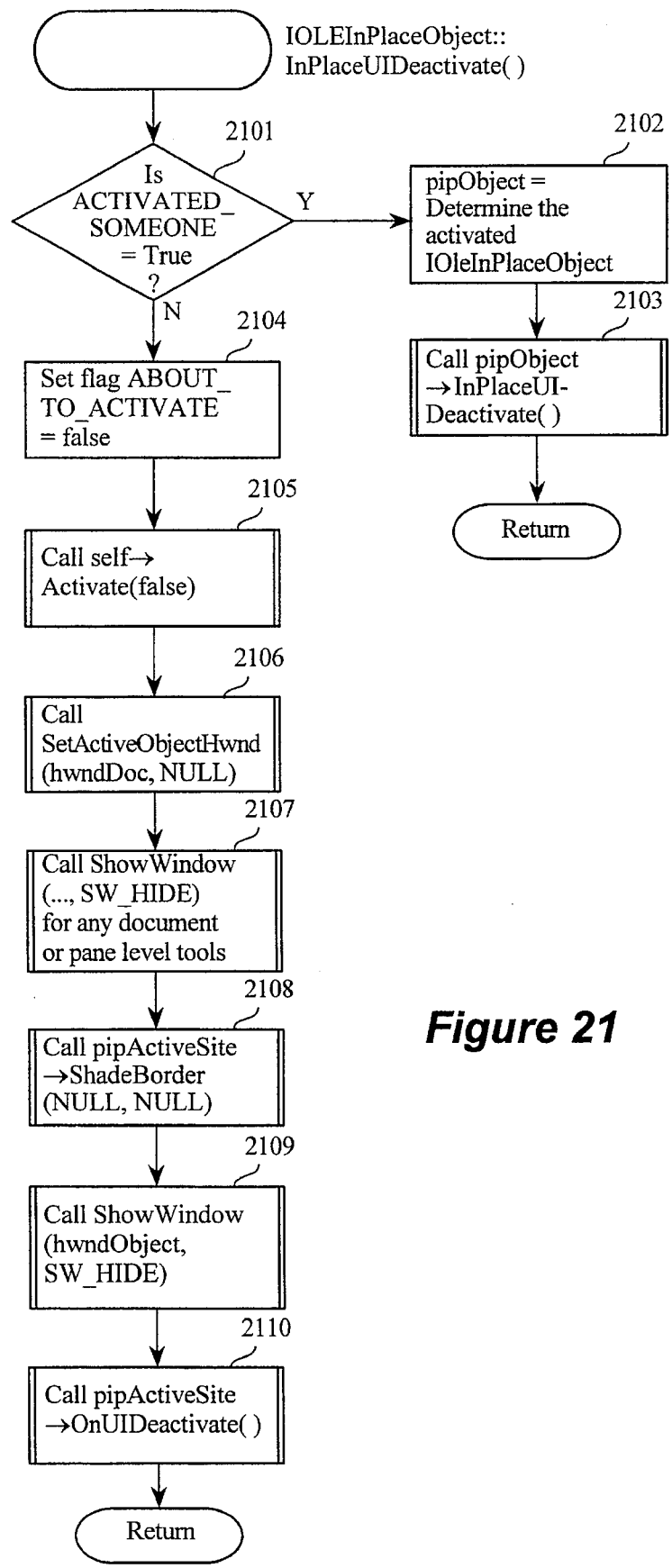
FIG. 21 is a flow diagram of an implementation of the IOLEInPlaceObject::InPlaceUIDeactivate method.

The InPlaceUIDeactivate method hides all of the user interface elements associated with the specified object that has been activated in place. This method is invoked either by the container application when it processes the user selection of a different object or area within the compound document, or from the specified object's InPlaceDeactivate function if the specified object's user interface has not yet been deactivated (See FIG. 20). FIG. 21 is a flow diagram of an implementation of the IOLEInPlaceObject::InPlaceUIDeactivate method. This method first determines whether the specified object is a container object and has activated a nested object, and if so invokes the nested object's InPlaceUIDeactivate function. Otherwise, the method hides its own user interface and informs its container application that it has deactivated its user interface. In step 2101, the method determines whether the flag indicating that a nested containee object has been activated in place is true, and if so, continues at step 2102, else continues at step 2104. In step 2102, the method retrieves the IOLEInPlaceObj ect interface for the activated nested containee object, and in step 2103 invokes the nested containee object's InPlaceDeactivate method, and returns. In step 2104, the method clears the flag ABOUT_TO_ACTIVATE to indicate that the user has selected a different object. In step 2105, the method invokes the specified object's Activate method sending it a parameter of false to request the method to deactivate. This method removes all of the specified object's user interface elements that were associated with the parent container application frame window. In step 2106, the method invokes the object linking and embedding API function SetActiveObjectHwnd to remove the specified object's IOLEInPlaceObject interface from its association with the parent container application document window. This means that if the container application is an MDI application, and if the user later selects this document window, the specified object will no longer be reactivated in place. In step 2107, the method uses an underlying window system function to hide any user interface elements belonging to the server application that were associated with the parent container application's pane or document window. In step 2108, the method invokes the IOLEInPlaceParent:: ShadeBorder method of the specified object to remove the hatched border pattern feedback from around the deactivating object. In step 2109, the method invokes an underlying window system function to hide the window associated with the specified object. Finally, in step 2110, the method invokes the IOLEInPlaceParent::OnUIDeactivate method to allow the container application to install its own user interface, and returns.

4.5.3 IOLEInPlaceObject::TranslateAccelerator

The TranslateAccelerator method allows a server application to process accelerator key combinations before the container application has a chance to process them. Accelerator key combinations are keyboard shortcuts for menu commands and are discussed further below. In a preferred embodiment of the present invention, the object activated in place, by convention, processes accelerator key combinations first. The Translate Accelerator method is invoked by the container application in its message pump (see Code Table 9). The only operation required to be performed by this method is to invoke the underlying window system function TranslateAccelerator with the specified server application accelerator table. Such invocation is not necessary if the containee object is implemented by a separate executable process, because the separate process receives these key combinations in its own message pump and the container application never receives them. In that case, the TranslateAccelerator method will do nothing.

4.5.4 IOLEInPlaceObject::Activate

Figure 22:
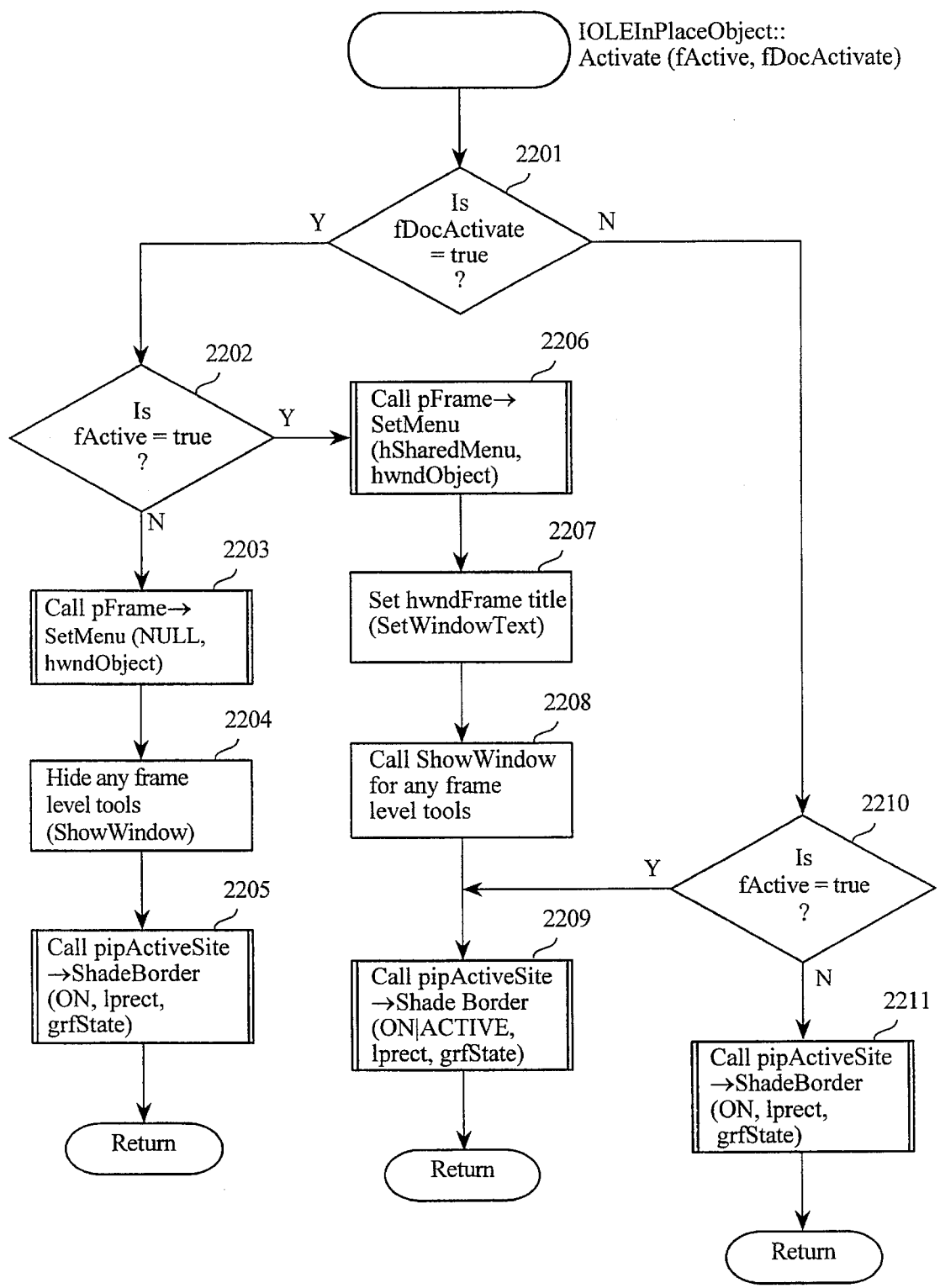
FIG. 22 is a flow diagram of an implementation of the IOLEInPlaceObject::Activate method.

The Activate method activates or deactivates the user interface elements installed in the frame window of the parent container application depending upon whether the designated flag fActive is true. or false. If called when an MDI document window is activated or deactivated, this method installs or removes the composite menu bar associated with the object activated in place and puts a hatched border pattern around the specified object if it is being activated. If called when the top level frame window is activated or deactivated, this method places a hatched border pattern around the specified object if it is being activated, otherwise removes it. In this case there is no need to activate or deactivate other user interface elements. FIG. 22 is a flow diagram of an implementation of the IOLEInPlaceObject::Activate method. In step 2201, the method determines whether it has been called as a result of activating or deactivating the top level frame window or an MDI (child) document window. If called as a result of activating or deactivating an MDI document window, the method continues at step 2202, else continues at step 2210. In step 2202, the method determines whether the specified object is to be activated, and if it is not, continues at step 2203, else it continues at step 2206. In step 2203, the method invokes the IOLEInPlaceFrame::SetMenu method of the parent container object to remove the composite menu bar associated with activation of the specified object in place. In step 2204, the method hides any user interface elements installed in the parent container application frame window. In step 2205, the method invokes the IOLEInPlaceParent::ShadeBorder method of the parent container object to remove the hatched border pattern from around the specified object, and returns. In step 2206, the method invokes the IOLEInPlaceFrame::SetMenu method of the parent container object to install the composite menu bar as the menu bar of the associated frame window. In step 2207, the method sets the title bar of the frame window of the container application to indicate that the container application has activated the specified object. In step 2208, the method invokes an underlying window system function to display any frame level user interface elements. In step 2209, the method invokes the IOLEInPlaceParent::ShadeBorder method of the parent container object to draw a hatched border pattern around the specified object, indicating that it has been activated in place, and returns. In step 2210, the method determines whether the specified object is to be activated, and if it is, continues at step 2209, else it continues at step 2211. in step 2211, the method removes the hatched border pattern from around the specified object, and returns.

4.5.5 IOLEInPlaceObject::ResizeBorder

The ResizeBorder method is called by the container application to request the server application to resize the user interface tools the server application has placed within the pane or document windows of its parent container application. In response to invocation of this method, the server application should begin another tool placement negotiation loop with the container application using the QueryBorderSpace and SetBorderSpace methods of the interface instance associated with the pane or document window.

4.5.6 IOLEInPlaceObject::EnableModeless

The EnableModeless method enables or disables the currently displayed modeless dialog for the server application. Typically, this method is implemented in a manner analogous to the IOLEInPlaceFrame::EnableModeless method, which is discussed above with reference to FIG. 16.

4.5.7 IOLEInPlaceObject::SetVisRect

The SetVisRect method is called by the innermost level container object to communicate the amount of the object actually visible. The visible (clipping) rectangle of the object may have changed, for example, due to border negotiation, scrolling, or sizing. The designated rectangle is the clipping rectangle and it is the server application's responsibility to resize the containee object window to the correct (clipped) visible size.

4.6 Other Server Application Functions

In a preferred embodiment, a server application provides the following set of functions: ActivateUI, CreateNewMenu, CreateObjectToolbars, and RemoveMenus. These functions are shared by multiple server application interfaces including IOLEInPlaceObject and IOLEObject.

4.6.1 ActivateUI

SCODE ActivateUI (IOLEInPlaceUIWindow *pDoc, IOLEInPlaceObject pObject)

Figure 23:
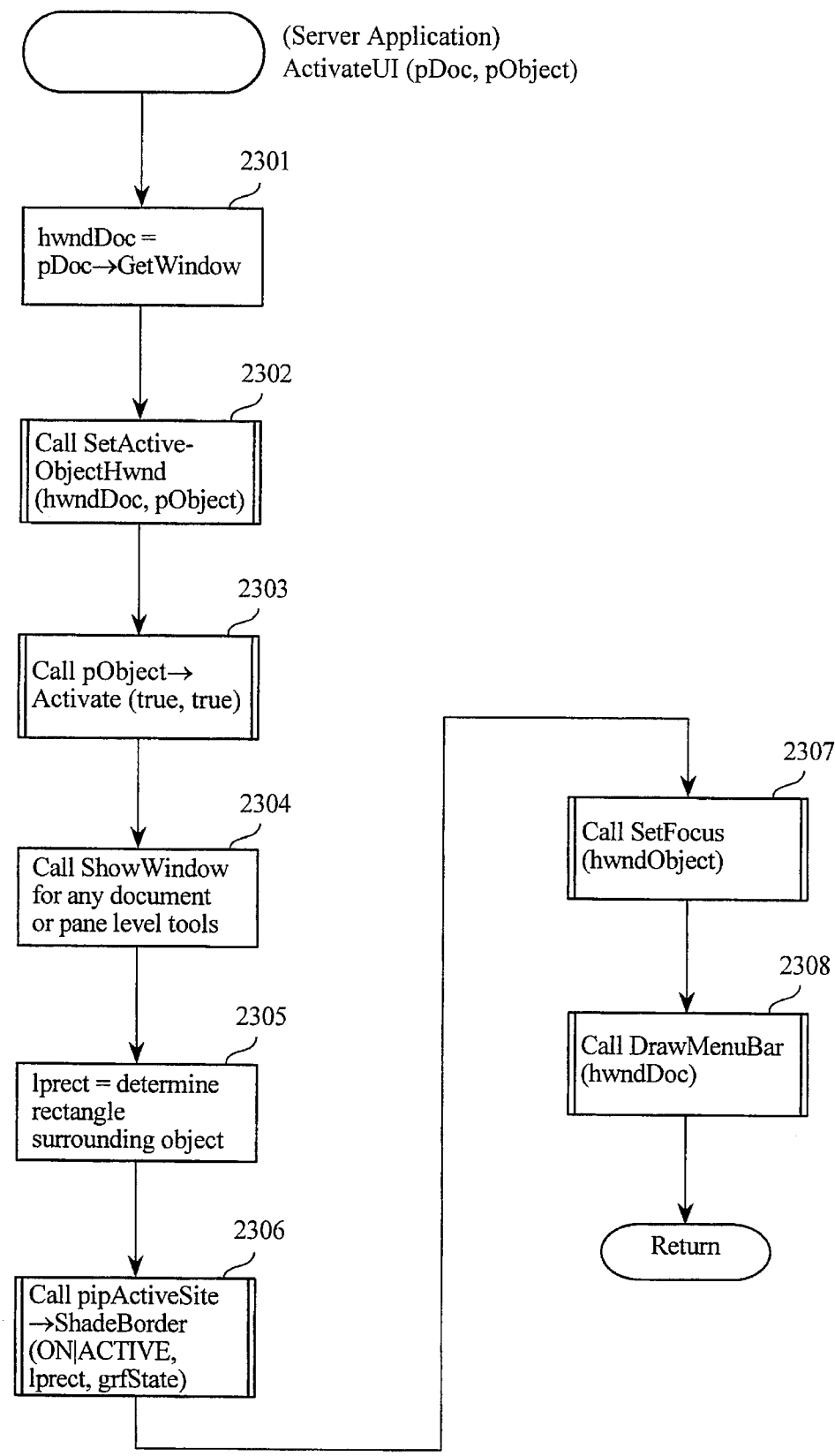
FIG. 23 is a flow diagram of an implementation of the ActivateUI function.

The ActivateUI function is a function implemented by a server application to control activation of the designated containee object's user interface resources. This high level function activates the frame, document, and pane level user interface elements, draws the hatched border pattern around the object, and displays the composite menu bar. FIG. 23 is a flow diagram of an implementation of the ActivateUI function. The function takes two parameters: a pointer to a document interface and a pointer to a containee object. In step 2301, the function gets the window handles for the designated document window and the designated containee object. In step 2302, the function invokes the object linking function invokes the underlying window system function DrawMenuBar to redisplay the composite menu bar, and returns.

4.6.2 CreateNewMenu

HANDLE CreateNewMenu (IOLEInPlaceFrame *pFrame)

CODE TABLE 2

```
HANDLE CreateNewMenu (IOLEInPlaceFrame *pFrame) {
1       hmenu = CreateMenu ( );
2       pframe -> InsertMenus (hmenu, ContrCounts);
3       lpiMenuCount[0] = ContrCount[0];
4       lpiMenuCount[2] = ContrCount[1];
5       lpiMenuCount[4] = ContrCount[2];
6       if there are Edit group menus present {
7            for each editgroupmenu {
8                 heditmenu = CreateMenu ( );
9                 insertion_point = lpiMenuCount[0] + lpiMenuCount[1] + 1;
10                InsertMenu (hmenu, insertion_point, MF_BYPOSITION|MF_POPUP,
11                     heditmenu, NULL);
12                lpiMenuCount[1] = lpiMenuCount[1] + 1;
13                for each editgroupmenu_item {
14                     InsertMenu (heditmenu, -1, MF_BYPOSITION|MF_STRING, item_id,
15                          "string to be displayed");
16                }
17           };
18      if there are Object group menus present {
19           for each objectgroupmenu {
20                hobjmenu = CreateMenu ( );
21                insertion_point = lpiMenuCount[0]+ lpiMenuCount[1] + lpiMenuCount[2]
+
22                          lpiMenuCount[3] + 1;
23                InsertMenu (hmenu, insertion_point, MF_BYPOSITION|MF_POPUP,
24                     hobjmenu, NULL);
25                lpiMenuCount[3] = lpiMenuCount[3] + 1;
26                for each objectgroupmenu_item {
27                     InsertMenu (hobjmenu, -1, MF_BYPOSITION|MF_STRING, item_id,
28                          "string to be displayed");
29                }
30           };
31      if there are Help group menus present {
32           for each helpgroupmenu {
33                hhelpmenu = CreateMenu ( );
34                InsertMenu (hmenu, -1, MF_BYPOSITION |MF_POPUP, hhelpmenu,
35                     NULL);
36                lpiMenuCount[5] = lpiMenuCount[5] + 1;
37                for each objectgroupmenu_item {
38                     InsertMenu (hhelpmenu, -1, MF_BYPOSITION|MF_STRING,
item_id,
39                          "string to be displayed");
40                }
41           };
42      hSharedMenu = ObjectCreateSharedMenu (hmenu, lpiMenuCount);
43      return (hSharedMenu);
}
``` and embedding API function SetActiveObjectHwnd to set the designated document window's currently active object to a pointer to the interface of the containee object. This enables a container application implemented as an MDI application to activate the proper containee object when one of its document windows is selected by the user. In step 2303, the function invokes IOLEInPlaceObject::Activate method to activate the designated object. In step 2304, the function invokes the underlying window system function ShowWindow to display any user interface elements associated with the container application pane or document windows. In step 2305, the function determines the dimensions of a border or rectangle to surround the designated containee object, and, in step 2306, the function invokes the IOLEInPlaceObject::ShadeBorder method of the designated containee object to draw a hatched border pattern around the designated containee object using this rectangle. In step 2307, the function sets the input focus to the object window of the designated containee object. Finally, in step 2308, the The CreateNewMenu function is a function implemented by a server application to manage the creation of a composite menu bar. This function allocates the structures associated with the composite menu bar, requests the container application to insert its menus, and inserts the server application menus. Code Table 2 represents an implementation of the CreateNewMenu function. In line 1, the function invokes an underlying window system function to create the data structure for the composite menu bar. In line 2, the function invokes the IOLEInPlaceFrame::InsertMenus method of the container application frame window to insert the container application menus into the composite menu bar. In lines 3–5, the function tracks the number of menus the container application inserted for each menu group. In lines 6–17, assuming the server application has Edit group menus, the function creates each Edit group menu and inserts it into the correct spot in the composite menu bar, keeping track of how many menus it inserted. The correct spot is calculated in line 9 by determining how many menus have already been inserted to the left. For the Edit group, this will be the number of menus the container application inserted as part of the Container Group plus the number of Edit group menus already inserted, plus one for the current insertion. In lines 18–30, 31–41, the function performs analogous steps for any menus belonging to the Object group and Help group respectively. In line 42, the function invokes the object linking and embedding API function ObjectCreateSharedMenu to create the data structure associated with message handling for the composite menu bar and, in line 43, returns a handle to this structure.

4.6.3 CreateObjectToolbars void CreateObjectToolbars (IOLEInPlaceFrame *pFrame, IOLEInPlaceUIWindow *pDoc, IOLEInPlaceUIWindow *pPane)

Figure 24:
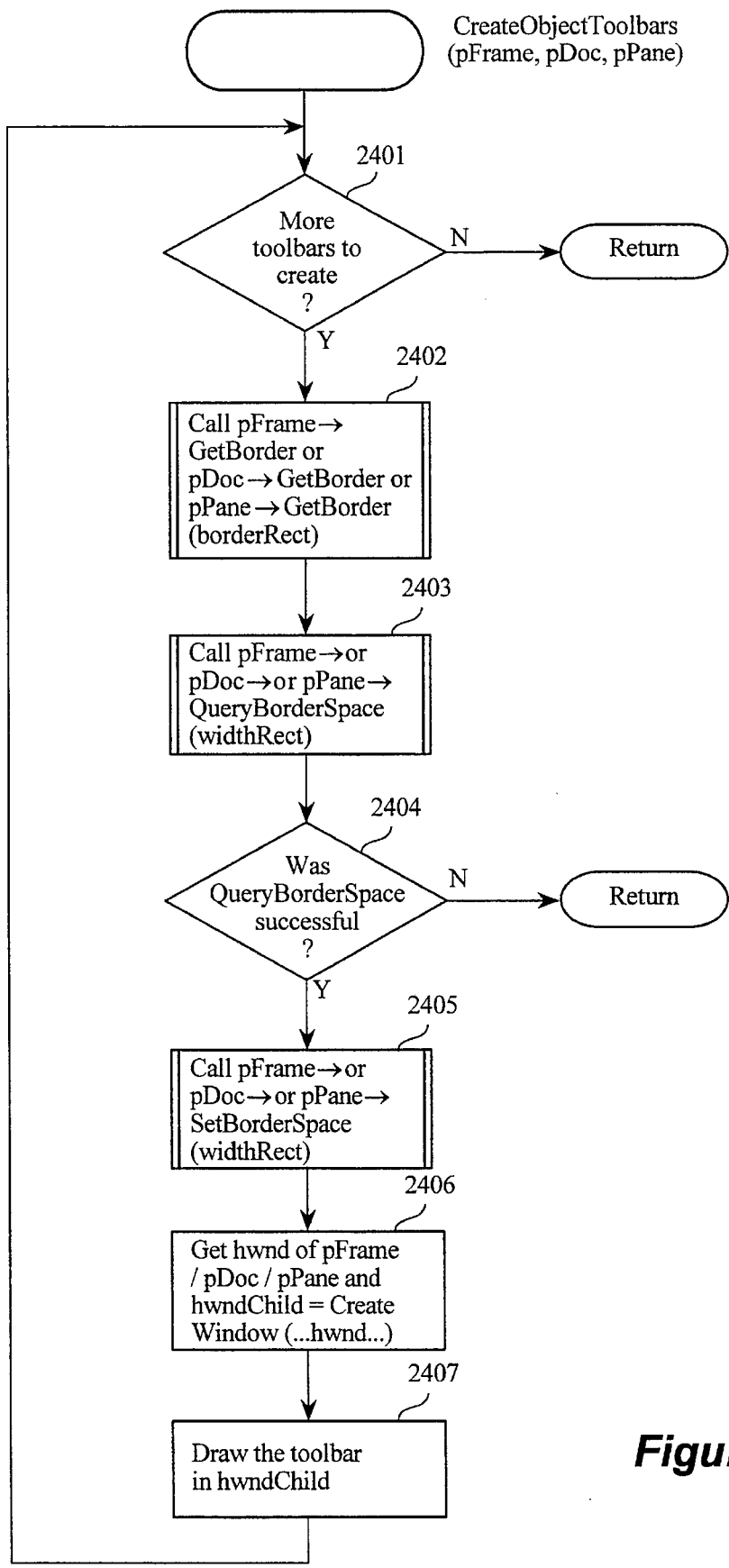
FIG. 24 is a flow diagram of an implementation of the CreateObjectToolbars function.

The CreateObjectToolbars function is a function implemented by a server application to negotiate between the server and container applications for any space needed for server application tools. FIG. 24 is a flow diagram of an implementation of the CreateObjectToolbars function. Steps 2401 through 2408 are repeated as many times as necessary to create tools for the server application. In step 2401, the function determines whether there are more tool bars to create, and if not, returns, else continues at step 2402. In step 2402, the function invokes the IOLEInPlaceUIWindow::GetBorder method of a frame, document, or pane window of the container application (depending upon where the server application desires to place the tools) to begin the negotiation. In step 2403, the function invokes the IOLEInPlaceUIWindow::QueryBorderSpace method of the desired frame, document or pane window to request a specific width of border space inside the rectangle returned by the previous call to the GetBorder method. These methods were discussed in more detail above. In step 2404, if the specific width cannot be accommodated, then the function continues at 2405, else it returns. An implementation can choose to renegotiate for a different amount of space by calling QueryBorderSpace as many times as desired with different values. In step 2405, the function invokes the IOLEInPlaceUIWindow::SetBorderSpace method with the space previously negotiated in step 2403. In step 2406, the function creates a child window of the desired frame, document, or pane window of the parent container application. In step 2407, the function draws the tool in the child window it created earlier, and then returns to the beginning of the loop.

4.6.4 RemoveMenus void RemoveMenus (HANDLE hSharedMenu)

CODE TABLE 3

```
RemoveMenus (HANDLE hSharedMenu) {
1    menu = hSharedMenu -> menu;
2    descriptor = hSharedMenu -> descriptor;
3    for (i = descriptor[0] + 1, i <= descriptor[1], i++) {
4        RemoveMenu (menu, heditmenu, MF_BYPOSITION)
5    }
6    for (i = descriptor[2] + 1, i <= descriptor[3], i++ {
7        RemoveMenu (menu, hobjmenu, MF_BYPOSITION)
8    }
9    for (i = descriptor[4] + 1, i <= descriptor[5], i++ {
10       RemoveMenu (menu, hhelpmenu, MF_BYPOSITION)
11   }
12   return( );
}
```

The RemoveMenus function removes the menus of the server application from the composite menu bar upon containee object deactivation. The method is invoked from the containee object's InPlaceDeactivate method. Code Table 3 shows an implementation of the RemoveMenus function. The function uses the information stored in the shared menu descriptor (see FIG. 25), which contains the number of menus within each menu group, to remove all of the server application menus by invoking the underlying window system function RemoveMenu. Lines 3–5 remove the menus belonging to the Edit group, lines 6–8 remove the menus belonging to the Object group, and lines 9–11 remove the menus belonging to the Help group.

4.7 Object Linking and Embedding API Helper Functions

In addition to interface definitions, the object linking and embedding API provides a set of helper functions to be used by container and server applications. These functions include the following: SetActiveObjectHwnd, GetActiveObjectHwnd, ObjectCreateSharedMenu, ObjectDestroySharedMenu, ObjectShade, and ObjectSetMenu.

4.7.1 SetActiveObjectHwnd void SetActiveObjectHwnd (HWND hwndDOC, IOLEInPlaceObject *pObject)

The SetActiveObjectHwnd function sets the currently selected object in an MDI application. Each MDI (document) window in an MDI container application has associated with it an object interface corresponding to the object activated in place, which was displayed when that MDI window last had input focus. If no object had been activated in place from within the MDI window, then the associated object interface is NULL. This mechanism enables an MDI window to activate the proper containee object when the MDI window later receives input focus, for example, when the user clicks with the mouse on the title bar of the MDI window. (When the user clicks on the title bar of some other MDI window, any in-place interaction associated with the first window disappears from the display.) The SetActiveObjectHwnd function takes two parameters: the window handle of the MDI (document) window and the IOLEInPlaceObject interface of the object currently activated in place. One skilled in the art will realize that there are many ways to associate the window handle with an object interface. In one embodiment, the function stores the object interface as a property of the document window using underlying window system functions. Note that this implementation requires storage for each MDI window active in the system. An alternative approach is to add a method to the document, pane, and frame window interfaces to keep track of the currently selected object.

4.7.2 GetActiveObjectHwnd

HWND GetActiveObjectHwnd (HWND hwndDOC)

The GetActiveObjectHwnd function retrieves the containee object to be activated in place when the MDI window receives input focus. This function returns the object interface that was previously stored using the SetActiveObjectHwnd function.

4.7.3 ObjectCreateSharedMenu

HANDLE ObjectCreateSharedMenu (HMENU hMenuCombined, UINT lpiMenuCounts)

CODE TABLE 4

```
HANDLE ObjectCreateSharedMenu (hmenu,lpiMenuCount) {
1     hSharedMenu = AllocateSharedMenuHandle ( );
2     hSharedMenu -> menu = hmenu;
3     for (i = 0, i < number_menu_groups; i++) {
4         if (i > 0) {
5             hSharedMenu -> descriptor[i].count =
6                 hSharedMenu -> descriptor[i - 1].count + lpiMenuCount[i];
7             if i is even
8                 hSharedMenu -> descriptor[i].function = Id_Container
9             else hSharedMenu -> descriptor[i].function = Id_Object;
10        }
11        else {
12            hSharedMenu -> descriptor[0].count = lpiMenuCount[0];
13            hSharedMenu -> descriptor[0].fuction = Id_Container;
14        };
15    }
16    return (hSharedMenu);
}
```

The ObjectCreateSharedMenu function creates the shared menu data structure associated with the composite menu bar of an object activated in place. The function is invoked from the CreateNewMenu function when a containee object is activated. Code Table 4 shows an implementation of the ObjectCreateSharedMenu function. The function takes two parameters: a handle to a composite menu bar and an array of menu counts which contains the number of menus in each menu group. The function returns a handle to the newly created shared menu data structure. In line 1, the function allocates the memory required for the shared menu data structure. In line 2, the function saves the handle to the composite menu bar in this data structure. In lines 3–15, the function sets up the shared menu descriptor according to the information stored in the menu count array. This descriptor is used by the window procedure, when it receives menu commands, to determine whether to forward the menu command to the container application or to the server application.

Although one skilled in the art will recognize that there are different ways to maintain this information, in one embodiment, the descriptor stores at each index the number of the last menu contained in the menu group associated with that index. (The menus are numbered from 1 on the left.) Also, an indication of whether the menu group belongs to the container or server application is stored at each index. One skilled in the art will also recognize that any menu grouping scheme could be supported by passing additional parameters to indicate which application should be notified for which menu group. Using this descriptor arrangement, the window procedure can determine within which index a particular menu item selection falls by counting the number of menus up to and including the menu item selection and then comparing the menu number with the descriptor values to find the correct index. Once the index has been determined, the window procedure can retrieve the indicator that specifies whether a container or server application function should be invoked. This procedure is discussed further below in reference to Code Table 5.

Figure 25:
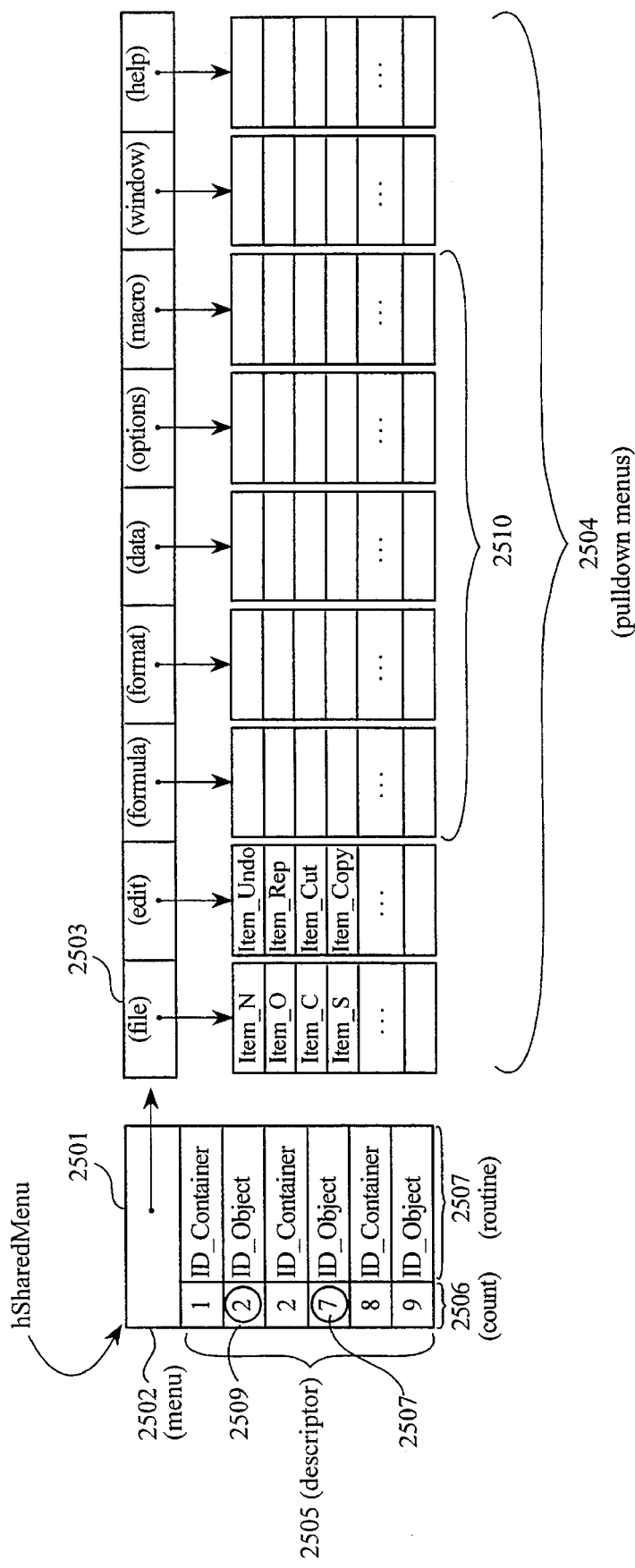
FIG. 25 is a block diagram of the shared menu data structure corresponding to the example discussed in FIG. 4.

FIG. 25 is a block diagram of the shared menu data structure corresponding to the example discussed in FIG. 4. The shared menu data structure consists of a pointer to the composite menu bar 2502 and a descriptor 2505 which contains the menu count for each menu group. The composite menu bar 2503 comprises the menus from the container and server applications 2504. Each element in the descriptor 2505 has a count field 2506 and a function field 2507. The count field 2506 indicates the number, starting from the left, of the last menu within a menu group. For example, the second menu group is the Edit group and contains only one menu. This menu 2503 is the second menu from the left in the composite menu bar; therefore, the count field 2509 contains the number 2. As another example, the fourth menu group is the Object group. This group contains five menus from the server application 2510. Therefore, the count for this menu group 2511 contains the number 7, since the seventh menu is the Macro menu which is the last menu in the Object group.

4.7.4 ObjectDestroySharedMenu
void ObjectDestroySharedMenu (HMENU hMenuCombined)

The ObjectDestroySharedMenu function destroys the shared menu data structure built in a previous call to ObjectCreateSharedMenu. This function is invoked from the IOLEInPlaceObject::InPlaceDeactivate method of the activated containee object after the container and server applications have removed their menus from the composite menu bar.

4.7.5 ObjectShade
void ObjectShade (HWND hwndParent, LPRECT lprc, DWORD grfState)

The ObjectShade function is provided by the object linking and embedding API to create the hatched border pattern placed around objects activated in place. The hwndParent parameter is the window handle associated with the IOLEInPlaceParent interface of the activated (or to be activated) object. The lprc parameter is the rectangle in the parent window coordinates where the pattern will be placed. The grfState flags are identical to those described in the IOLEInPlaceParent::ShadeBorder method and include SHADEBORDER_ON and SHADEBORDER_ACTIVE.

4.7.6 ObjectSetMenuDescriptor
SCODE ObjectSetMenu DESCRIPTOR (HWND hwndFrame, HOLEMENU hMenuCombined, HWND hwndObject)

Figure 26:
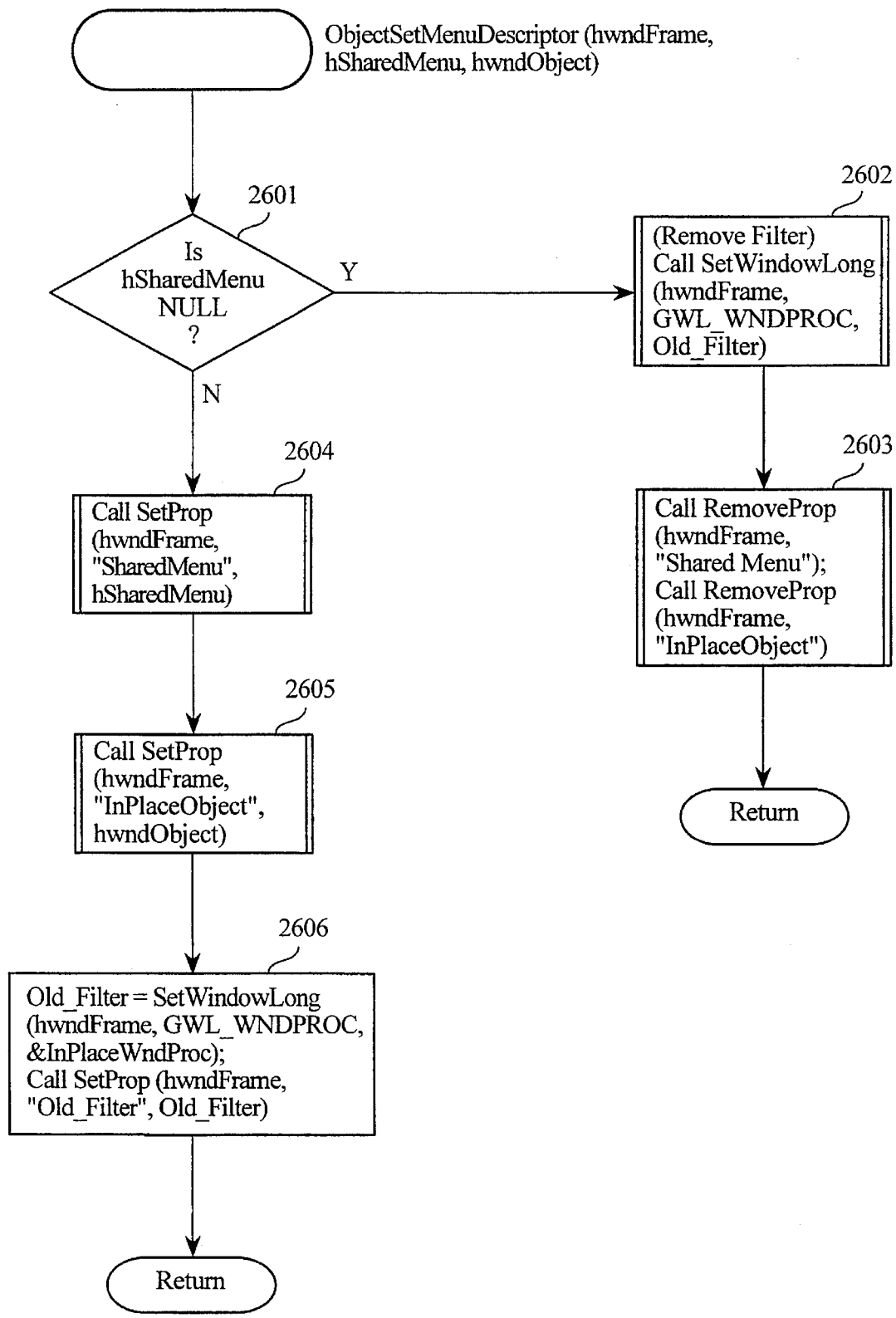
FIG. 26 is a flow diagram of an implementation of the ObjectSetMenu function.

The ObjectSetMenuDescriptor function sets up or removes the message handler for the composite menu bar. The function is invoked by the IOLEInPlaceFrame::SetMenu method of the associated container object of the activating containee object. FIG. 26 is a flow diagram of an implementation of the ObjectSetMenuDescriptor function. It takes three parameters: the window handle of the frame window associated with the container application, the handle to the shared menu data structure returned by the ObjectCreateSharedMenu function, and the window handle of the object to be currently activated in place. If the handle to the shared menu structure is null, then the function removes the message handler for the composite menu bar, otherwise it sets up the message handler. In step 2601, the function determines whether the handle to the designated shared menu data structure is null, and if it is continues at step 2602, else continues at step 2603. In step 2602, the function invokes the underlying window system thnction SetWindowLong to remove the special message handler that was previously associated with the container application. In step 2603, the function removes the properties previously set up for the composite menu and then returns. In step 2604, the thnction sets a property on the frame window to store the shared menu data structure to be later used by the special message handler. In step 2605, the function sets another property on the frame window corresponding to the window handle of the activating object. In step 2606, the function uses the underlying window system function SetWindowLong to install the special message handler as the new window procedure for the frame window of the parent container application. The old window procedure is saved for later use in the property Old_Filter. (See, e.g., Code Table 5, discussed in detail below.) The function then returns.

5. Use of In-Place Interaction API

Implementations of the object linking and embedding API interface definitions and functions supporting in-place interaction are invoked to:

activate an object in place within an SDI or MDI container application, process messages when a user selects a menu item from the container application composite menu bar, deactivate user interface resources of an object activated in place when the user either chooses to activate a different object or chooses to restore the top level container application to its normal processing, deactivate the in-place interaction resources for a server application when the container application no longer needs them, enable and disable modeless dialogs when a server application displays a dialog and the container application is currently displaying a modeless dialog (or vice versa), and process accelerator key combinations to distribute them between container and server applications.

5.1 Procedure for Activation In Place

As described earlier, once objects have been linked or embedded into a document, a user can select objects and request that certain actions be performed upon the selected objects. Returning to the example of FIGS. 3 and 4, if the user wishes to activate the spreadsheet object 305 in place, the user can either click twice with the mouse input device on the object presentation format or use the container application menus to select an action on the object. FIG. 8 demonstrates one way the user can use menus to activate the spreadsheet object 305 in place. When the user selects the menu item "Excel Worksheet Object" 803 from the container application (the word processing application) Edit menu 802, and then selects any action from the "Excel Worksheet Object" submenu 804, the word processing application invokes the spreadsheet application to activate the spreadsheet object in place.

The process of activating the spreadsheet object 305 is accomplished in several steps. First, the window procedure for the frame window of the word processing application is invoked by the underlying window system in response to user selection of a menu item on the object action submenu 804. (See, e.g., FIG. 14.) Second, when a menu event is received, the window procedure invokes the function Process_Object_Activation. (See, e.g., steps 1407, 1411, and 1413.) Third, the function Process_Object_Activation loads the data for the spreadsheet object 305 using the object linking and embedding API function ObjectLoad. Finally, the function Process_Object_Activation invokes the DoVerb method of the spreadsheet object 305 to request the spreadsheet application to perform the selected action.

Figure 27:
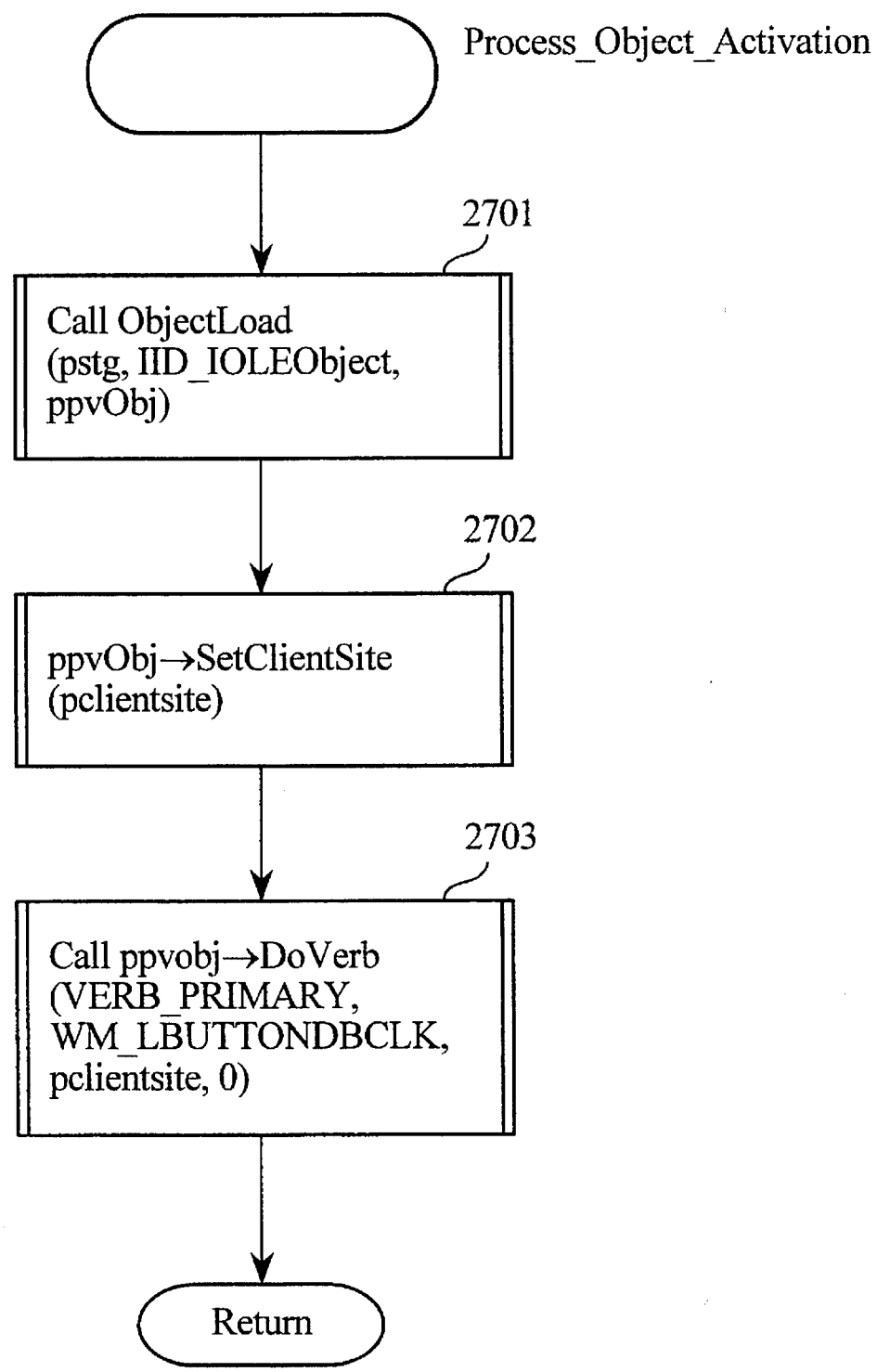
FIG. 27 is a flow diagram of an implementation of the function Process_Object_Activation.

FIG. 27 is a flow diagram of an implementation of the function Process_Object_Activation. The function loads the selected object and invokes its DoVerb method to perform the selected action. In step 2701, the function invokes the object linking and embedding API function ObjectLoad, passing it a pointer to the storage for the object, and an indication that it wants the lOLEObject interface. The function ObjectLoad returns a pointer to the IOLEObject interface of the loaded object. In step 2702, the function invokes the SetClientSite method of the containee object to hand the containee object a pointer to its associated parent container object interface (pclientsite). In step 2703, the function invokes the loaded object's IOLEObject::DoVerb method, passing it the selected action, an indication of whether the action was selected by a double click on other message and the previously created IOLEClientSite interface for the object. The function then returns.

Figure 28:
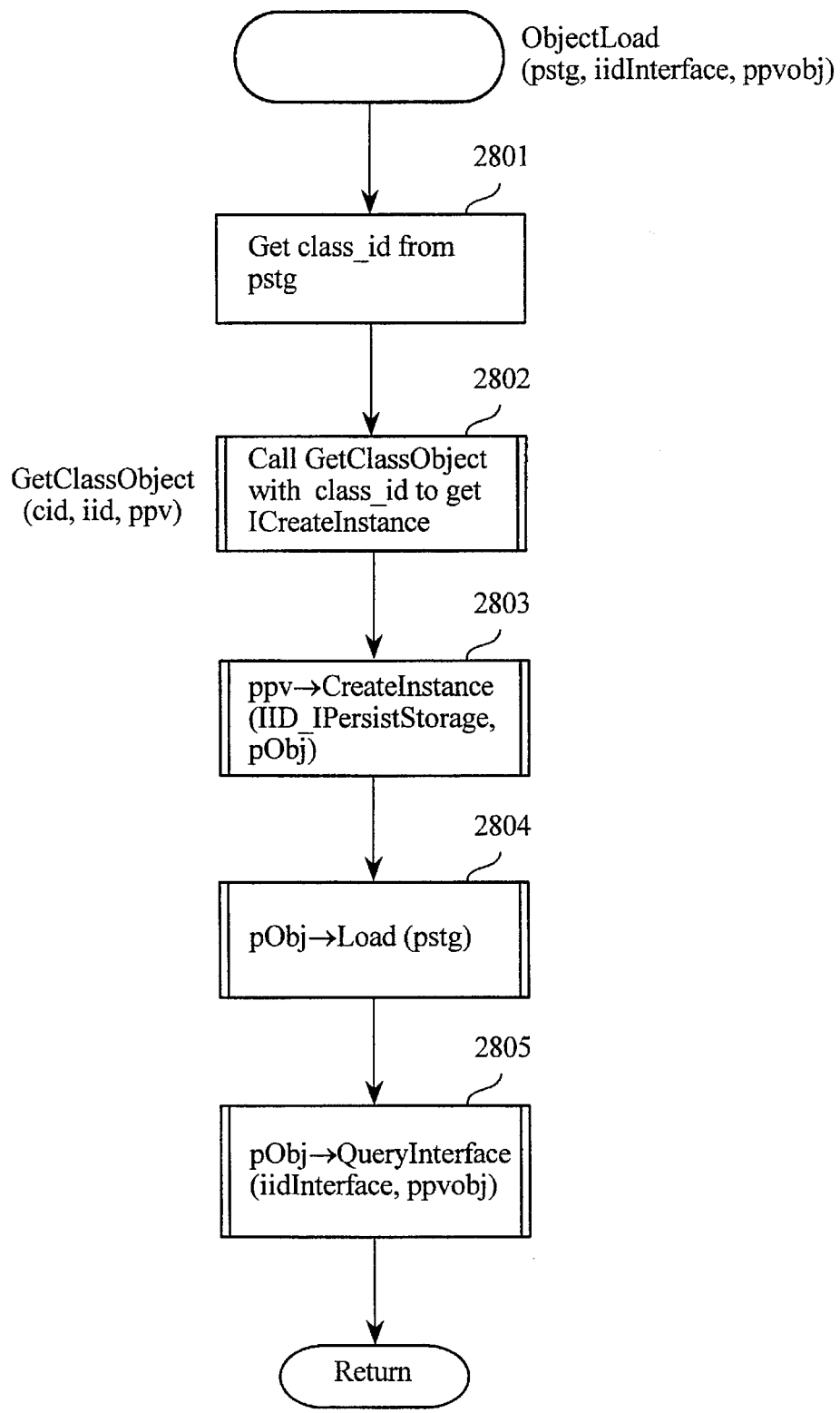
FIG. 28 is a flow diagram of an implementation of the object linking and embedding API function ObjectLoad.

FIG. 28 is a flow diagram of an implementation of the object linking and embedding API function ObjectLoad. This function creates the in-memory instance of an object, readies a server application for future interaction, and returns a pointer to the designated interface. The function takes three parameters: a pointer to storage where the object data is to be loaded from, an indication of the interface the caller desires to have returned, and a return pointer to the in-memory instance of the object. In step 2801, the function retrieves the CLASS_ID from the designated storage. In step 2802, the function uses the retrieved CLASS_ID to locate the code for creating an in-memory instance of this type of object. In a preferred embodiment of the present invention, an IOLECreate interface is provided by every server application to create in-memory instances of objects it implements. In step 2803, the function invokes the IOLECreate::CreateInstance method to create the in-memory structure for the object and returns a pointer to an IPersistStorage interface through which the persistent storage for the object is accessed. In step 2804, the function invokes the IPersistStorage::Load method, which loads the object data from the designated storage. In step 2805, the function invokes the IPersistStorage::QueryInterface method to retrieve the designated interface, and returns the retrieved interface.

Figure 29A:
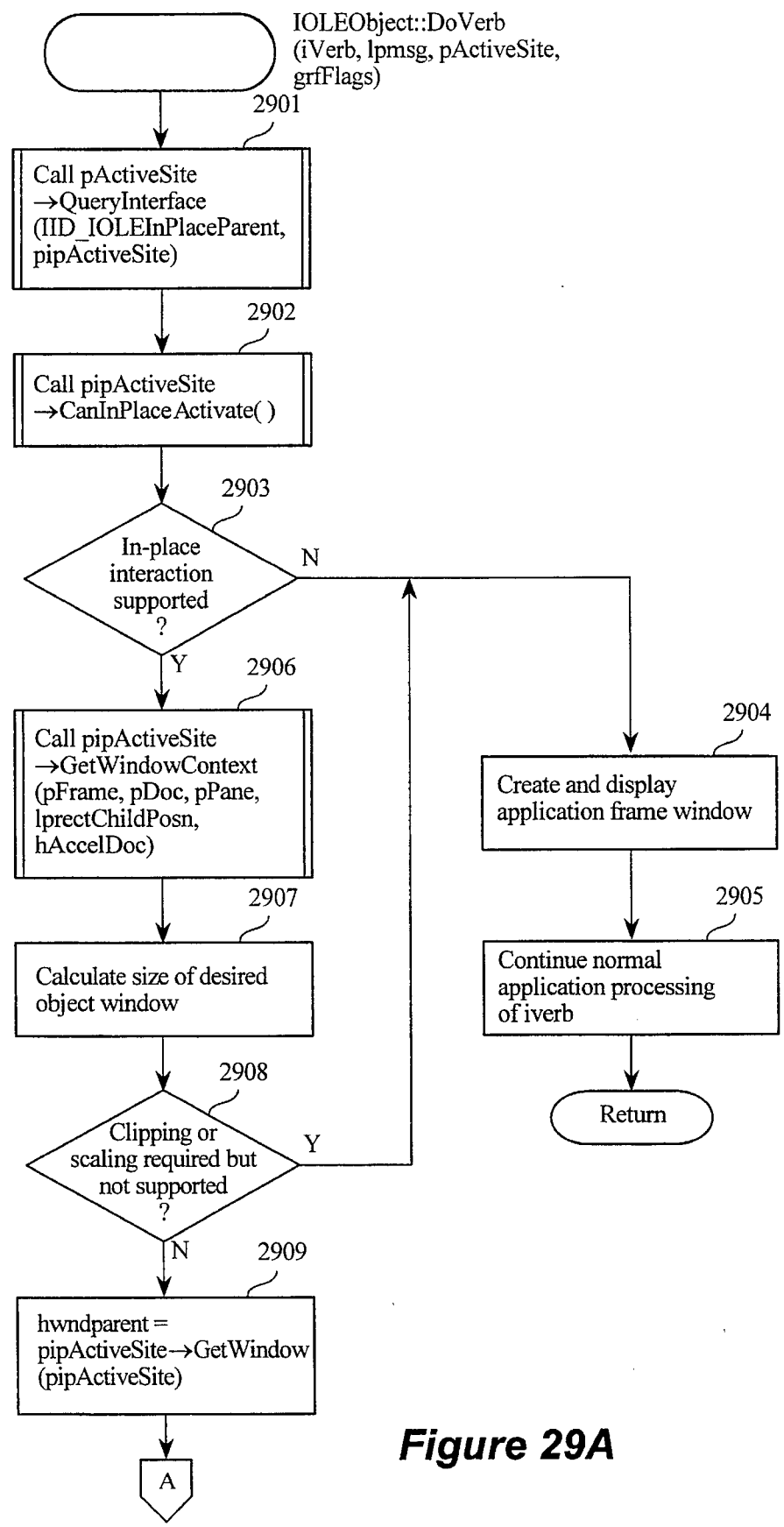
FIGS. 29A and 29B are flow diagrams of an implementation of the IOLEObject::DoVerb method. This method is the primary method for interacting with a containee object.
Figure 29B:
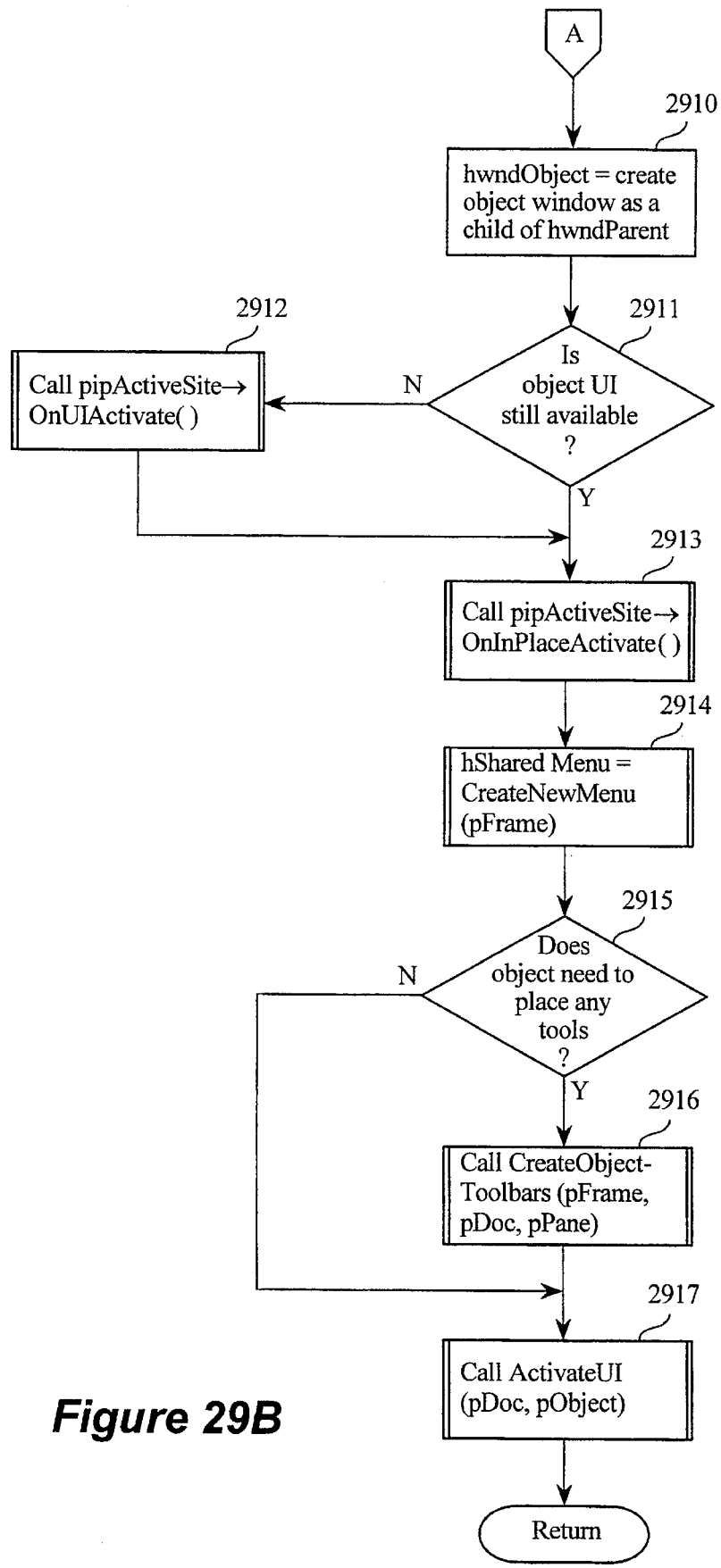

FIG. 29 is a flow diagram of a typical implementation of the IOLEObject::DoVerb method. This method is the primary method for interacting with a containee object. The method negotiates with the container application to perform in-place interaction and causes the server application's user interface to be activated. The method takes four parameters: the user-selected action, a pointer to the message structure received by the container application window procedure when the user selected the action, a pointer to the IOLEClientSite interface of the object, and a set of flags controlling the execution of the verb, for example, whether the server application should take the input focus upon invocation. In step 2901, the method invokes the IOLEClientSite::QueryInterface method to get the IOLEInPlaceParent interface for the specified object. In step 2902, the method invokes the IOLEInPlaceParent::CanInPlaceActivate method to determine whether the container application supports in-place interaction. In step 2903, if the container application does not support in-place interaction, the method continues at step 2904, else the method continues at step 2906. In step 2904, the method creates and displays a server application frame window, because the container application could not perform in-place interaction. In step 2905, the method continues its normal processing of the designated action, and returns. In step 2906, the method invokes the IOLEInPlaceParent::GetWindowContext method to obtain the interfaces associated with the container application. In step 2907, the method calculates the size of the object window it needs to create to support in-place interaction with the specified object. In step 2908, the method determines whether the area returned by the IOLEInPlaceParent::GetWindowContext method necessitates scaling or clipping and whether the specified object can support this. If it can support the required size, the method continues at step 2909, else the method abandons in-place interaction and continues at step 2904. In step 2909, the method retrieves the window handle for the window corresponding to the IOLEInPlaceParent interface. In step 2910, the method creates a new window as a child of the window corresponding to the IOLEInPlaceParent interface to be used as the object root window. (See, e.g., item 1309 in FIG. 13.) In step 2911, the method determines whether the user interface resources for the specified object are still available, that is, have been allocated but not yet deallocated. If the resources are available, the method continues at step 2913, else the method continues at step 2912. In step 2912, the method invokes the IOLEInPlaceParent::OnUIActivate method to enable the container application to remove its user interface resources in preparation for activation of the specified object in place. In step 2913, the method invokes the IOLEInPlaceParent::OnInPlaceActivate method to allow the container application to record that it has activated a nested object in place. In step 2914, the method invokes the function CreateNewMenu to create the new composite menu bar (see Code Table 2). In step 2915, the method determines whether the specified object requires the activation of any additional user interface tools, and if it does, continues at step 2916, else continues at step 2917. In step 2916, the method invokes the function CreateObjectToolbars to negotiate the location of and to place the additional user interface tools of the specified object (see FIG. 24). In step 2917, the method invokes the function ActivateUI, which causes all of the user interface resources of the specified object to be displayed (see FIG. 23), and returns.

5.1.1 Activation In Place Within a Multiple Document Interface Application

The previous section discussed the activation of a containee object assuming the object was activated from an SDI container application. If, on the other hand, the object is activated within an MDI container application, which application by definition can interact with multiple compound documents at the same time, then activation and deactivation occurs whenever the document (MDI) window containing the object is activated or deactivated. The window procedure for the document window receives an activation message from the underlying window system whenever the user selects the window (for example, by clicking in the title bar of the document window). The window procedure for the document window will receive a deactivation message when the user then selects a different window. In response to these messages, the window procedure for the document window will invoke a function (e.g., Process_Activation_Message) to perform the activation and deactivation of the document window and any activated object contained within it.

Figure 30:
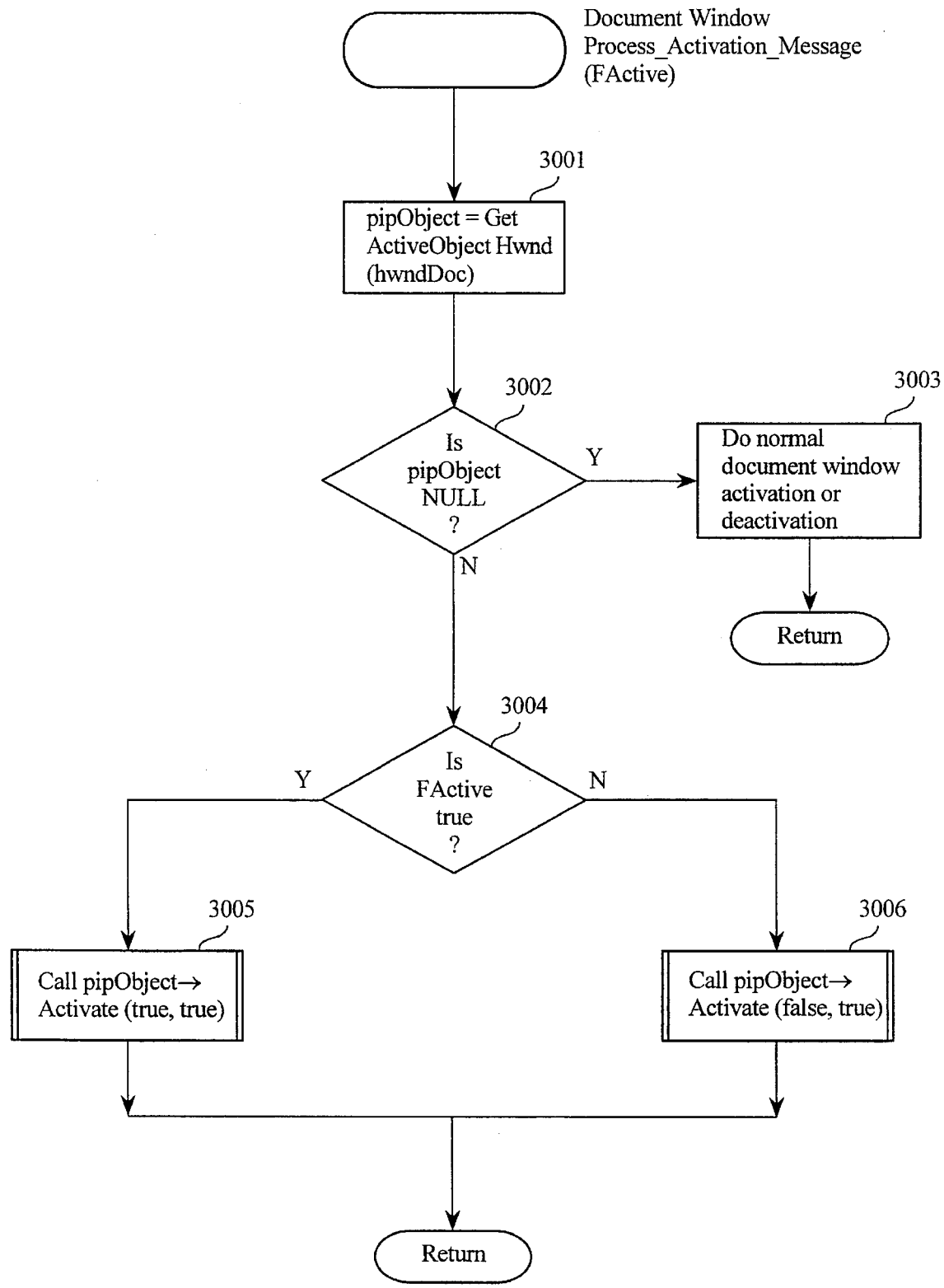
FIG. 30 is a flow diagram of an implementation of the function Process_Activation_Message called by the window procedure of an MDI document window to process activation and deactivation messages.

FIG. 30 is a flow diagram of an implementation of the function Process_Activation_Message called by the window procedure of an MDI document window to process activation and deactivation messages. In one embodiment, the document window handle is passed in as a parameter to the function. The function determines whether the window contains an object previously activated in place when the window was last active. If so, the function activates or deactivates that object, else the function activates or deactivates the document window in its normal fashion. In step 3001, the function retrieves the IOLEInPlaceObject object interface for the previously active contained object, if there is one, by invoking the function GetActiveObjectHwnd. In step 3002, the function determines whether the object interface is null. If it is null, then there is no previously active contained object and the function continues at step 3003, else the function continues at step 3004. In step 3003, the function performs its normal window activation or deactivation procedures such as setting up the document window tools and menus, and returns. In step 3004, the function determines whether the designated flag FActive is true. If the flag FActive is true, then the previously active contained object is to be activated and the function continues at step 3005, else the object is to be deactivated and the function continues at step 3006. In step 3005, the function invokes the IOLEInPlaceObject::Activate method of the retrieved interface requesting the previously activated object to activate itself, and returns. In step 3006, the function invokes the IOLEInPlaceObject::Activate method of the retrieved interface requesting the previously activated object to deactivate itself, and then returns.

5.2 User Selection of Pulldown Menus Message Handling

Once the user has activated an object in place, the user interacts with the object within the container application by selecting actions through the menu bar of the container application (which is the composite menu bar). Because some of the menus belong to the server application and others of the menus belong to the container application, the window procedure for the container application frame window must decide whether to send the menu input event to a function within the container application or within the server application. For this purpose, a special message handler is installed by the object linking and embedding API function ObjectSetMenuDescriptor when it is invoked by the server application to install the newly created composite menu bar. This special message handler becomes the new window procedure for the container application frame window once it is installed. Thus, all messages received by the container application that correspond to its frame window are thereafter routed first to the special message handler. This special message handler then decides to which application to route the message event received.

Code Table 5

```
InPlaceWndProc ( hwnd, message, wparam, lparam ) {
1/* wparam = item id of menu item selected; */
2/* hiword (lparam) = hmenu containing the item */
3    switch (message) {
4      case WM_COMMAND:
5        SetFocus (Old_Focus);
6        if (saveMenuRoutine == Id_Object ) {
7          hwndObj = GetProp(hwndFrame, "InPlaceObject");
8          PostMessage(hwndObj, message, wparam, lparam);
9        }
10       else {
11         Old_Filter = GetProp(hwndFrame, "OldFilter");
12         call Old_Filter (hwndFrame, message, wparam, lparam);
13       };
14       break;
15     case WM_INITMENUPOPOP,
16       WM_ENTERIDLE,
17       WM_MEASUREITEM,
18       WM_DRAWITEM:
19       if (saveMenuRoutine == Id Object ) {
20         hwndObj = GetProp(hwndFrame, "InPlaceObject");
21         PostMessage(hwndObj, message, wparam, lparam);
22       }
23       else{
24         Old_Filter = GetProp(hwndFrame, "OldFilter");
25       call Old_Filter (hwndFrame, message, wparam, lparam);
26       };
27     break;
28       case WM_MENUSELECT:
29         hSharedMenu = GetProp(hwndFrame, "SharedMenu");
30         CombinedMenu = hSharedMenu -> menu;
31         count = 0;
32         for (current = 1st menu entry of CombinedMenu; current <= last menu entry
33           of Combined Menu; current ++) {
34           if (current -> item_id == hiword (lparam))
35             found = true;
36             count = count + 1;
37         }
38       if (found)
39         GetFocus(Old_Focus);
40         SetFocus(hwndFrame);
41         descr = hSharedMenu -> descriptor;
42       saveMenuRoutine = NULL;
43       for (d = 0; d <= sizeof (descr); d++){
44         if (d = 0) and (count <= descr [d].count)
45           saveMenuRoutine = descr[d].function;
46         else if (count > descr[d - 1].count) and (count <= descr [d].count)
47           saveMenuRoutine = descr[d].function;
48       }
49     break;
50       default:
51         Old_Filter = GetProp(hwndFrame, "OldFilter");
52         call Old_Filter (hwndframe, message, wparam, lparam);
53         break:
54   }
55   return ( );
}
```

Code Table 5 shows an implementation of the special message handler provided by the object linking and embedding API. Lines 3–54 implement a case statement based upon the type of message received. Lines 28–49 provide initialization to enable the handler to route the message properly when it receives a menu command message from the underlying window system. Lines 4–27 and lines 50–53 provide the basic routing mechanisms when a menu command message is received. In line 29, the handle to the shared menu data structure is retrieved from the properties of the container application frame window. In lines 32–37, the handler walks the entries of the composite menu bar trying to match the menu received in its input message. In the process, it keeps track of the number of menus encountered (line 36). Once the loop is exited, and if the menu is found, the variable count represents the number of the selected menu starting from the left. This count is then used in the loop contained in lines 43–48 to determine to which descriptor element the menu belongs. Specifically, the value stored at each index of the descriptor is checked, and if the menu number is less than or equal to that value and is greater than the value stored in the descriptor at the index to the left, then the correct descriptor element has been located. Once the correct element is known, the handler retrieves the indicator corresponding to whether a container or server application function should be called. This indicator is then saved in the variable saveMenuRoutine in lines 45 and 47. For the handler to properly process menu mneumonics (including system menu key sequences), the handler sets the input focus to the frame window when responding to the menu command message.

A menu mneumonic is a key sequence such as "Alt, -, F, N" which provides a way to access menus using a keyboard instead of using a mouse. Typically, a menu item has one letter designated as its unique mneumonic, e.g., underlined on Windows 3.1. In order to access the menu item, its unique mneumonic is appended to the mneumonics of its containing menus. The entire key sequence is prefaced by the system key, which informs the system that the user wishes to type in a menu mneumonic. Menu mneumonics pose a special problem when in-place interaction is implemented with certain underlying window systems. Specifically, under unmodified conditions, when a containee object has been activated in place, all keyboard input with the exception of the System Key (the "ALT" key on Windows 3.1) and other navigation keys is sent to the window procedure for the object root window (see item 1309 in FIG. 13), because the object root window is given input focus when the object is activated. However, the underlying window system sends the System Key to the window procedure for the container application frame window, because this key is handled specially. Thus, the container application will never receive the key input corresponding to the selected menu item in the system key sequence. For example, if the menu mneumonic key sequence is ALT, -, m (for "move"), the "ALT" key press would be sent to the container application and the "-" and "m" key presses would be sent to the server application. To solve this problem, the input focus is temporarily set to the container application frame window while the frame window procedure is processing menu events. An example of this solution is shown in lines 5, 39, and 40.

In lines 4–14, when the handler receives a menu command, the handler first restores the input focus so that normal processing may continue. Next, the handler checks the indicator that was saved in SaveMenuRoutine. If it indicates the menu belongs to the server application, then the handler invokes the window procedure of the object window, otherwise it invokes the original container application window procedure. Specifically, in line 7, the handler gets the window handle of the object, which was stored as a property of the frame window of the container application. In line 8, the handler asynchronously posts a message to the object window forwarding the original message and the original parameters. In line 11, if the indicator did not specify the server application, then the handler retrieves the original window procedure of the container application frame window and in line 12 invokes this procedure with the designated message and parameters. The original window procedure of the container application frame window was saved in the call to ObjectSetMenuDescriptor, which installed the new window procedure.

In lines 15–27, when the handler receives other menu related messages, it dispatches the message appropriately to either the container or object application in the same manner provided in lines 6–13. In lines 50–53, if any other kind of message is received, then the old window procedure is retrieved and the message and parameters are forwarded to it.

5.3 In-Place Deactivation Procedure

When the user selects an area outside the object activated in place, the object is deactivated. In general, this behavior occurs when the user clicks with a mouse button in another area in the window of the container application, or in a different document window in the case of an MDI container application. Therefore, generally speaking the deactivation methods of the in-place interaction API are invoked from a function called by the container application to process a mouse button event.

Figure 31:
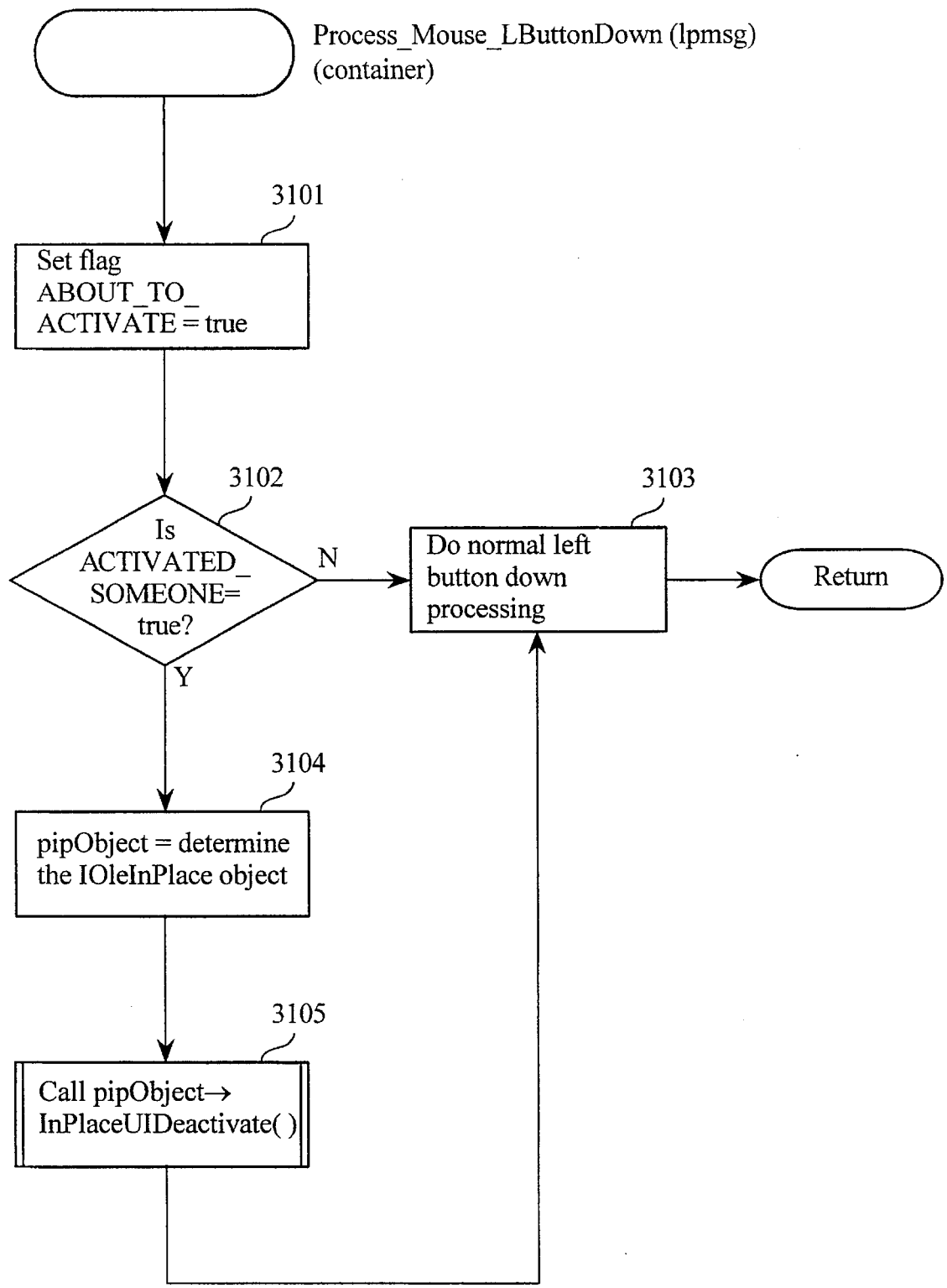
FIG. 31 is a flow diagram of an implementation of the Process_Mouse_LButtonUp function.

FIG. 31 is a flow diagram of an implementation of the Process_Mouse_LButtonDown function. This function processes the input event signaled by the receipt of a left button down message. One skilled in the art will recognize that such a function could be invoked upon receipt of any kind of input event, and that other events can be used to select and deselect. In step 3101, the function sets a flag indicating that the container application is about to activate. This flag is used in the sequence of nested deactivation invocations to ensure the correct user interface resources are displayed in the case of nested activations. In step 3102, the function checks the flag ACTIVATED_SOMEONE to determine whether an object has been activated in place, and if it has, continues at step 3104, else continues at step 3103. In step 3103, the function performs its normal left button down event processing, and returns. In step 3104, the function retrieves the IOLEInPlaceObject interface for the currently activated object. In step 3105, the function invokes that object's IOLEInPlaceObject:: InPlaceUIDeactivate method. The function then continues at step 3103.

As shown in FIG. 21, the currently activated object's IOLEInPlaceObject::InPlaceUIDeactivate method will in turn invoke its IOLEInPlaceParent::OnUIDeactivate method to allow the container application to install its user interface resources. This deactivation will nest upwards until either the top level container, or the container of the object about to be activated, is reached. (See FIG. 19.) For example, referring to FIG. 4, if the embedded chart object 409 shown within the embedded spreadsheet object 405 were the currently activated object, and the user selected the spreadsheet object 405 to activate it in place, then the chart's IOLEInPlaceObject::InPlaceUIDeactivate method would be invoked, which would in turn invoke the spreadsheet's IOLEInPlaceObject:: OnUIDeactivate method. This latter method would then install the user interface for the spreadsheet object as shown in FIG. 4. On the other hand, if the user had clicked somewhere else in the compound document, then the spreadsheet's IOLEInPlaceObject::OnUIDeactivate method would invoke the compound document's IOLEInPlaceObject:: OnUIDeactivate method. This latter method would install the word-processing user interface because this object is the top level container object.

A container application may display scroll bars for scrolling the displayed container object vertically or horizontally. The scroll bars are part of the container window. If the container object has an activated containee object, then when the user clicks on an area outside the containee object, the containee object is deactivated. In a preferred embodiment, the container application upon receiving a scroll bar message does not deactivate the containee object. Rather, the container application effects the scrolling and ensures that the input focus stays with the containee object.

5.4 Closing the Container Application

Some time after a container application is no longer able to perform an undo operation, which would reactivate a previously activated object, and before the container application is closed by the user, the container application permanently deallocates the user interface resources associated with a previously activated object. To deallocate these resources, the container application invokes the IOLEInPlaceObject::InPlaceDeactivate method associated with the previously activated object. This method in turn deallocates the shared menu data structure and the menus associated with the composite menu bar. (See FIG. 20 and associated text.)

5.5 Interacting with Modeless Dialogs

When the user is interacting with an object activated in place whose server application has displayed a modeless dialog, then, if the user wants to select a menu item from a container application menu that presents its own modal dialog, then the container application temporarily hides the server application modeless dialog. Modeless dialog boxes are hidden because a user may be confused seeing two dialog boxes displayed simultaneously and not understand to which box the input is routed because the server and container applications are meant to appear as one application. Also, modal dialogs are not programmed to avoid conflicts with other dialogs because, in traditional applications, the underlying window system prohibits input outside the modal dialog within a single application. With the use of in-place interaction, such conflicts are not automatically avoided because two applications cooperate to appear as one. Therefore, the applicants should cooperate to avoid conflicts between modal and modeless dialogs. For example, suppose the user has selected the "Find . . . " menu item on the Edit menu of a spreadsheet application, which results in the display of a modeless dialog by the server application. Now, suppose the user wishes to print out a part of the compound document, so the user selects the "Print . . . " menu item on the File menu, which belongs to the word processing (container) application. The word processing application hides the "Find . . . " dialog because both dialogs are preferably not displayed at the same time. To do this, the word processing application invokes the IOLEInPlaceObject:: EnableModeless method of the spreadsheet application to request it to hide any modeless dialogs. Then, after the container application has finished processing the "Print . . . " dialog, it invokes the EnableModeless method to redisplay the modeless dialogs.

The similar situation can occur where the server application needs to hide a modeless dialog of the container application. In this case the IOLEInPlaceFrame::EnableModeless method is used.

5.6 Handling Accelerator Key Combinations

In a preferred embodiment of the present invention, the underlying window system supports a concept referred to as accelerator key combinations to enable the user to invoke menu commands through keyboard shortcuts. An accelerator key combination is a sequence of keys assigned by an application to be equivalent to invoking a particular menu command. For example, the key sequence consisting of pressing the "CNTRL" key followed by the pressing the "N" key might translate to the menu command "New" on the "File" menu. In a typical system, accelerator key combinations are assignable by the user and need to be unique within an application.

In general, accelerator key combinations ("accelerators") are processed in the message pump of an application (see step 1402 in FIG. 14). A typical message pump invokes an underlying window system function passing it an accelerator translation table and lets the window system determine to which menu item command the accelerator corresponds. The window system then sends the resulting menu command to the appropriate window procedure.

A problem can be encountered in the object linking and embedding in-place interaction API with respect to accelerators. First, because a server application can be implemented as an object handler within the process space of its container application, the container application should ensure that the server application has a chance to translate its own accelerators. Preferably, the server application is given priority over the container application in processing ambiguous application accelerators when the server application has been activated in place. Also, in the case where a server application is implemented in its own process space, it should pass on any accelerators it does not recognize to the container application.

To solve this problem, the message pumps of the container application and the server application are modified to allow each other a chance to translate the application accelerators. Code Tables 6 and 7 show changes to the server application message pump applicable when the server application executes as a separate process. Code Table 8 shows changes to the container application message pump applicable when the server application executes within the same process as the container application (as an object handler).

---

Code Table 6

---

Object's message loop:
. . .

```
1   while (GetMessage (&msg, NULL, NULL, NULL) {
2     if (not (TranslateAccelerator (hwndObj, hAccel, &msg)) {
3       if (not (ObjectTranslateAccelerator (&msg, hwndFrame, hAccel Table)) {
4         TranslateMessage (&msg);
5         DispatchMessage (&msg);
6   }}}
```

---

Code Table 6 shows an implementation of the changes to the message pump of an object activated in place. These changes allow the server application to give the container application a chance to translate application accelerators before the server application (a separate process) finally disposes of an incoming message. In line 2, the server application attempts to translate an accelerator using its own translation table (stored in the variable hAccel). In line 3, if this translation was unsuccessful, either because there was no accelerator to translate or because the accelerator was not found in the server application translation table, then the server application invokes a special object linking and embedding API function ObjectTranslateAccelerator. The ObjectTranslateAccelerator function determines whether the accelerator is desired by the container application and, if so, sends a message through a remote procedure call to the container application to request it to translate the accelerator. The remote procedure call mechanism, due to its synchronous nature, ensures that the container application will process the message and return before the caller (the server process) receives any more input. In lines 4-5, if the container application did not translate the accelerator, then the server application handles the input message in its normal fashion (filtering and then dispatching it).

Code Table 7

```
ObjectTranslateAccelerator(lpmsg, hwndFrame, hAccelFrame){
1    if (keystroke in lpmsg not found in hAccelFrame)
2        return (false)
3    else {
4        Send RPC message to hwndFrame to invoke
5            hwndFrame -> TranslateAccelerator
6        return (value from RPC call)
}}
```

Code Table 7 shows an implementation of the object linking and embedding API function, ObjectTranslateAccelerator. This function allows the server application to give the container application a chance to process accelerators. In order to avoid the pitfalls inherent in synchronous message handling (such as indefinite waiting), ObjectTranslateAccelerator checks first to see if the container application is interested in the accelerator before attempting to invoke the container application's TranslateAccelerator method. The container application's accelerator table is a designated parameter passed in by the server-application. It is accessible to the server application through a call to IOLEInPlaceParent:: GetWindowContext. If the container application's TranslateAccelerator method is invoked, this function returns the value returned by the container application to the server application, so that the server application can dispose of the message properly.

Code Table 8

```
Container's message loop:
1    while (GetMessage (&msg, NULL, NULL, NULL) {
2        pwhObj = GetActiveObjectHwnd (hwndDoc);
3        translated = false;
4        if ((pwhObject! = NULL) {
5            pipObj = determine the IOLEInPlaceObject interface for pwhObj;
6            if (pipObj -> TranslateAccelerator (&msg))
7                translated = true;
8        }
9        if (not (translated)) {
10           if (not (TranslateMDISysAccel (hwndMDIcontainer, &msg))
11           if (not (TranslateAccelerator (hwndFrame, hAccel, &msg)) {
12               TranslateMessage (&msg);
13               DispatchMessage (&msg);
        }}}}
```

Code Table 8 represents a typical implementation of a message pump of a container application that supports in-place interaction. These changes allow the container application to give the server application (executing within the same process as the container application) a chance to translate application accelerators before the container application finally disposes of an incoming message. In line 2, the code retrieves the currently active object window handle associated with the document window of the container application. In lines 4–8, if there is an active object window handle, then the code invokes the IOLEInPlaceObject TranslateAccelerator method corresponding to the object window handle to enable the server application to translate the accelerator key combination. In lines 9–11, if the server application did not translate the accelerator, or if no object is active, then the container application attempts to translate any accelerators using its own translation table (stored in the variable hAccel). In lines 12–13, if there was no recognized accelerator to translate, then the container application handles the input message in its normal fashion (filtering and then dispatching it).

Although the present invention has been described in terms of a preferred embodiment, it is not intended that the invention be limited to his embodiment. Modifications within the spirit of the invention will be apparent to those skilled in the art. The scope of the present invention is defined by the claims which follow.

6.0 Alternative Embodiment for In-Place Interaction

In addition to the embodiment described in Sections 1–5, the present invention provides a generalized method for interacting with embedded or linked data in a context where the embedded or linked data (contained data) is contained within a container object. The prior sections describe the present invention in the context of a container object such as a compound document. The following sections describe an embodiment of the present invention in the context of a forms architecture. In a forms architecture, container objects are created to represent form backgrounds. Control objects, such as pushbuttons, checkboxes, and text edit fields, are created and placed in container objects to comprise forms. A form, through the user interface presented by its contained control objects, manipulates data by taking actions in response to interaction with the control objects. In an object-oriented environment, a forms architecture based application can present its user interface via form objects and control objects, such that each control object displays its own user interface and is responsible for its own interaction.

Figure 32:
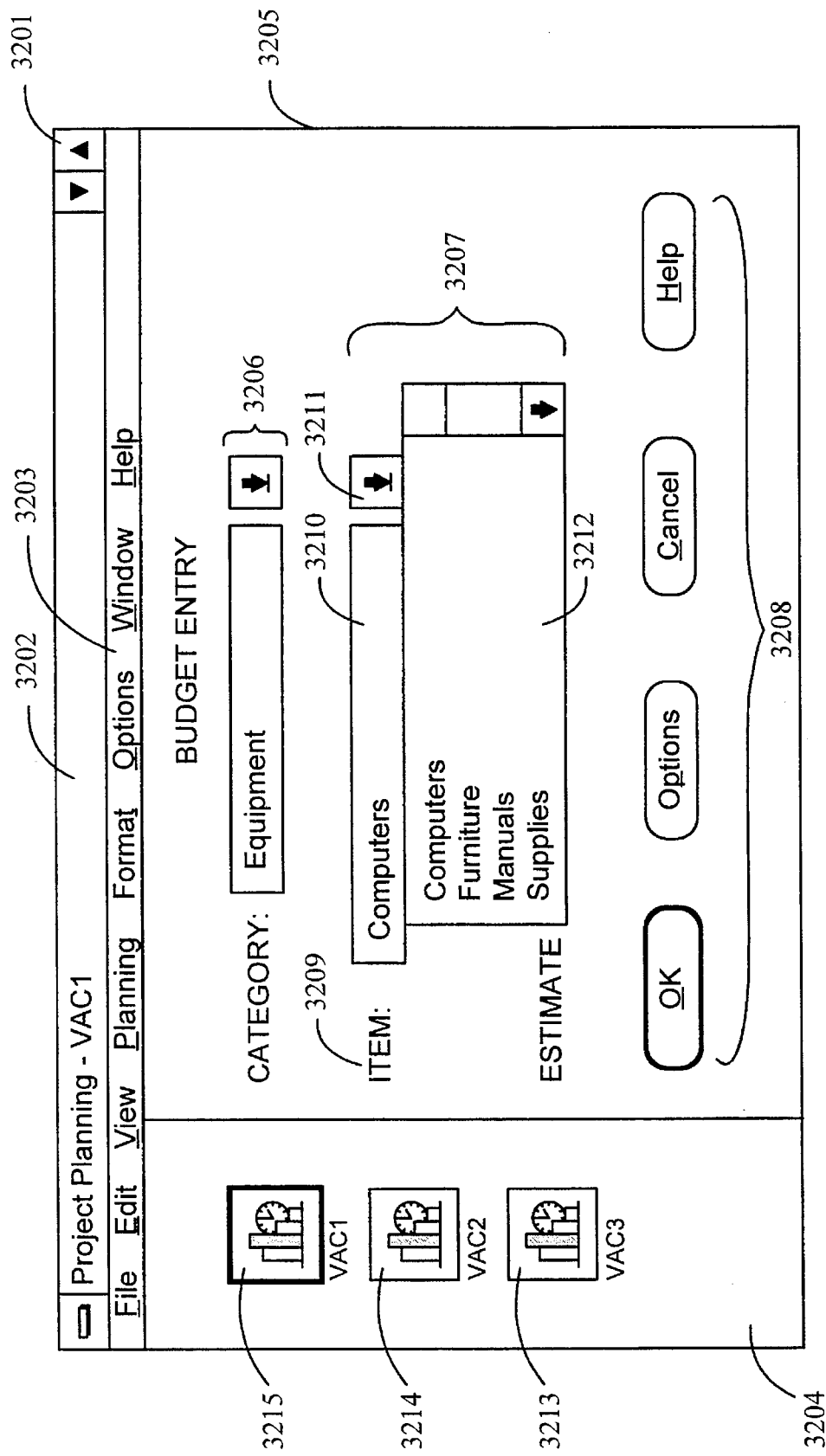
FIG. 32 is an example application that uses a forms architecture as the basis for its user interface.

FIG. 32 is an example application that uses a forms architecture as the basis for its user interface. This figure is an example of a hypothetical budgeting data entry form that corresponds to the compound document project report example shown in FIGS. 3 and 4. In FIG. 32, main application window 3201 currently shows the data entry user interface for the VAC1 project corresponding to the example described in FIGS. 1–4. The main application window 3201 contains a title bar 3202, a menu bar 3203, and an application workspace area comprising two form objects 3204 and 3205. Form object 3205 contains several control objects including a drop-down list 3206 of budget categories, a drop-down list 3207 for possible items to be budgeted, and four pushbutton controls 3208. Form object 3204 contains three project icon control objects 3213, 3214, and 3215. The budget entry form object 3205 corresponds to the selected project icon 3215. So, for example, form object 3205 as shown corresponds to the budget entry data for the VAC1 project. In a typical data entry application, a user enters a "record" of data (values for a set of predefined fields) by modifying data entry fields. In the example shown in FIG.

32, the control objects represent the various fields available for data entry.

In another embodiment of the present invention, the object linking and embedding facilities support two models of activation in place: inside-out activation and outside-in activation. These two activation models differ in terms of the preferred user actions for specifying a desire to in-place activate a particular object. The outside-in activation model corresponds to activation of an object by tunneling into an object (within a nested object containment hierarchy) from the outermost container object inwards until the user activates the desired object.

For example, in FIG. 4, the user activates the chart object 409 by first activating the outer spreadsheet object 405 and then selecting and activating the chart object 409 contained within the spreadsheet object 405. Using outside-in activation, a user activates an object by activating each of its container objects successively. This operation can require multiple user actions and is thus time consuming if an object is deeply nested. Also, the outside-in activation model implies that the window procedure of a container window receives user input events (for example, mouse events) and then finds, potentially loads, and sends the appropriate server application an indication of the input event. If the server application that receives the input event corresponds to an intermediate container (that is, the container object contains another embedded or linked object), then the user can activate another object. The server application implementing the intermediate container then finds, potentially loads, and sends another input event to potentially another server application. This process continues until the user has activated the desired object.

The inside-out activation model, on the other hand, corresponds to a style of activation in which the object in question is virtually always available for in-place interaction with the user. The user need not "tunnel in" to activate the object. Instead, the object is in such a state that, when the user initiates a particular input event, the server application implementing the object's behavior responds by making the object user interface available to the user. For example, if an object supports inside-out activation, when the user single-clicks on the object, the appropriate server application responds by making its user interface available to the user. Inside-out activation is preferably reserved for server applications that can quickly respond to input events, because typically less user action is required to activate the object and thus activation can more easily occur by mistake. This type of activation is useful, for example, in the context of a forms architecture where the controls on the form (implemented as control objects) are available to the user whenever the user single-clicks on them.

For example, in FIG. 32, when the user wants to enter an item within a particular budget category in order to provide a budget estimate, the user activates the drop-down list 3207 by single-clicking on the drop-down arrow 3211. In response to the single click, the server application that implements the drop-down list 3207 responds by providing the list 3212. Prior to the user selecting the drop-down arrow 3211, the form displays the drop-down list 3207 as item label 3209, text edit field 3210, and drop-down arrow 3211 (without the list 3212).

According to the inside-out activation model, a server application that supports inside-out activation receives input events directly from the user without the immediate container first receiving them and then dispatching them to the server application. Once the server application for an inside-out object receives an indication from the user that the user wants to activate the object in place, then the server application is responsible for making the user interface visible to the user. In this way, in-place interaction with an inside-out object appears seamless in comparison to interaction with the native data of the application. That is, unless the server application explicitly does something to distinguish inside-out objects, these objects will behave to the user just like the native data of the application behaves.

6.1 Activation Model Support

Figure 33:
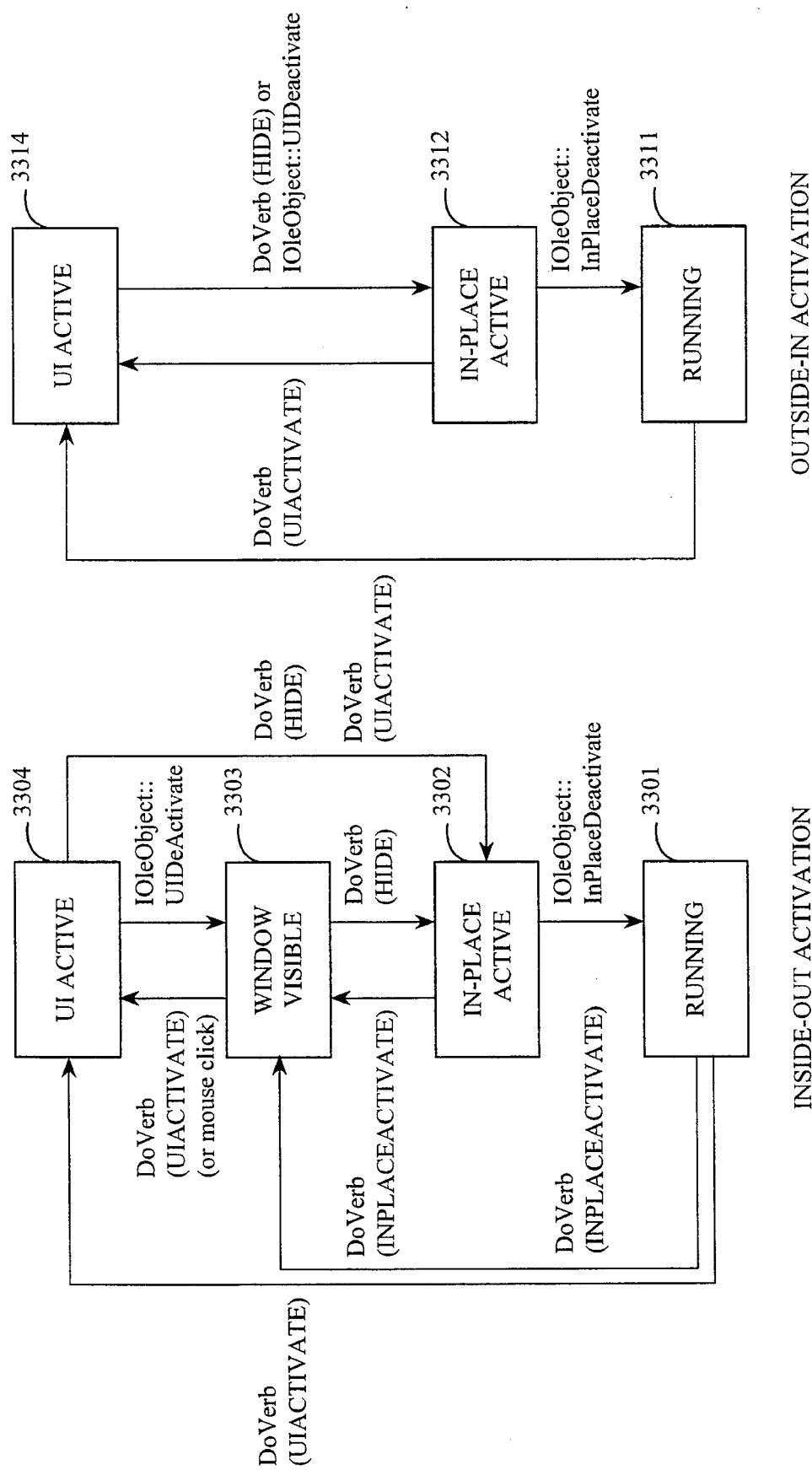
FIG. 33 is a block diagram of the activation states available for a container object.

In a preferred embodiment, the object linking and embedding facilities support inside-out activation and outside-in activation by providing the ability to transition objects in and out of four states. FIG. 33 is a block diagram of the activation states available for a containee object. FIG. 33 also shows typical transitions in and out of each state for both inside-out activation and outside-in activation.

In accordance with the inside-out activation model, a containee object can be in one of four states: a running state 3301, an in-place active state 3302, a window visible state 3303, and a UI active state 3304. Each of these states encompasses the state below it in the figure; that is, when an object is in window visible state 3303, the object also has the characteristics of being in the in-place active state 3302. An object abiding by the inside-out activation model is referred to as an inside-out object.

Specifically, in the running state 3301, the server application implementing the containee object has been located, loaded, and is generally available for in-place or external (open in another window) interaction. In the in-place active state 3302, the server application implementing the containee object has established with the container application that the object can be activated in place. The container application also remembers the object as being in the in-place active state. In the window visible state 3303, the server application implementing the containee object can respond to user input events and is ready to show its user interface resources upon appropriate user indication. In this state, the resources of the containee object are typically integrated with the resources of the container object, but are not yet accessible or visible to the user. In the UI active state 3304, the server application implementing the containee object negotiates for space for its tools (such as palettes and toolbars), creates them as appropriate, and makes them visible to the user to enable the user to interact with the containee object in place. In this state, if the object supports a composite menu bar (participates in menu merging), then the composite menu bar is also displayed.

The arrows in FIG. 33 leading from state to state are labeled with an example set of the appropriate API routines for transitioning between the states. For example, when a containee object is in the window visible state 3303, if the container application causes the DoVerb method to be called (e.g., when the user selects a menu item relating to editing the containee object) or the server application receives a single mouse click, then a routine is called to transition the containee object to the UI active state 3304 (e.g., DoInPlaceActivate). These API routines are similar to those of the embodiment described in Sections 1–4. The routines have been modified to support the two activation models and to reduce the amount of display flicker potentially created by in-place interaction when the display changes based upon the selected object. These routines are discussed in detail below.

FIG. 33 also shows the activation states comprising the outside-in activation model and example transitions between them. The primary difference between the outside-in and inside-out activation models is that no explicit window visible state exists in outside-in activation (except internally). That is, an object directly transitions from the in-place active state 3312, where the object user interface is not accessible to the user, to the UI active state 3314, where the server application resources are fully appropriately integrated into the container application for in-place interaction. (The examples described in the embodiment discussed in Sections 1–5 follow the outside-in activation model.) Because there is no explicit window visible state in outside-in activation, the server application cannot receive user input events until it is in UI active state 3314, when the windows owned by the server application are visible to the user. An object abiding by the outside-in activation model is referred to as an outside-in object.

Specifically, in the outside-in activation model, the running state 3311, the in-place active state 3312, and the UI active state 3314, are analogous to those states in the inside-out activation model. Recall that because each state encompasses the state below, the UI active state includes the characteristics of the window visible state. Thus, even though there is no external window visible state for outside-in objects, there exists such a state internally. The typical transitions from state to state are also similar to the inside-out activation model, with the exception that there is no support for a verb called INPLACEACTIVATE. The verb INPLACEACTIVATE is not supported because there is no way according to the outside-in activation model to activate an object in place without also activating its user interface (there is no window visible state).

6.2 Window Support for the Inside-Out Activation Model

As mentioned earlier, when an object behaves as an outside-in object, the window procedure for the container object containing the outside-in object receives user input even if the user clicks on the containee object. The window procedure for the container object waits until the user specifically indicates a desire to activate the outside-in object in place (by, for example, a double mouse click) before it activates the object.

Figure 34:
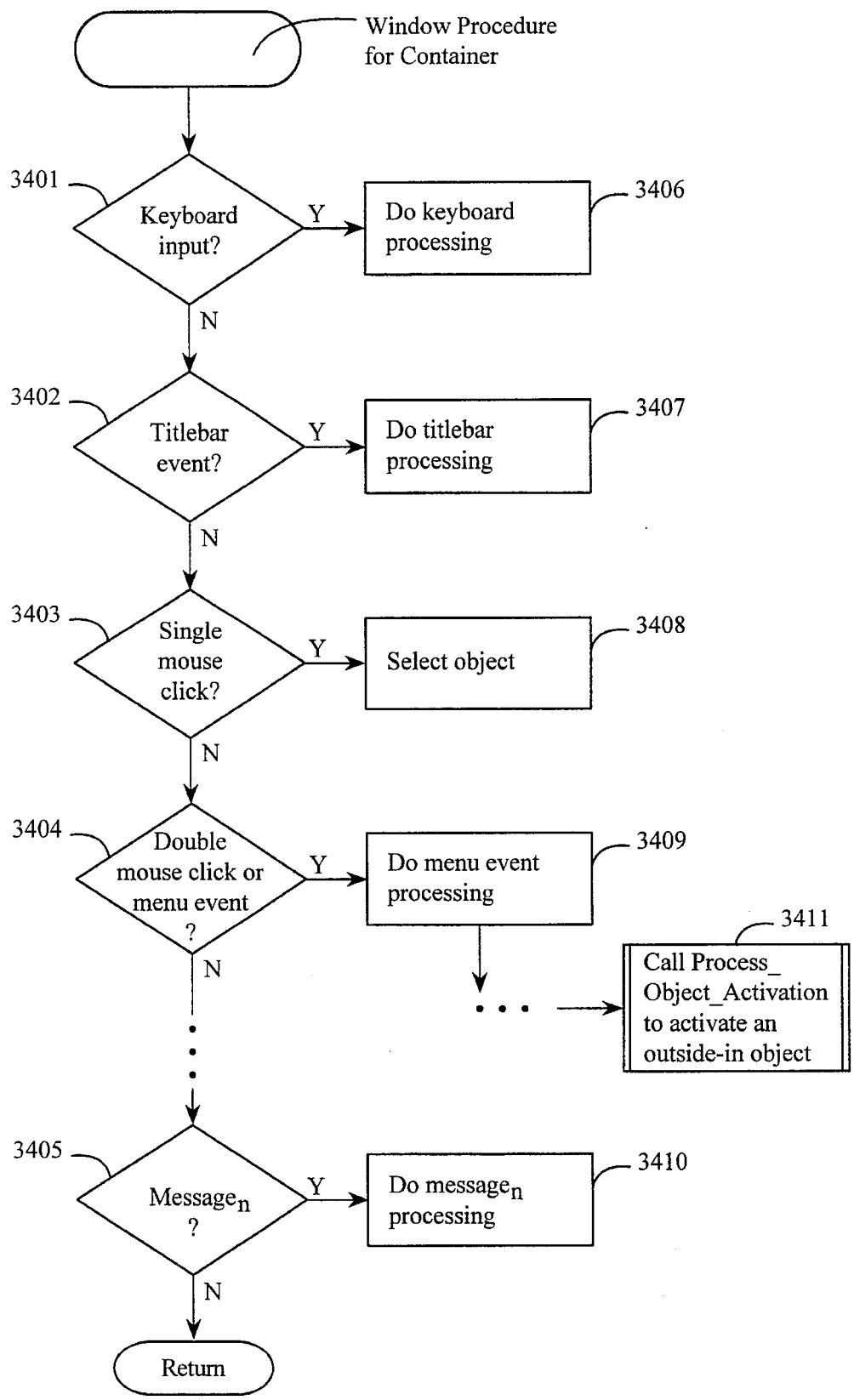
FIG. 34 is a flow diagram of the message processing of a typical window procedure of a container application implementing a container object that can activate outside-in objects.

FIG. 34 is a flow diagram of the message processing of a typical window procedure of a container application implementing a container object that activates outside-in objects. This figure is similar to the window procedure shown in FIG. 14. However, in the embodiment shown in FIG. 34, the mouse clicks are explicitly illustrated. In FIG. 34, an outside-in embedded or linked object is selected in response to a single mouse click and an outside-in embedded or linked object is activated in place in response to a double mouse click or selection of an appropriate menu event. To emphasize, inside-out objects are not activated through this window procedure because the server application implementing the inside-out object receives the input events directly, and the container window procedure is not involved.

Specifically, with respect to outside-in object activation, the window procedure in step 3403 determines whether it has received a single mouse click event. If so, the routine continues at step 3408, else continues at step 3404. In step 3408, the routine selects the object indicated by the current mouse position. In step 3404, the routine determines whether it has received a double mouse click or a menu event. If so, the routine continues at step 3409, else the routine continues to perform other message processing. In step 3409, the routine determines which menu event has been selected or equates the double click to a default menu event. Eventually, in step 3411, if the menu event indicates that in-place interaction is desired, then the routine invokes the Process_Object_Activation function to activate an outside-in object. The Process_Object_Activation function is discussed in detail below with reference to FIG. 52.

Figure 35:
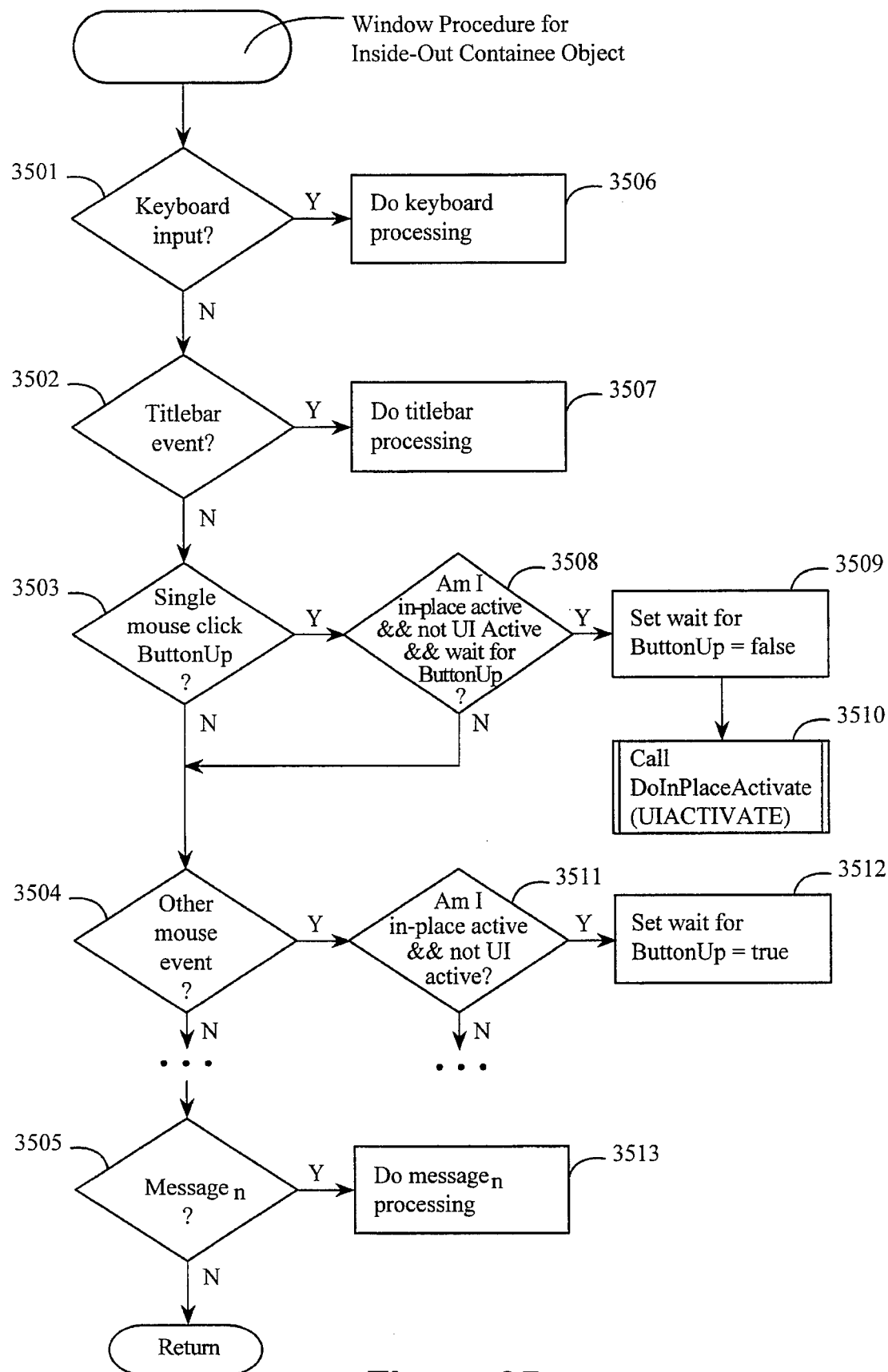
FIG. 35 is a flow diagram of a window procedure for an inside-out containee object implemented by a server application.

FIG. 35 is a flow diagram of the message processing of a typical window procedure of a server application implementing an inside-out containee object. Referring to FIG. 33, when an inside-out object is in the window visible state 3303 or the UI active state 3304, the window procedure for the server application implementing the inside-out object receives input messages from the window system. In the window visible state, a window receives mouse events and other internal messages. The window procedure cannot receive keyboard input events or events specifically relating to user interface resources (such as a title bar) until the object is in the UI active state. (The window is not given keyboard focus until the object enters the UI active state.) In the window visible state, the window procedure waits until it receives a mouse button down event followed by a mouse button up event before it attempts to activate the user interface of the inside-out object. That is, it waits until the mouse button up event occurs to transition from the window visible state to the UI active state. Any other mouse activation, such as cursor movement or a mouse button down event, notifies the window procedure that it is waiting for a mouse button up event before activating the object in place.

Activation of an inside-out object preferably occurs in response to a mouse button up event as opposed to a button down event both to ensure the user a chance to change the selection and to prevent displaying a mouse cursor that jumps around while the user is holding the button down. (Jumping behavior can occur if the frame level tools of the activating object take up less space than those of the current frame level tools. This behavior occurs because more of the window contents are displayed and thus the mouse position changes on the screen even though its relative position to the window contents remains unchanged.) The procedure of waiting for a mouse button up event before proceeding to transition the inside-out object to its UIActive state also reduces the frequency of activating the object's user interface accidentally. If a mouse button up event occurs outside the object then previous mouse events will preferably be ignored.

In addition, in response to mouse events, the window procedure can perform other tasks. For example, when the user moves the mouse cursor over the inside-out object, the server application can change the cursor bitmap to make the user aware that it is interacting with an inside-out object as opposed to native data of the container application.

Specifically, in steps 3501–3505 of FIG. 35, the window procedure decodes a received window message to determine what type of event has occurred. Typically, for each type of event, the application invokes a different routine as shown in steps 3506–3512. To implement inside-out activation, in step 3503, the routine determines whether a mouse button up event has occurred and, if so, continues at step 3508, else continues in step 3504. In step 3504, the routine determines whether a mouse input event has occurred that is not a mouse button up event. If so, the routine continues at step 3511, else continues in step 3505 with other message processing. In step 3511, the routine determines whether the object is in the in-place active state and is not yet in the UI active state. If so, the routine continues in step 3512 where it sets a flag indicating that the server application is waiting for a mouse button up event to occur. Otherwise, the routine continues with other message processing in response to receiving a mouse event. In step 3508 (a mouse button up event has occurred), the routine determines whether the object is in in-place active state but not in UI active state (that is, whether the object is in window visible state) and waiting for a mouse button up event to occur. If so, the routine continues at step 3509, else continues at step 3504. In step 3509, the routine resets a flag to indicate that it is no longer waiting for a mouse button up event to occur. In step 3510, the routine invokes the DoInPlaceActivate function with a parameter requesting the object to transition to the UI active state as defined by the object linking and embedding facilities. The DoInPlaceActivate function is discussed in detail with reference to FIG. 53.

6.3 In-Place Interaction API Support for Inside-Out Interaction

The object linking and embedding facilities define an API to support the inside-out and outside-in activation models. The interfaces and functions defined by this API are similar to the interfaces and functions defined to support in-place interaction in general (as discussed in Sections 1–5) with modifications to support the various activation states shown in FIG. 33. The methods defined by these interfaces and the various functions supported by the API will be discussed in terms of their differences from the analogous methods and functions shown in FIGS. 15–31. Only the methods and functions which contain differences are discussed with respect to this alternative embodiment. It is to be presumed that, unless otherwise discussed, the methods and functions discussed in Section 4 are part of this embodiment and function as described in Section 4.

Figure 36:
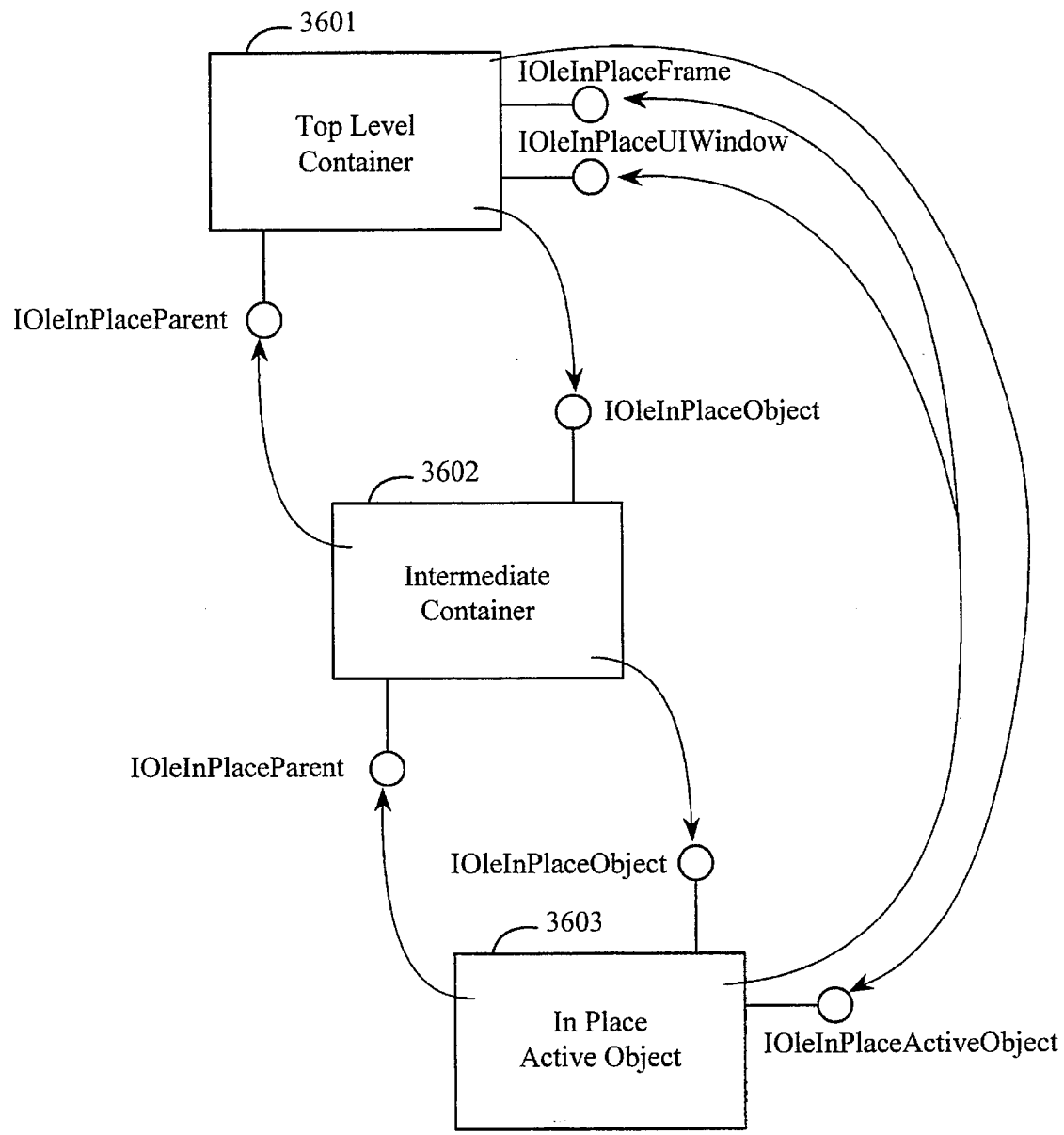
FIG. 36 is a block diagram showing the arrangement of objects in a containment hierarchy and typical relationships between their interfaces.

FIG. 36 is a block diagram showing the arrangement of objects in a containment hierarchy and typical relationships between their interfaces. The diagram shows a top level container 3601, which contains an intermediate container 3602, which in turn contains an object 3603 that has been activated in place. The interrelationship of the interfaces shown in this diagram applies to an object activated in place using either the outside-in or inside-out activation model. In summary, communication relating to installing menus or user interface tools, window activation, switching, and message dispatching progresses through the direct path between the active object 3603 and the top level container 3601. On the other hand, communication relating to object activation and deactivation, scrolling, clipping, etc., progresses through the containment hierarchy such that each level can perform responsive actions.

Specifically, each object in the containment hierarchy (such as objects 3602 and 3603) communicates with its immediate container through the IOLEInPlaceParent interface. Correspondingly, each container (such as, for example, containers 3601 and 3602) communicates with each immediate contained object through the IOLEInPlaceObject interface. An object currently in the in-place active state (for example, object 3603) communicates directly with its top level container (for example, container 3601 ) through both the IOLEInPlaceUIWindow and IOLEInPlaceFrame interfaces. Correspondingly, the top level container communicates directly with an in-place active object through the IOLEInPlaceActiveObject interface.

In the following subsections, the methods of each of these interfaces, as they are used for inside-out interaction, are discussed. Also, the functions defined to support these methods, as they are used for inside-out activation, are discussed.

6.3.1 IOLEWindow Interface

Table 2 in Section 4.1 lists the IOLEWindow interface. The GetWindow method described in Section 4.1.1 preferably provides the same functionality for an outside-in or inside-out object.

6.3.2 IOLEInPlaceUIWindow Interface

Table 7 lists the IOLEInPlaceUIWindow interface. This table is the same as Table 3 in Section 4.2, with the addition of the SetActiveObject method. The SetActiveObject method allows a document or frame window to keep track of the object that is currently in UI active state (the current UI active object). Because the user interface resources of a UI active object are merged with the top level container resources, preferably only one object is currently in the UI active state at any one time. (It is possible, however, for many inside-out objects to be in the window visible state at the same time.)

TABLE 7

```
interface IOLEInPlaceUIWindow: public IOLEWindow {public:
    virtual SCODE GetBorder (RECT borderRect) = 0;
    virtual SCODE QueryBorderSpace (RECT widthRect) = 0;
    virtual SCODE SetBorderSpace (RECT widthRect) = 0;
    virtual SCODE SetActiveObject (IOLEInPlaceActiveObject FAR* pActiveObject, LPCSTR
lpszObjName) = 0;
```

6.3.2.1 IOLEInPlaceUIWindow::SetActiveObject

The SetActiveObject method is a replacement for the helper function SetActiveObjectHwnd. As described in Section 4.7.1, in an alternate embodiment, a method is defined for each containing document or frame window to keep track of the current UI active object. By implementing this method, the need for the SetActiveObjectHwnd and GetActiveObjectHwnd functions as described in Sections 4.71 and 4.72 is eliminated.

Figure 37:
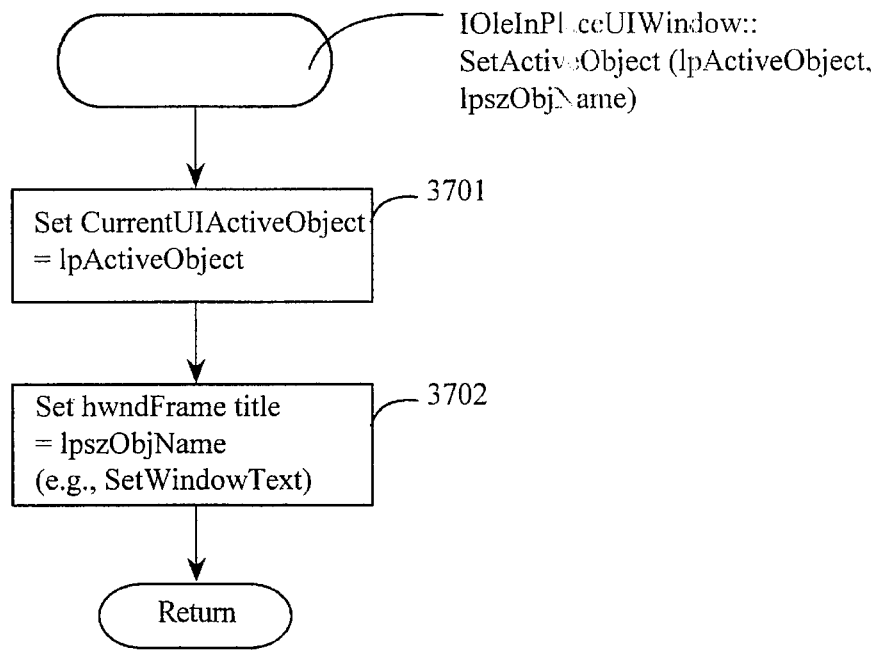
FIG. 37 is a flow diagram of a typical implementation of the IOLEInPlaceUIWindow::SetActiveObject method.

FIG. 37 is a flow diagram of a typical implementation of the IOLEInPlaceUIWindow::SetActiveObject method. The method has two parameters: an interface pointer to an object and a title string. This method keeps track of the designated object interface pointer as the current UI active object and is responsible for setting the title bar text of the corresponding frame window to the designated title string. In step 3701, the method retains the designated object interface pointer as a pointer to the current UI active object. In step 3702, the method sets the title bar text of the frame window pointed by hwndFrame to the designated title string, and returns.

The variable CurrentUIActiveObject is used by other API routines to access the current UI active object. The IOLEInPlaceUIWindow interface is typically implemented by frame window container applications and by MDI document window container applications. When the SetActiveObject method of a frame window container application is invoked, then the variable CurrentUIActiveObject indicates the current UI active object. On the other hand, when the SetActiveObject method of a document window container application is invoked, then the variable CurrentUIActiveObject reflects the most recent object in that document window that is or was in the UI active state. In MDI document windows, this variable is used to restore the UI active object that last appeared in that window.

6.3.3 IOLEInPlaceFrame Interface

Table 4 in Section 4.3 lists the IOLEInPlaceFrame interface. As discussed in Section 4.3, the IOLEInPlaceFrame interface provides methods invoked by a server application to communicate with the frame window of a top level container object's container application. In this alternative embodiment, only the SetMenu method has been slightly modified.

6.3.3.1 IOLEInPlaceFrame::SetMenu

In order to allow the object linking and embedding facilities to handle menu mneumonics properly, server applications preferably invoke the SetMenu method of the IOLEInPlaceFrame interface regardless of whether the server application actually desires to participate in menu merging. Server applications preferably invoke the SetMenu method even if they do not participate in menu merging, because one of the actions performed by the SetMenu method is to call the ObjectSetMenuDescriptor function (see step 1507 in FIG. 15). This function installs and removes the special window procedure defined by the object linking and embedding facilities. The special window procedure both handles distributing input events triggered by the composite menu bar and setting and removing the keyboard focus to properly handle menu mneumonics on a window system similar to Microsoft Windows 3.1 (see Code Table 5 and the corresponding text). Thus, in order for menu mneumonics to be handled properly, a server application preferably invokes the SetMenu method even if it does not wish to participate in menu merging.

Figure 38:
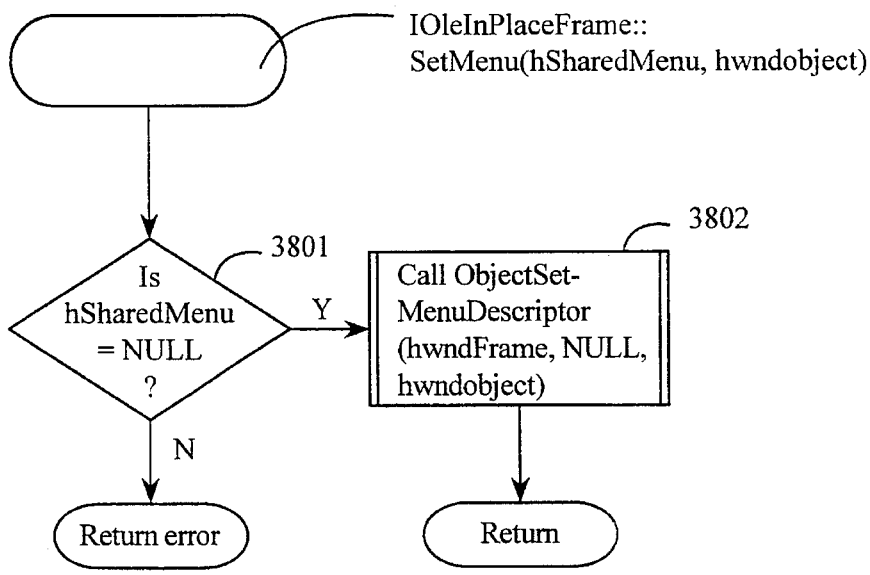
FIG. 38 is a flow diagram of a typical implementation of the IOLEInPlaceFrame::SetMenu method for a server application that does not wish to participate in menu merging.

FIG. 38 is a flow diagram of a typical implementation of the IOLEInPlaceFrame::SetMenu method for a server application that does not wish to participate in menu merging. In step 3801, the method determines whether the designated menu parameter is null and, if so, continues in step 3802, else returns an error. In step 3802, the method calls the ObjectSetMenuDescriptor method with the window handle of the frame window, a null parameter corresponding to the composite menu bar and the designated window handle of the containee object, and returns. A server application that wishes to participate in menu merging should provide an implementation similar to that described in FIG. 15.

As described with reference to FIG. 15, the first parameter to the SetMenu method is a pointer to the composite menu bar. The embodiment described in Sections 1–5 discusses one implementation of the shared menu data structure implementing a composite menu bar (see FIG. 25). One skilled in the art will recognize that, instead of the shared menu data structure 2501 containing as its first item a pointer to the composite menu bar 2502, the composite menu bar can be maintained separately. One reason to separate the composite menu bar from the indexing structure supporting the integrated menus is to hide the internal integration information from server applications. If this alternate data structure is used, then the SetMenu method shown in FIGS. 15 and 38 is implemented by passing two menu related parameters: one parameter to the internal integration information and one parameter to the actual menu bar. One skilled in the art will recognize that other alternatives are possible.

6.3.4 IOLEInPlaceParent Interface

Table 8 lists the IOLEInPlaceParent interface. As discussed with reference to FIG. 36, an embedded or linked object uses this interface when it is in-place activated to communicate with its immediate container object.

TABLE 8

```
interface IOLEInPlaceParent: public IOLEWindow {public:
    virtual SCODE CanInPlaceActivate ( ) = 0;
    virtual SCODE OnInPlaceActivate ( ) = 0;
    virtual SCODE OnUIActivate ( ) = 0;
    virtual SCODE OnUIDeactivate ( ) = 0;
    virtual SCODE OnDeactivate ( ) = 0;
    virtual SCODE GetWindowContext (
            IOLEInPlaceFrame *pFrame,
            IOLEInPlaceUIWindow *pDoc,
            LPRECT lprectChildPosition,
            LPRECT lprectClipRect,
            LPOLEINPLACEFRAMEINFO lpFrameInfo) = 0;
    virtual SCODE Scroll (SIZE scrollextent) = 0;
    virtual SCODE OnPosRectChanged (LPRect lprcPosRect) = 0
}
```

The methods OnInPlaceActivate, OnUIActivate, OnUIDeactivate, and OnDeactivate have been modified to support inside-out objects. In addition, the ShadeBorder method has been eliminated and contained objects are preferably now responsible for drawing their own in-place (hatched) border. Also, the GetWindowContext method has been modified to return more information.

6.3.4.1 IOLEInPlaceParent::OnInPlaceActivate

The OnInPlaceActivate method is invoked by a server application to notify its immediate container that it is now in the in-place active state. Recall that each containee object in a container is associated with a client site in the container object. The containee object can communicate with the container object in general through the IOLEClientSite interface handed to it when the containee object is loaded in ObjectLoad (see FIGS. 27 and 28). In addition, each containee object that is activated in place is associated with a unique "in-place site." The in-place site is an object that is used by a contained object to communicate with its immediate container object when it is in any of the activation states associated with in-place interaction. A containee object that has been activated in place communicates with its in-place site through the IOLEInPlaceParent interface. Thus, a container application can keep track of its containee objects that have been placed in the in-place active state by either querying each in-place site or by maintaining its own list of in-place sites that contain objects currently in an in-place active state.

Figure 39:
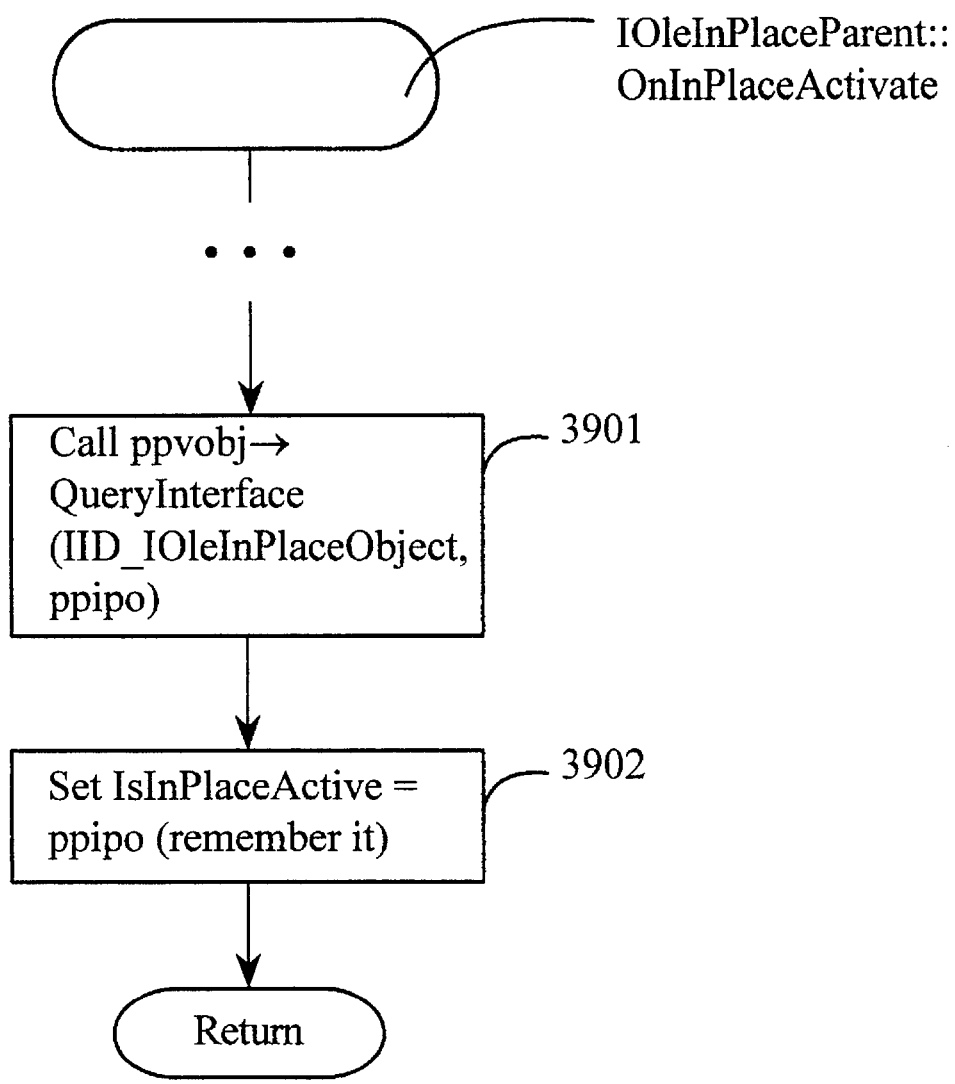
FIG. 39 is a flow diagram of a typical implementation of the IOLEInPlaceParent::OnInPlaceActivate method.

FIG. 39 is a flow diagram of a typical implementation of the IOLEInPlaceParent::OnInPlaceActivate method. In step 3901, the method calls the QueryInterface method of the corresponding object in order to get its IOLEInPlaceObject interface. Then, in step 3902, the method sets a variable to the retrieved interface pointer to remember that the corresponding object is in in-place active state, and returns. This information is used by the container of the in-place sites to transition all of the in-place active containee objects (to their running states) when the container is deactivated. In one embodiment, the container of the in-place sites maintains a list of all of its IOLEInPlaceParent interfaces which correspond to contained objects that have been placed in the in-place active state.

6.3.4.2 IOLEInPlaceParent::OnUIActivate

The OnUIActivate method removes all of an immediate container's menus and tools, as appropriate, in preparation for the containee object transitioning to the UI active state. In addition, if the container contains another object that is the current UI active object (somewhere in its containment hierarchy), then the container deactivates the user interface resources of that object. Also, if the container does not contain the current UI active object, but is an intermediate container and is not itself the current UI active object, then the method propagates the OnUIActivate call to its immediate container (to give its container a chance to deactivate the current UI active object).

Figure 40:
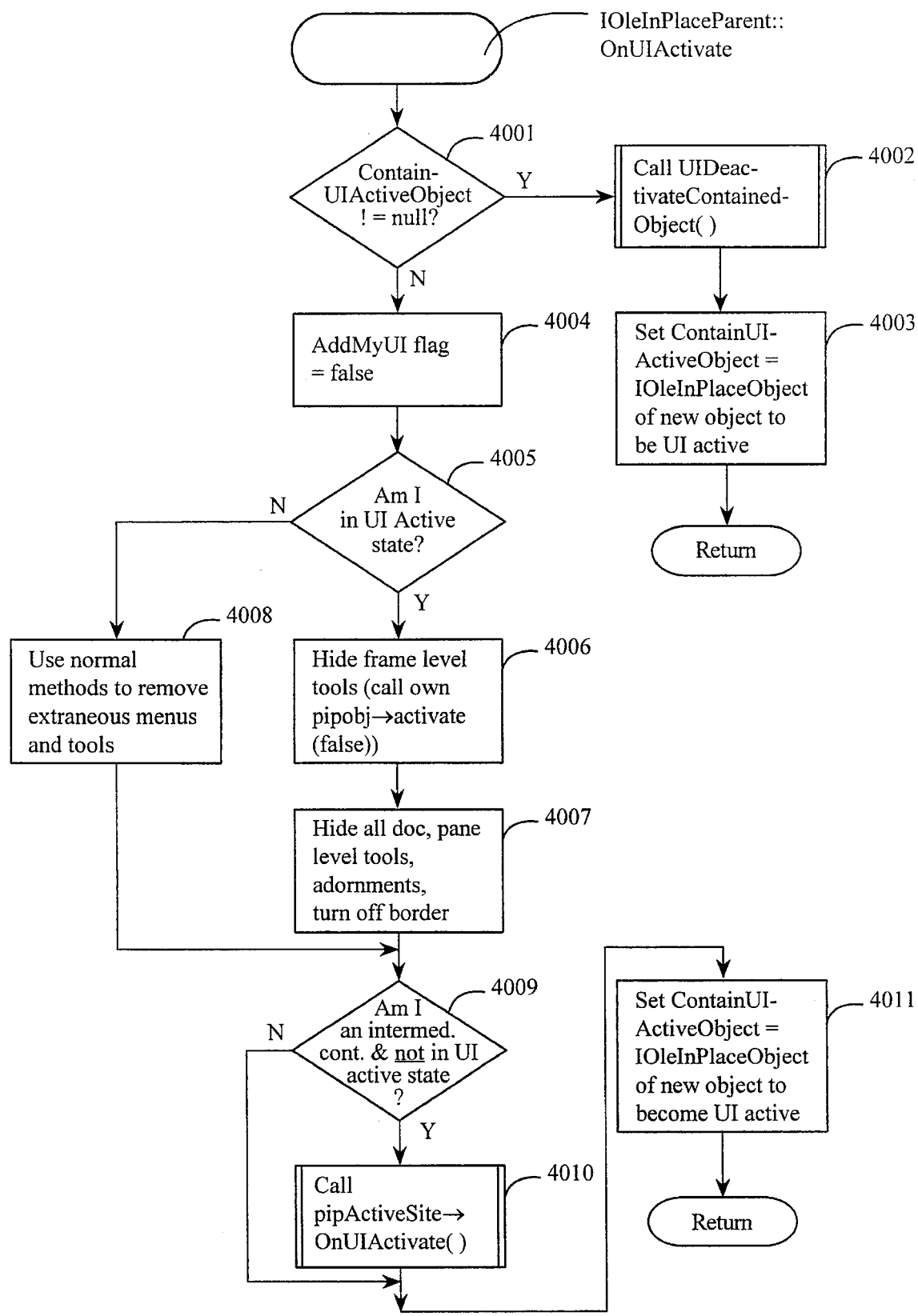
FIG. 40 is a flow diagram of a typical implementation of the IOLEInPlaceParent::OnUIActivate method.

FIG. 40 is a flow diagram of a typical implementation of the IOLEInPlaceParent::OnUIActivate method. In step 4001, the method determines whether the container contains the current UI active object (somewhere in its nested hierarchy) and, if it does, continues at step 4002, else continues in step 4004. In step 4002, the method invokes the UIDeactivateContainedObject function to deactivate the contained object that is or contains the UI active object. In step 4003, the method sets a container application variable to indicate that the new contained current UI active object is the object corresponding to this in-place site, and returns. In step 4004, the method sets a flag to indicate that the container does not desire to have its user interface displayed. In step 4005, the method determines whether the specified container is itself in the UI active state and, if so, continues in step 4006, else continues in step 4008. In step 4006, the method hides its frame tools by calling its own activate method. In step 4007, the method hides all of its document level tools and adornments and turns off its in-place border. If instead the specified container is not in the UI active state (that is, it is the top level container), then in step 4008 the method uses other mechanisms to remove any extraneous menus and tools and continues in step 4009. In step 4009, the method determines whether the specified container is an intermediate container and also not in the UI active state. If so, the method continues at step 4010, else continues in step 4011. In step 4010, the method propagates the OnUIActivate call to its immediate container to give the immediate container a chance to deactivate the current UI active object. In step 4011, the method sets a container application variable to indicate that the new contained current UI active object is the one corresponding to this in-place site, and returns.

6.3.4.3 IOLEInPlaceParent::OnUIDeactivate

The OnUIDeactivate method is invoked by a server application at the end of deactivating its user interface resources to allow its immediate container to activate its own user interface resources or not, depending upon whether the parent container application can detect that another object is going to become in-place activated. The OnUIDeactivate method is called when an inside-out object transitions from the UI active state to the window visible state, or when an outside-in object transitions from the UI active state to the in-place active state.

Figure 41:
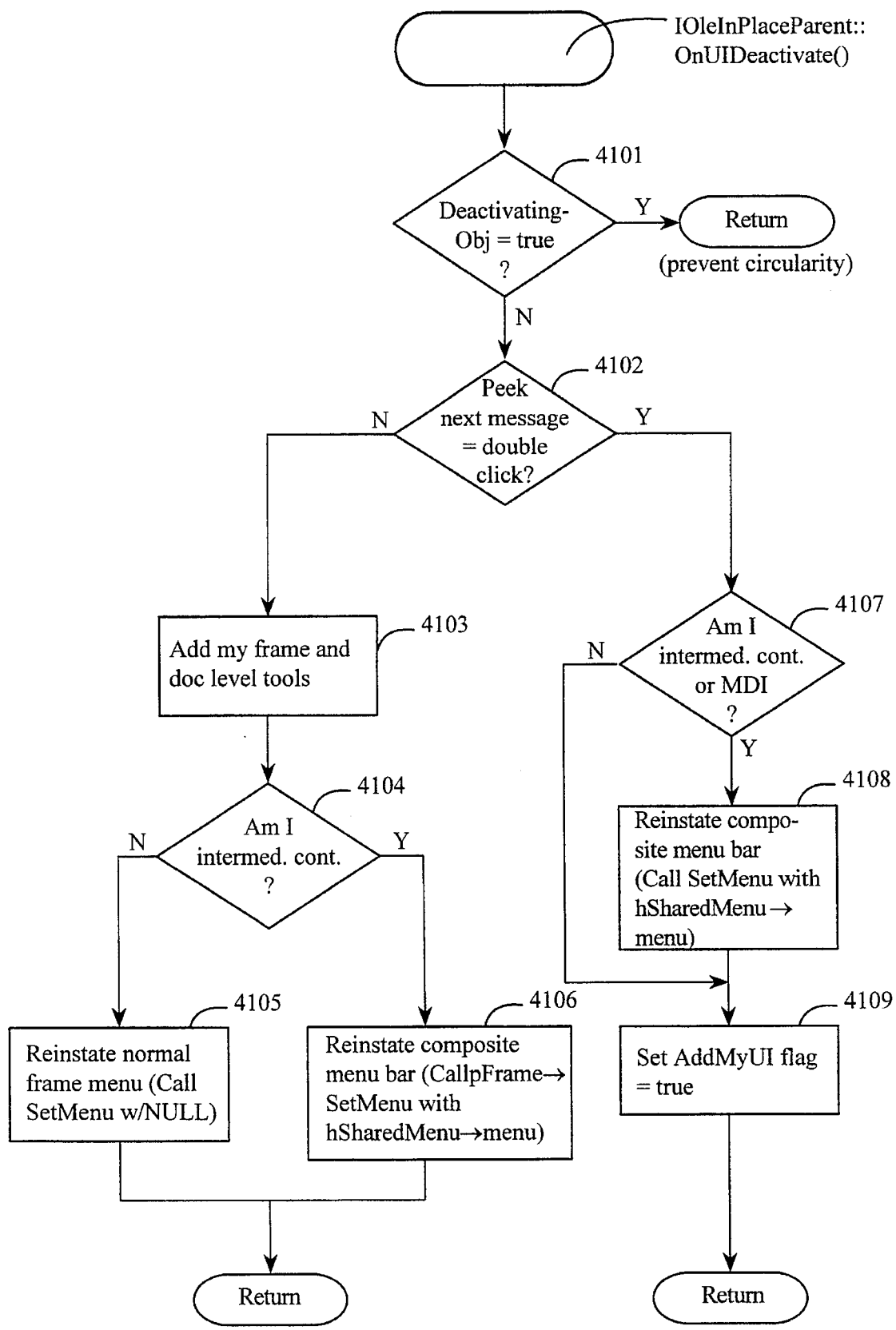
FIG. 41 is a flow diagram of a typical implementation of the IOLEInPlaceParent::OnUIDeactivate method.

FIG. 41 is a flow diagram of a typical implementation of the IOLEInPlaceParent::OnUIDeactivate method. In step 4101, if this method is called by an intermediate container while it is in the process of deactivating a containee object, then the method simply returns (in order to avoid circularities). In steps 4102–4109, the method determines whether the next message indicates that the user has requested in-place activation of an outside-in object and, if so, performs one set of behavior, otherwise performs another set. The reason the method performs different sets of behaviors is to minimize flicker that could occur from several menu bars flashing as they are displayed in the process of activating a deeply nested object.

Specifically, in step 4102, the method peeks at the next message in the application's input queue and determines whether it is a double click. The application will receive the double click message if the user has activated the specified container object or one of its contained objects using outside-in activation. If the next message is a double click event, the method continues in step 4107, else continues in step 4103. In step 4103, the method adds the container's frame and document level tools. In step 4104, the method determines whether the specified container is an intermediate container and, if so, continues in step 4106, else continues in step 4105. In step 4105, because the specified object is a top level container, the method reinstates the container object's normal frame menu and returns. In step 4106, because the specified container object is an intermediate container, the method reinstates the composite menu bar and returns. In step 4107, once the method has determined that the next input message is a double click, the method determines whether the specified container object is an intermediate container or an MDI document window. If so, the method continues at step 4108, else continues at step 4109. In step 4108, the method reinstates the composite menu bar. In step 4109, the method sets a flag to indicate that the container desires to display its user interface resources, and returns. This flag is used when the double click message is handled to put up the specified container object's user interface resources.

6.3.4.4 IOLEInPlaceParent::OnDeactivate

Figure 42:
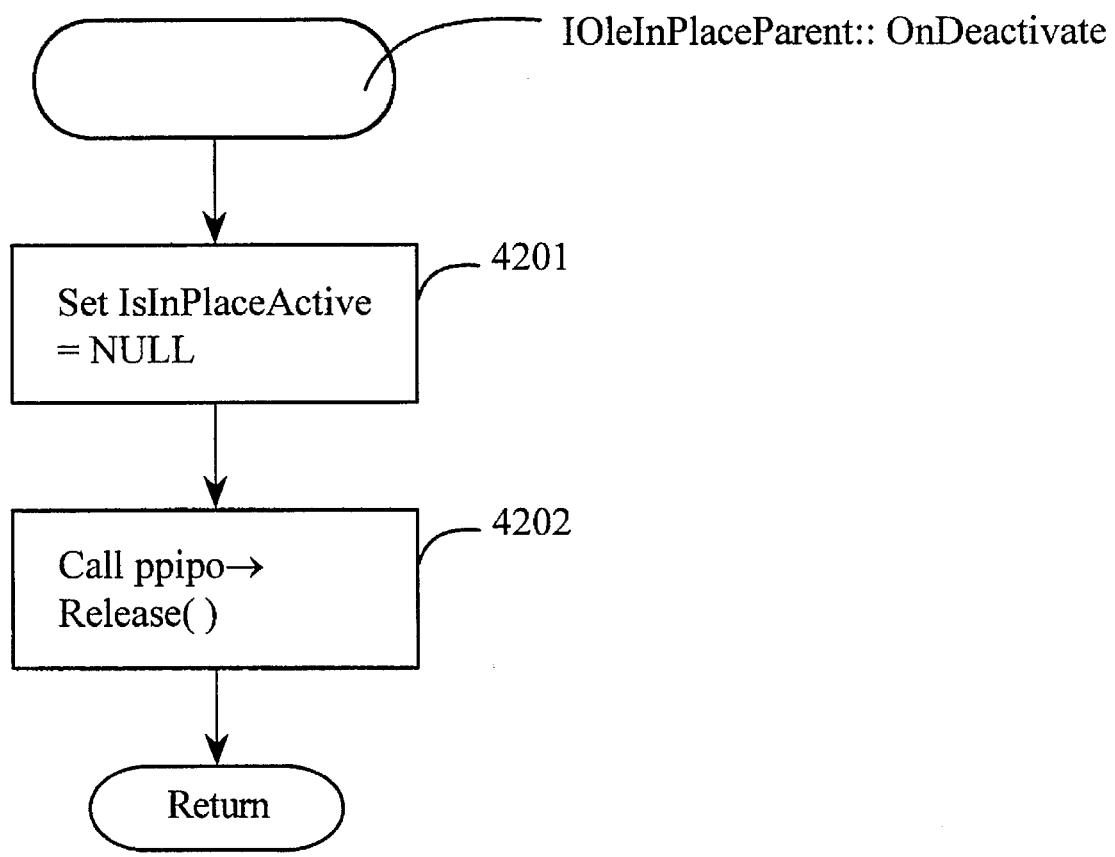
FIG. 42 is a flow diagram of a typical implementation of the IOLEInPlaceParent::OnDeactivate method.

The OnDeactivate method is invoked by a server application when an inside-out or an outside-in object is transitioning from the in-place active state to the running state. FIG. 42 is a flow diagram of a typical implementation of the IOLEInPlaceParent::OnDeactivate method. The purpose of this method is to notify an object's immediate container (the in-place site within the container) that it is deactivating so that the in-place site object can note that its corresponding containee object is no longer in-place activated (see FIG. 39). In step 4201, the method resets a variable pointing to the containee object that was in the in-place active state. In step 4202, the method releases the pointer to the IOLEInPlaceObject interface of the containee object that was previously stored as an indication that the corresponding object was in the in-place active state and returns.

6.3.4.5 IOLEInPlaceParent::GetWindowContext

The GetWindowContext method returns a set of container application interfaces associated with the corresponding containee object. This method has been modified from that described in Section 4.4.7 to no longer contain a separate pointer to a pane window. In this alternative embodiment, a pane window is treated as another document window. Also, in this embodiment, an additional parameter, lprcClipRect has been added to enable a container to return a clip rectangle for the contained object. This clip rectangle includes the space for the object adornments. In addition, the accelerator table parameter has been changed to an information structure that contains all of the information needed to handle accelerators, including the accelerator table described in Sections 1–5.

Table 9 describes the information structure for the accelerator information referred to as OLEInPlaceFrameInfo. In the Microsoft Windows 3.1 environment, the accelerator table is a table of key codes and modifiers. CB is the count of bytes in the structure; fMDIApp is true if the container is an MDI application (so that the object linking and embedding facilities will dispatch MDI accelerators); hwndFrame is the handle to the container's frame window; hAccel is a handle to the container's supplied accelerator table; and cAccelEntries is the number of entries in the accelerator table.

TABLE 9

```
typedef struct tagOIFI {
    UINT cb;
    BOOL fMDIApp;
    HWND hwndFrame;
    HACCEL hAccel;
    int cAccelEntries
} OLEINPLACEFRAMEINFO;
```

6.3.4.6 IOLEInPlaceParent::Scroll

The IOLEInPlaceParent::Scroll method is invoked by an in-place active object to request its immediate container to scroll its window by the number of pixels specified by ScrollExtent, in each direction. As a result of scrolling, the container application should invoke IOLEInPlaceObject::SetVisRects to update the object's size, position, and clipping information.

6.3.4.7 IOLEInPlaceParent::OnPosRectChanged

The IOLEInPlaceParent::OnPosRectChanged method is invoked by an in-place active object when editing causes the in-place active object to change its extent. The lprcPosRect is a pointer to a rectangle containing the new size and position of the object. This method enables the parent container to recompute the space it has allocated for displaying the in-place active containee object. If the parent container does not wish to accept the designated new site and position of the in-place active object, then the container application preferably invokes a method of the object to communicate the desired space (e.g., IOleObject::SetExtent defined by the underlying system) and then invokes IOleInPlaceObject::SetVisRects to communicate new clipping information.

6.3.5 IOLEInPlaceObject Interface

As suggested in Section 4.5, in an alternate embodiment the IOLEInPlaceObject interface is divided into two interfaces: the IOLEInPlaceObject interface and the IOLEInPlaceActiveObject interface. The IOLEInPlaceObject interface is used by a container to communicate with its immediate embedded object at each level of the containment hierarchy. The IOLEInPlaceActiveObject interface is used by the top level container to communicate directly with the active object. Table 10 lists the IOLEInPlaceObject interface.

6.3.5.1 IOLEInPlaceObject::InPlaceDeactivate

The IOLEInPlaceObject::InPlaceDeactivate method is invoked by a container object to request that an inside-out object or outside-in object transition from the in-place active state to the running state. This method performs similar functions to invoking the DoVerb method on an inside-out object with the verb HIDE, except that this method gives the parent container an opportunity to disassociate any information maintained regarding the in-place active status of the specified object.

Figure 43:
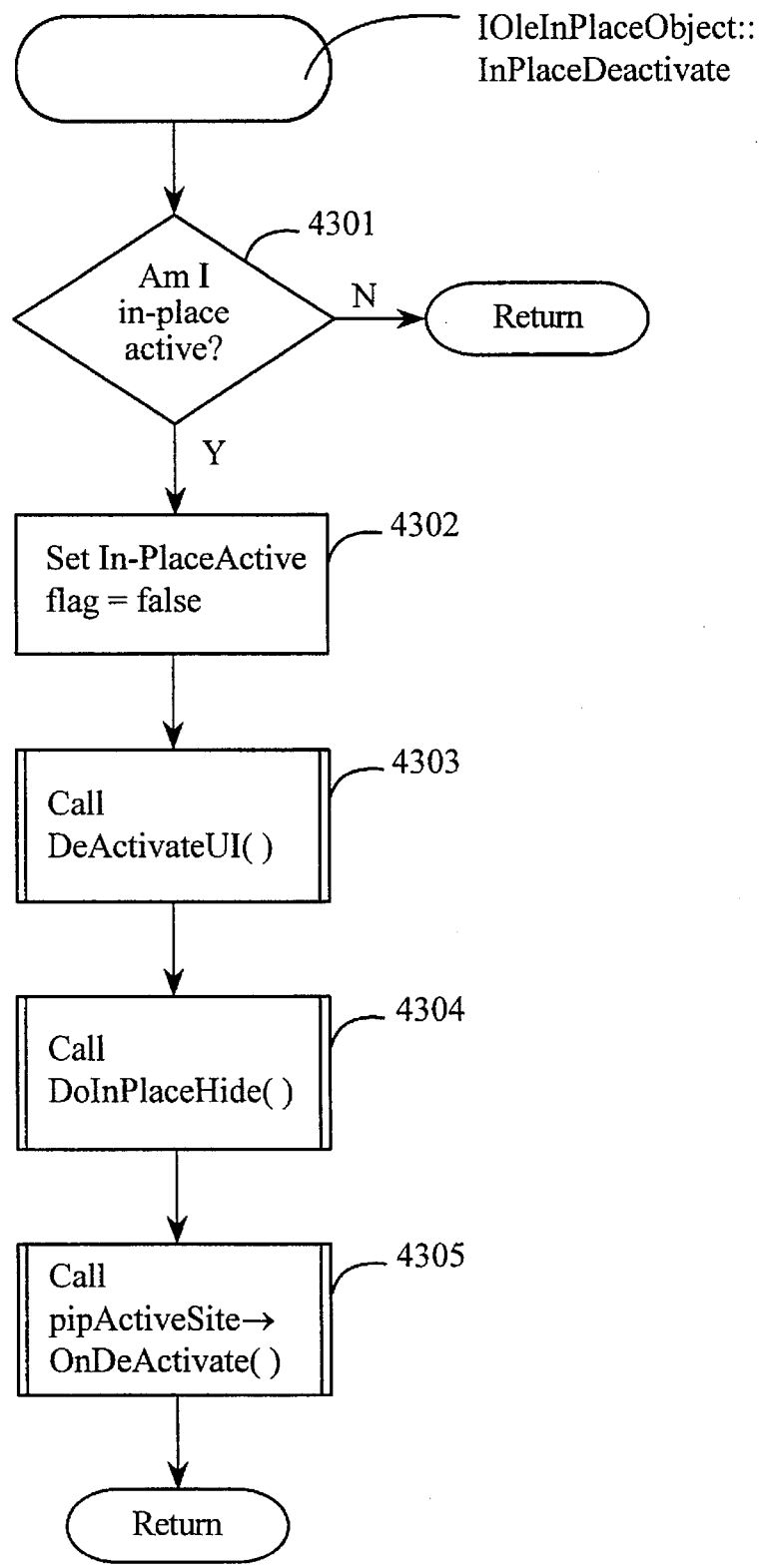
FIG. 43 is a flow diagram of a typical implementation of the IOLEInPlaceObject::InPlaceDeactivate method.

FIG. 43 is a flow diagram of a typical implementation of the IOLEInPlaceObject::InPlaceDeactivate method. The method transitions an object from any activation state to the running state, thereby making the object no longer accessible to the user. Specifically, in step 4301, the method determines whether the specified object is in the in-place active state and, if it is, continues in step 4302, else returns. In step 4302, the method sets a flag to indicate that the specified object is no longer in the in-place active state (and thus the specified object is now in the running state). In step 4303, the method invokes the DeactivateUI function to transition the object to window visible state if this action hasn't already occurred. The DeactivateUI function is discussed further below with reference to FIG. 44. In step 4304, the method invokes the DoInPlaceHide function to make the inside-out object inaccessible to the user. The DoInPlaceHide function transitions the object to in-place active state and is discussed further below with reference to FIG. 46. In step 4305, the method invokes the immediate container's IOLEInPlaceParent::OnDeactivate method to provide the immediate container object an opportunity to deallocate resources, and returns.

6.3.5.2 Server Application Function - DeactivateUI

The DeactivateUI function is provided by a server application to transition an object from the UI active state to the window visible state. In the case of an outside-in object, this function is invoked in conjunction with the DoInPlaceHide function to transition the object from the UI active state to the in-place active state. (See FIG. 48.) Note that once an inside-out object has deactivated its user interface, it is still available to the user for later quick re-activation because its object window is still displayed. (Recall that displaying the object window allows the server application to receive input events directly and the server application is responsible for drawing the object when requested.)

Figure 44:
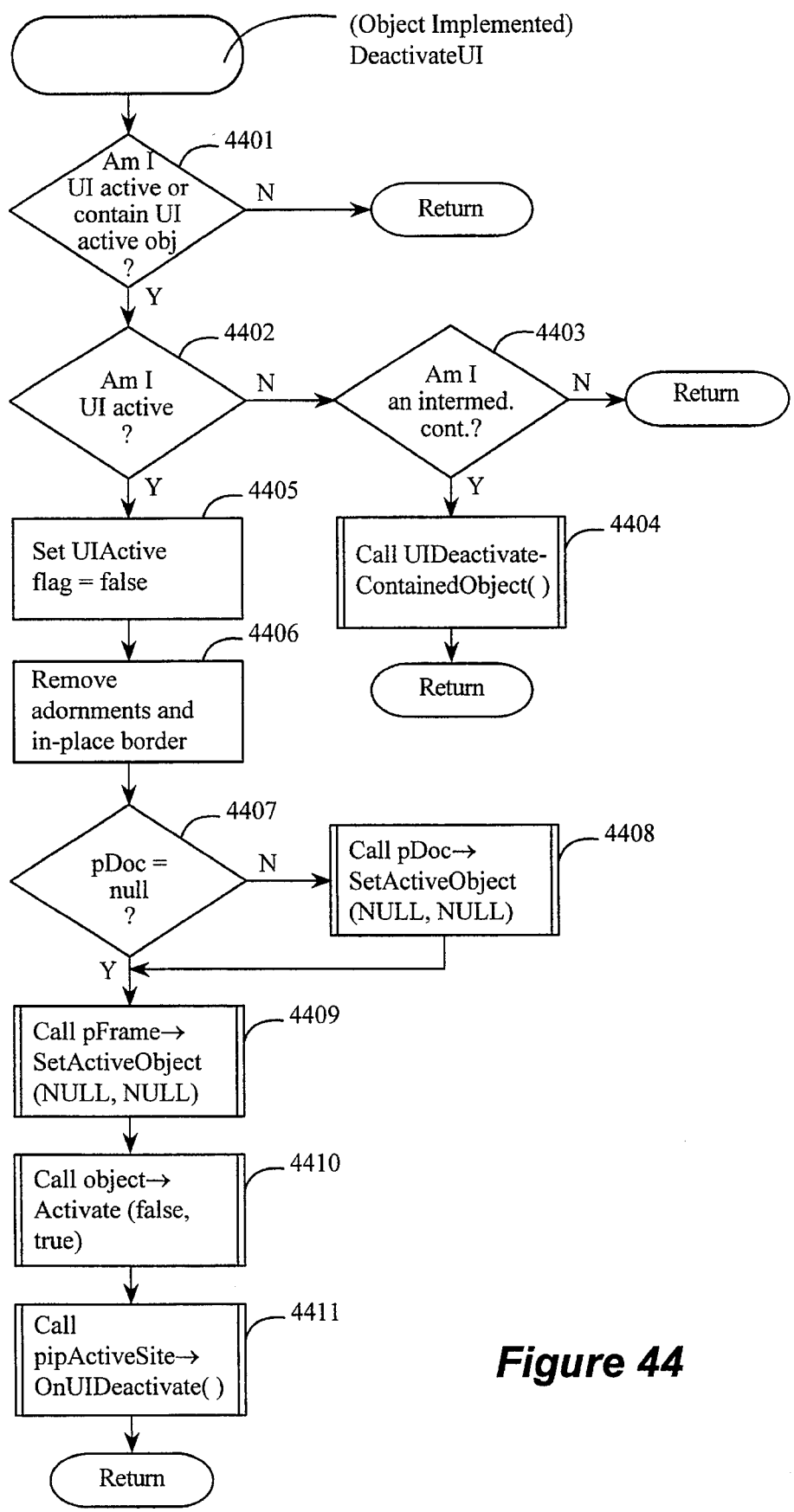
FIG. 44 is a flow diagram of a typical implementation of the DeactivateUI function implemented by a server application.

FIG. 44 is a flow diagram of a typical implementation of the DeactivateUI function implemented by a server application. In step 4401, the method determines whether the object is in the UI active state or contains an object which is in the UI active state and, if so, continues at step 4402, else returns. In step 4402, the method determines whether the object is in the UI active state and, if so, continues in step 4405 to transition the object to the window visible state, otherwise continues in step 4403. In step 4403, if the method determines that the specified object is an intermediate con-

TABLE 10

```
interface IOleInPlaceObject: IOleWindow {
    virtual HRESULT InPlaceDeactivate ( ) = 0;
    virtual HRESULT UIDeActivate ( ) = 0;
    virtual HRESULT SetVisRects (LPRECT lprcProsRect, LPRECT lprcClipRect) = 0;
};
``` tainer, then the method continues in step 4404 to deactivate the user interface of the contained UI active object and then returns. Otherwise, the method just returns. In step 4405, the method sets a flag indicating that the object is no longer in the UI active state. In step 4406, the method removes any object adornments and the in-place border. In step 4407, if the object is contained within a document window, then the method continues at step 4408, else it continues at step 4409. In step 4408, the method invokes the IOLEUIWindow::SetActiveObject method of the document window to notify the document window that it can remove the object as its remembered current UI active object, and continues in step 4409. In step 4409, the method calls the IOLEInPlaceFrame::SetActiveObject method of the top level container to notify the top level container that the object is no longer the current UI active object. In step 4410, the method calls the Activate method of the object's IOLEInPlaceActiveObject interface to deactivate the remainder of its user interface. In step 4411, the method calls the IOLEInPlaceParent::OnUIDeactivate method of its immediate container to give its immediate container a chance to reinstall its own user interface, and returns.

6.3.5.3 Server Application Function - UIDeactivateContainedObject

Figure 45:
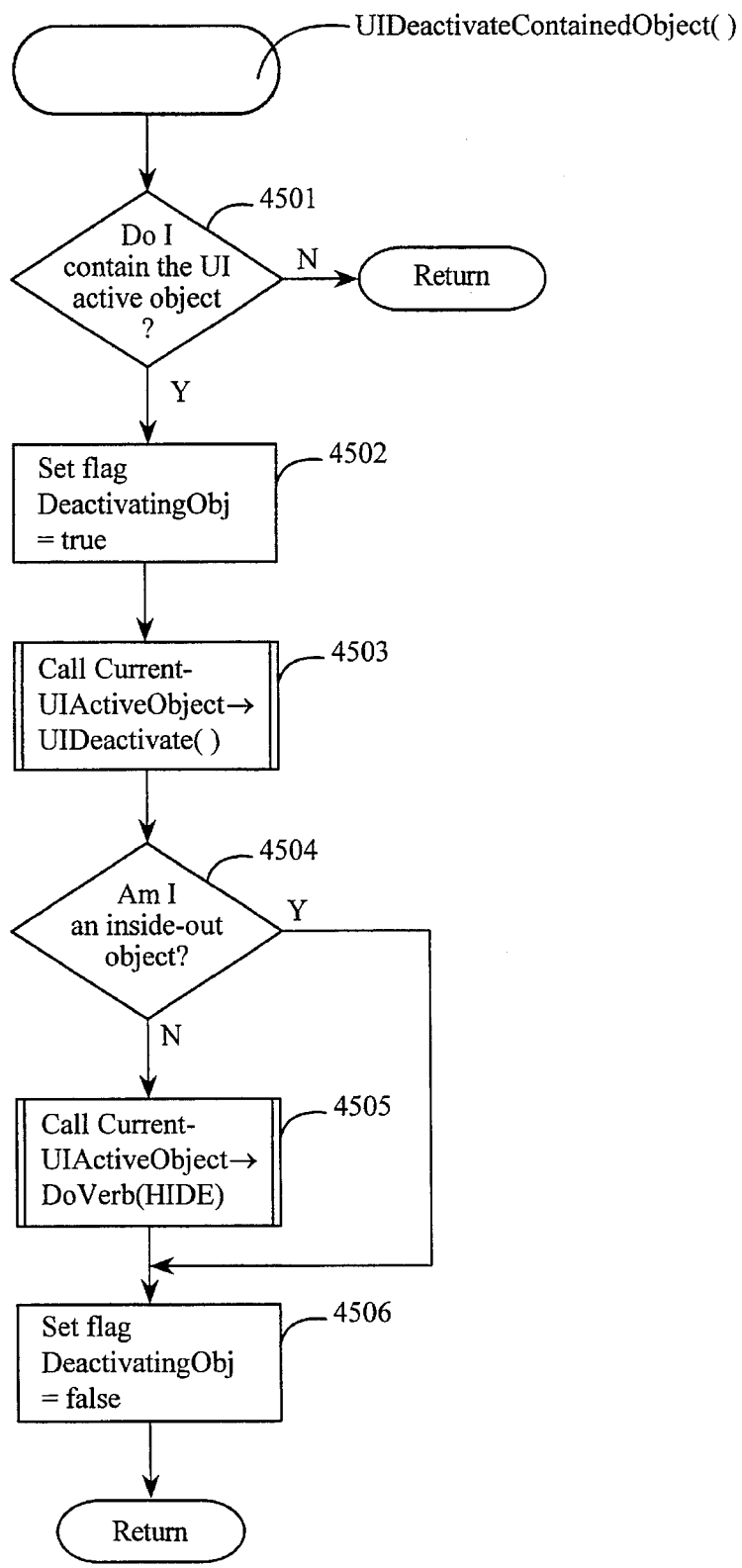
FIG. 45 is a flow diagram of a typical implementation of the UIDeactivateContainedObject function implemented by a server application.

The UIDeactivateContainedObject function is provided by a server application implementing an intermediate container to request a contained object to transition itself from the UI active state to the in-place active state. FIG. 45 is a flow diagram of a typical implementation of the UIDeactivateContainedObject function implemented by a server application. In step 4501, the function determines whether the intermediate container contains the current UI active object (somewhere in its containment hierarchy). If so, the function continues in step 4502, else returns. In step 4502, the function sets a flag indicating that the server application is in the process of deactivating a contained object. This flag is used to prevent circular invocation when the contained object invokes the OnUIDeactivate method. In step 4503, the function invokes the UIDeactivate method of the object containing the current UI active object. In step 4504, the function determines whether the object associated with this server application is an inside-out object and, if so, continues at step 4506, else continues in step 4505. In step 4505, the function invokes the DoVerb method with the verb HIDE on the object containing the current UI active object, in order to transition the object (an outside-in object) from the UI active state to the in-place active state. (Recall that an inside-out object only transitions to the window visible state when its user interface is deactivated, and thus its object window is typically not hidden.) In step 4506, the routine resets the flag indicating that the server application is in the process of deactivating a contained object to false, and returns.

6.3.5.4 Server Application Function- DoInPlaceHide

Figure 46:
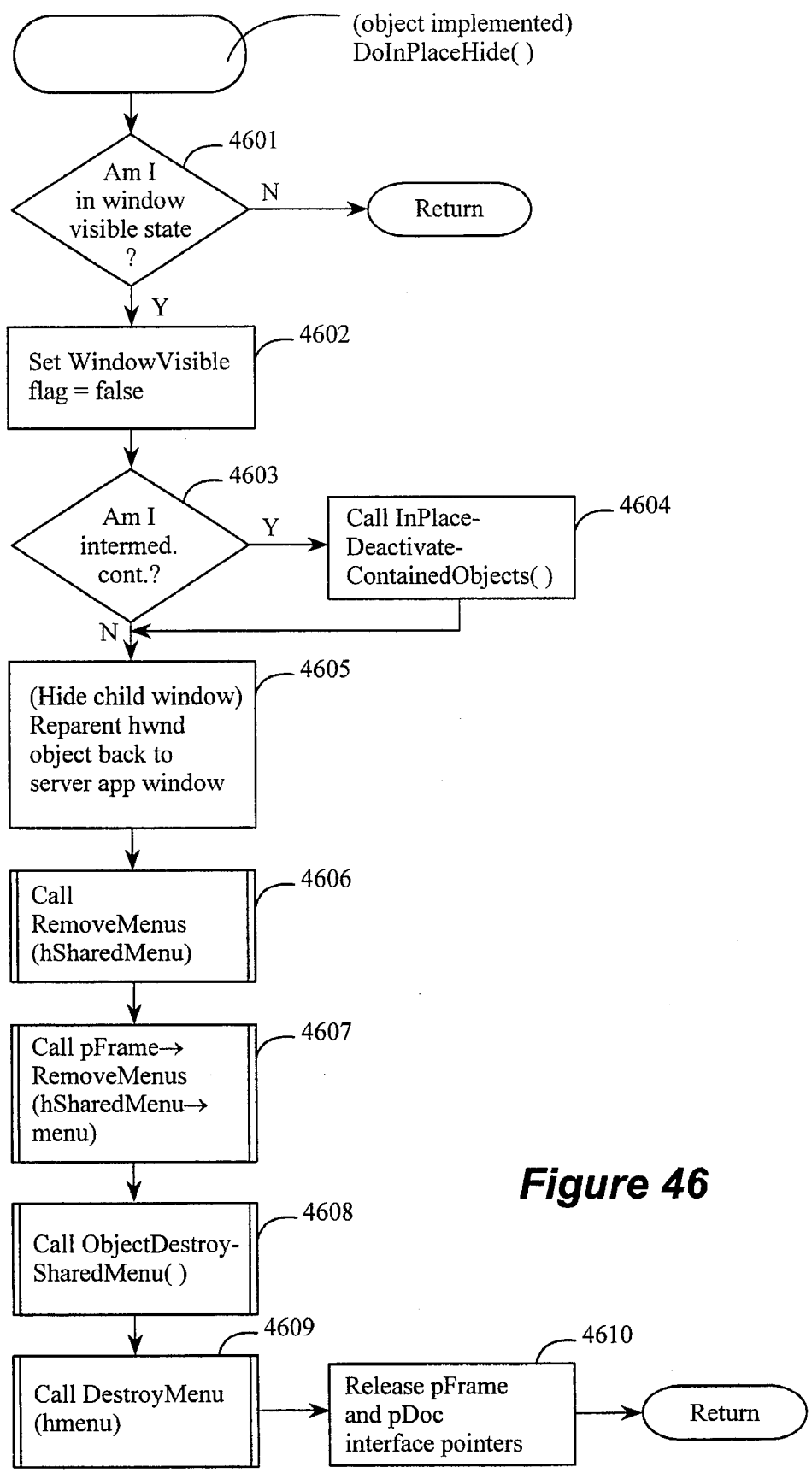
FIG. 46 is a flow diagram of a typical implementation of the DoInPlaceHide function implemented by a server application.

The DoInPlaceHide function is provided by a server application to transition an inside-out object from the window visible state into the in-place active state and to assist in transitioning an outside-in object from the UI active state to the in-place active state. FIG. 46 is a flow .diagram of a typical implementation of the DoInPlaceHide function implemented by a server application. This function hides the object window of the server application by reparenting it to the server application instead of the container application (see FIG. 13), disassembles the composite menu bar, and releases interface pointers to the object's immediate container.

Specifically, in step 4601, the function determines whether the object is in window visible state and, if so, continues at step 4602, else returns. (Recall that each activation state encompasses a prior activation state. Thus, an outside-in object when it is in the UI active state is also in the window visible state even though it cannot enter the window visible state as a user accessible intermediate state.) In step 4602, the function sets a flag to indicate that the object is no longer in the window visible state. In step 4603, the function determines whether the object is an intermediate container and, if so, continues at step 4604, else continues in step 4605. In step 4604, the function invokes the InPlaceDeactivateContainedObjects function to request any contained objects which are in the in-place active state to transition themselves to the running state. Preferably, this step will deactivate all inside-out objects as well and make them no longer accessible to the user. The function then continues in step 4605. In step 4605, the function hides the object window by reparenting the window back to the server application. In step 4606, the function invokes the RemoveMenus function described in Code Table 3 in Section 4.6.4 to remove the server application menus from the composite menu bar. In step 4607, the function invokes the IOLEInPlaceFrame::RemoveMenus method of the top level container to enable the top level container to remove its menus from the composite menu bar. The IOLEInPlaceFrame::RemoveMenus method is described in detail in Section 4.3.3. In step 4608, the function invokes the object linking and embedding facility ObjectDestroySharedMenu function to remove any other composite menu bar resources. The ObjectDestroySharedMenu function is described in detail in Section 4.7.4. In step 4609, the function invokes the underlying window system DestroyMenu function to destroy the server application menus. In step 4610, the function releases the IOLEInPlaceFrame and IOLEInPlaceUIWindow interface pointers, and returns.

6.3.5.5 Server Application Function - InPlaceDeactivateContainedObjects

The InPlaceDeactivateContainedObjects function is provided by a server application implementing an intermediate container to transition contained objects from the in-place active state to the running state. The function consults its list of in-place sites to determine which sites contain objects that are in-place active. (Recall from FIG. 39 that an in-place site remembered this information by setting a variable.) How this function obtains a list of the contained objects is dependent upon the implementation. For example, one skilled in the art would recognize that this function could query each in-place site for the contents of the variable, or the container application could link the in-place sites that have in-place active objects into a separate list. A variety of other implementations are possible.

Figure 47:
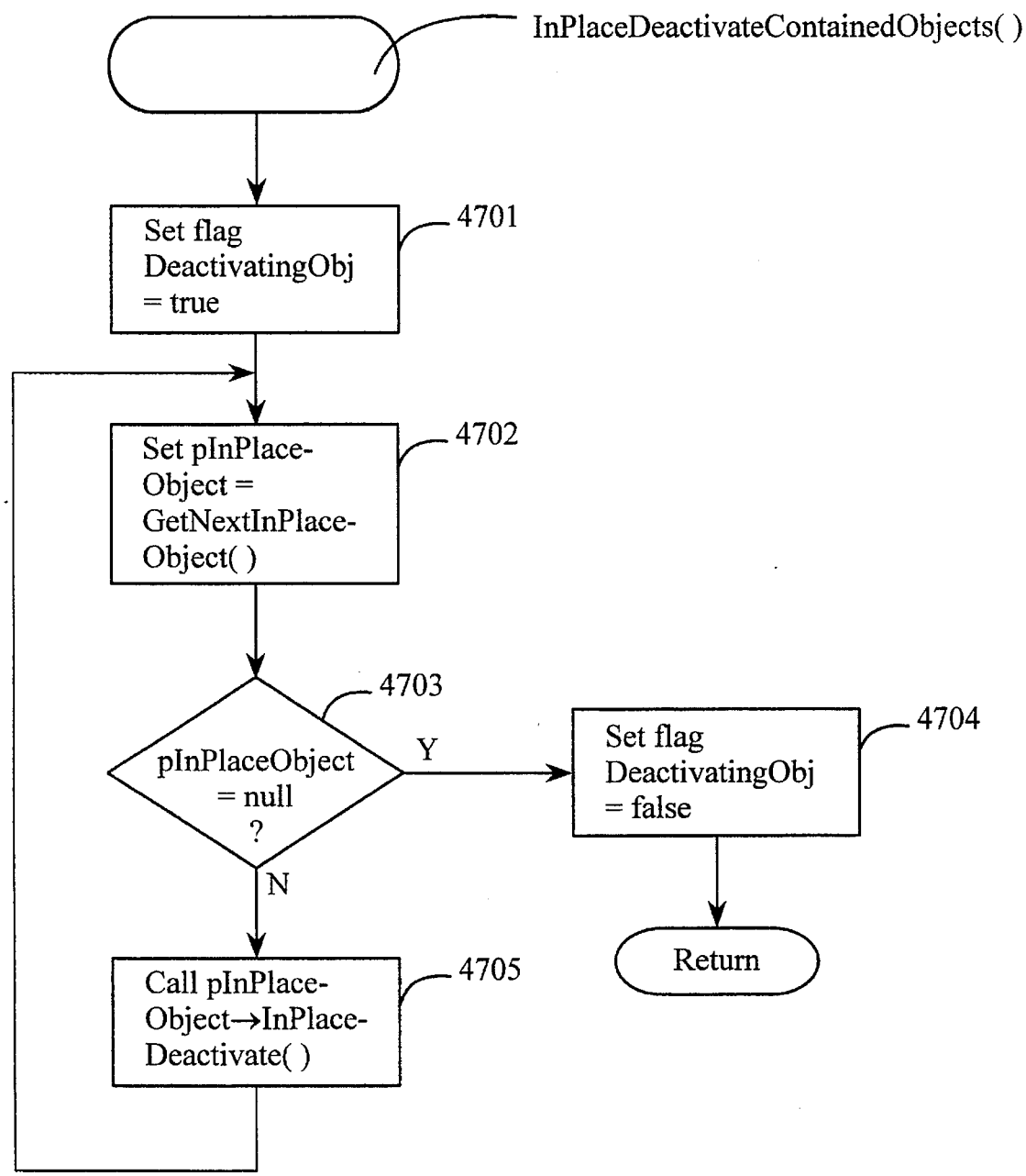
FIG. 47 is a flow diagram of a typical implementation of the InPlaceDeactivateContainedObjects function implemented by a server application.

FIG. 47 is a flow diagram of a typical implementation of the InPlaceDeactivateContainedObjects function implemented by a server application. In step 4701, the function sets a flag to indicate that the server application is in the process of deactivating a contained object. In steps 4702–4704, the function loops over all of the in-place activated objects the container (or in-place sites) has (have) remembered, requesting each containee object to deactivate itself. Specifically, in step 4702, according to one implementation, the function sets a variable to point to the next in-place object in a list of contained objects that are activated in place. In step 4703, the function determines whether there are any objects remaining on the list and, if so, continues in step 4705, else continues in step 4704. In step 4704, the function invokes the IOLEInPlaceObject::InPlaceDeactivate method of the next object on the list and then continues at the beginning of the loop in step 4702. In step 4705, when the list is exhausted, the function resets the flag to indicate that it is no longer deactivating a contained object, and returns.

6.3.5.6 IOLEInPlaceObject::UIDeactivate

Figure 48:
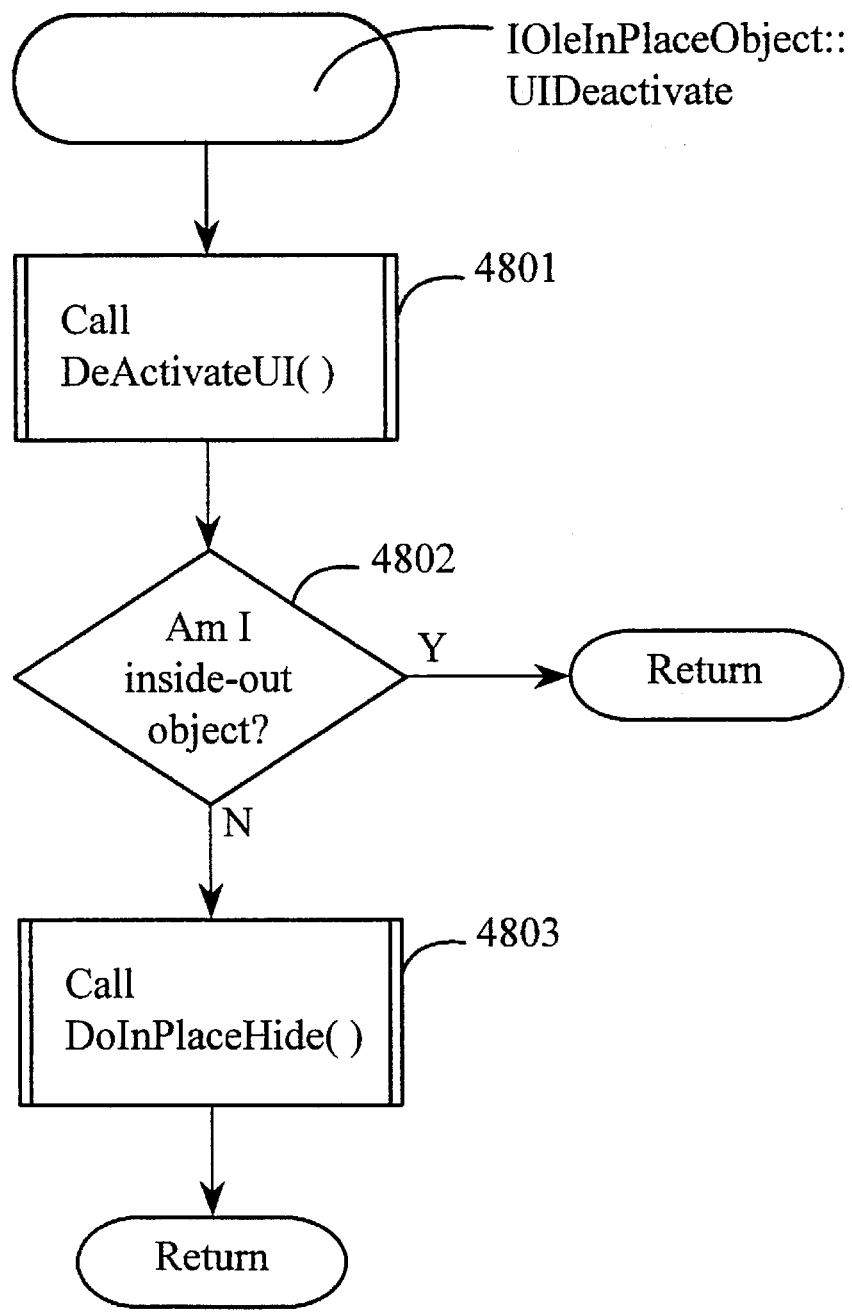
FIG. 48 is a flow diagram of a typical implementation of the IOLEInPlaceObject::UIDeactivate method.

The UIDeactivate method (renamed from InPlaceUIDeactivate to correspond more clearly to the state transition of inside-out objects) transitions an inside-out object from the UI active state to the window visible state and an outside-in object from the UI active state to the in-place active state. FIG. 48 is a flow diagram of a typical implementation of the IOLEInPlaceObject::UIDeactivate method. In step 4801, the method invokes the function DeactivateUI to transition the specified object from the UI active state into the window visible state. The DeactivateUI function is discussed above in detail with reference to FIG. 44. In step 4802, the method determines whether the specified object is an inside-out object and, if so, the method returns, else continues in step 4803. In step 4803, the method invokes the server application DoInPlaceHide function to transition an outside-in object further into the in-place active state by removing all of its user interface resources from the display, and returns. The DoInPlaceHide function is discussed above in detail with reference to FIG. 46.

6.3.5.7 IOLEInPlaceObject::SetVisRects

The SetVisRects method is invoked by an immediate container to communicate to a contained object, when the object is activating, the amount of the object that is actually visible. Also, a container invokes this method when either the visible object window changes or when the clip rectangle changes because of border negotiation, scrolling, or sizing the window. The lprcPosRect parameter is a pointer to a rectangle containing the position and size of the object relative to its parent window. The lprcClipRect parameter is a pointer to a rectangle containing the clipping rectangle the container is imposing on the object.

6.3.6 IOLEInPlaceActiveObject Interface

Table 11 lists the IOLEInPlaceActiveObject interface. This interface is used by the top level container to communicate directly with an in-place active object without going through the containment hierarchy.

Figure 49:
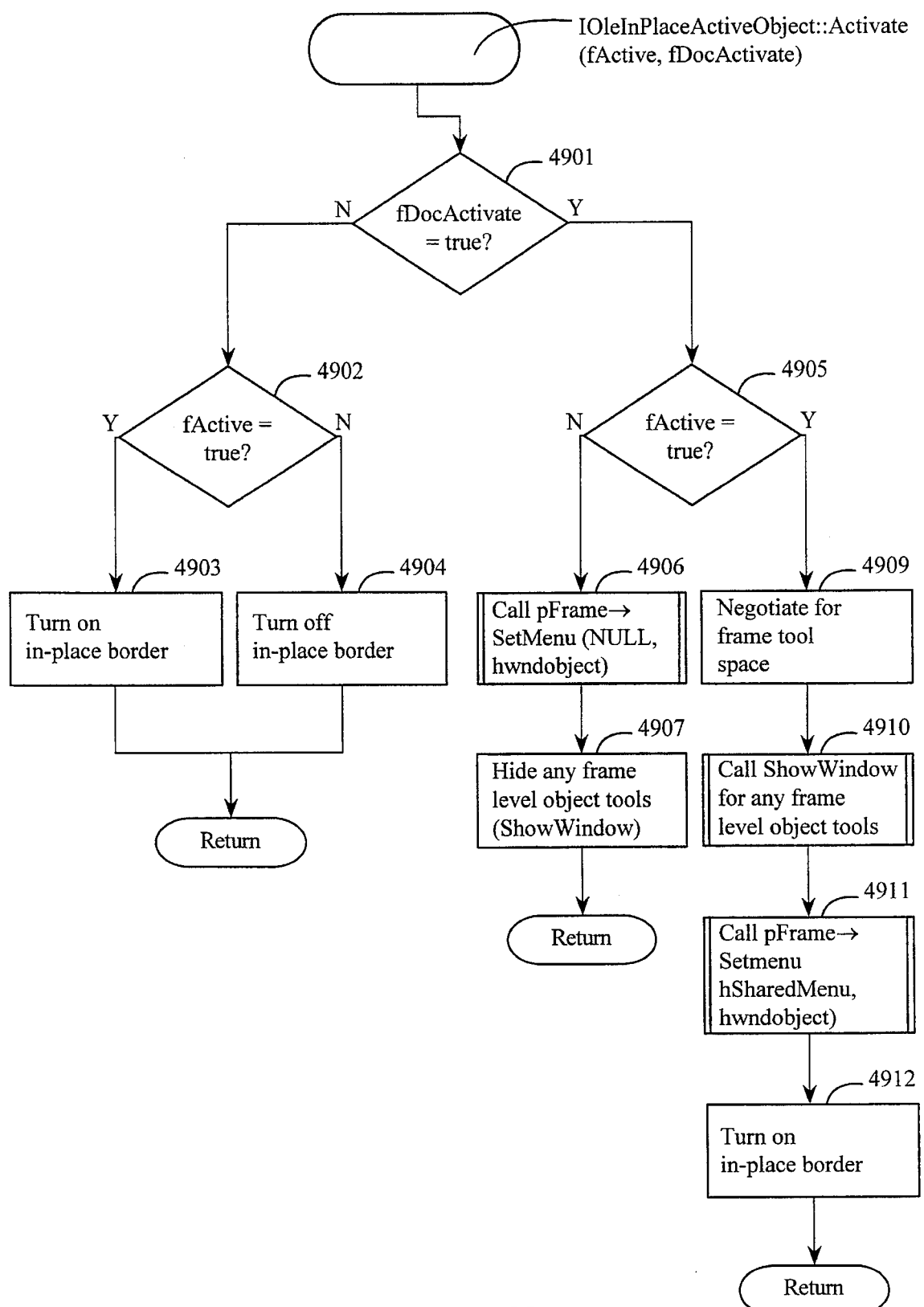
FIG. 49 is a flow diagram of a typical implementation of the IOLEInPlaceActiveObject::Activate method.

FIG. 49 is a flow diagram of a typical implementation of the IOLEInPlaceActiveObject::Activate method. In step 4901, the method determines whether it has been invoked as a result of activating or deactivating an object within the top level frame window or within a document window. If invoked to activate or deactivate an object within a frame window, the method continues at step 4902, else continues at step 4905. In step 4902, the method determines whether the specified object is to be activated and, if it is, continues at step 4903, else continues at step 4904. In step 4903, the method displays the in-place border on the specified object, and returns. In step 4904, the method removes the in-place border from around the specified object, and returns. If, on the other hand, the method has been invoked to activate or deactivate an object within a document window, then in step 4905, the method determines whether it has been invoked to activate or deactivate. If invoked to deactivate, the method continues at step 4906, else it continues at step 4909. In step 4906, the method invokes the IOLEInPlaceFrame::SetMenu method of the specified object's top level container to remove the composite menu bar. In step 4907, the method hides any other frame level object tools, and returns. In step 4909, the method negotiates with the top level container for frame tool space. In step 4910, the method displays any frame level object tools other than the menu bar. In step 4911, the method invokes the IOLEInPlaceFrame::SetMenu method to install the composite menu bar. In step 4912, the method displays the in-place border around the specified object, and returns.

6.3.6.2 IOLEInPlaceActiveObject::ResizeBorder

The ResizeBorder method is called by the top level container application to request the server application to resize the user interface tools the server application has placed within the document windows of its parent container application. This method is the same as that discussed in Section 4.5.5 with the addition of a parameter lpUIWindow. The lpUIWindow parameter points to the interface that the

TABLE 11

```
interface IOLEInPlaceActiveObject: public IOLEWindow {public:
    virtual SCODE TranslateAccelerator (LPMSG lpmsg) = 0;
    virtual SCODE Activate (BOOL fActivate, BOOL fDocActivate) = 0;
    virtual SCODE ResizeBorder (RECT borderRect, IOleInPlaceUIWindow FAR* lpUIWindow) = 0;
    virtual SCODE EnableModeless (BOOL fEnable) = 0;
```

6.3.6.1 IOLEInPlaceActiveObject::Activate

The activate method installs or removes the frame level user interface resources in or from the frame window of the top level container object, depending upon whether the designated flag fActive is true or false. If invoked when an object is activated or deactivated within an intermediate container object (or at the caller's discretion to activate/deactivate the frame level tools including the composite menu bar), this method installs or removes the composite menu bar associated with the current UI active object and an in-place border around the specified object. If instead invoked when an object within the top level container's frame window is activated or deactivated, this method displays an in-place border around the specified object if it is being activated, otherwise removes it. One skilled in the art would appreciate that, instead of passing in an additional parameter to decide whether the method is being invoked by a top level container, this method could be broken up into two methods: one method to be called when the top level container (frame window) is activating an object, and one to be called when a document window is activating an object.

server application should use to begin another tool placement negotiation loop using the QueryBorderSpace and SetBorderSpace methods.

6.3.6.3 Server Application Function- ActivateUI

The ActivateUI function is implemented by a server application to control activation of the user interface resources of the designated window. This high level function activates the frame and document level tools and adornments, draws the in-place border around the corresponding object, and displays the composite menu bar.

Figure 50:
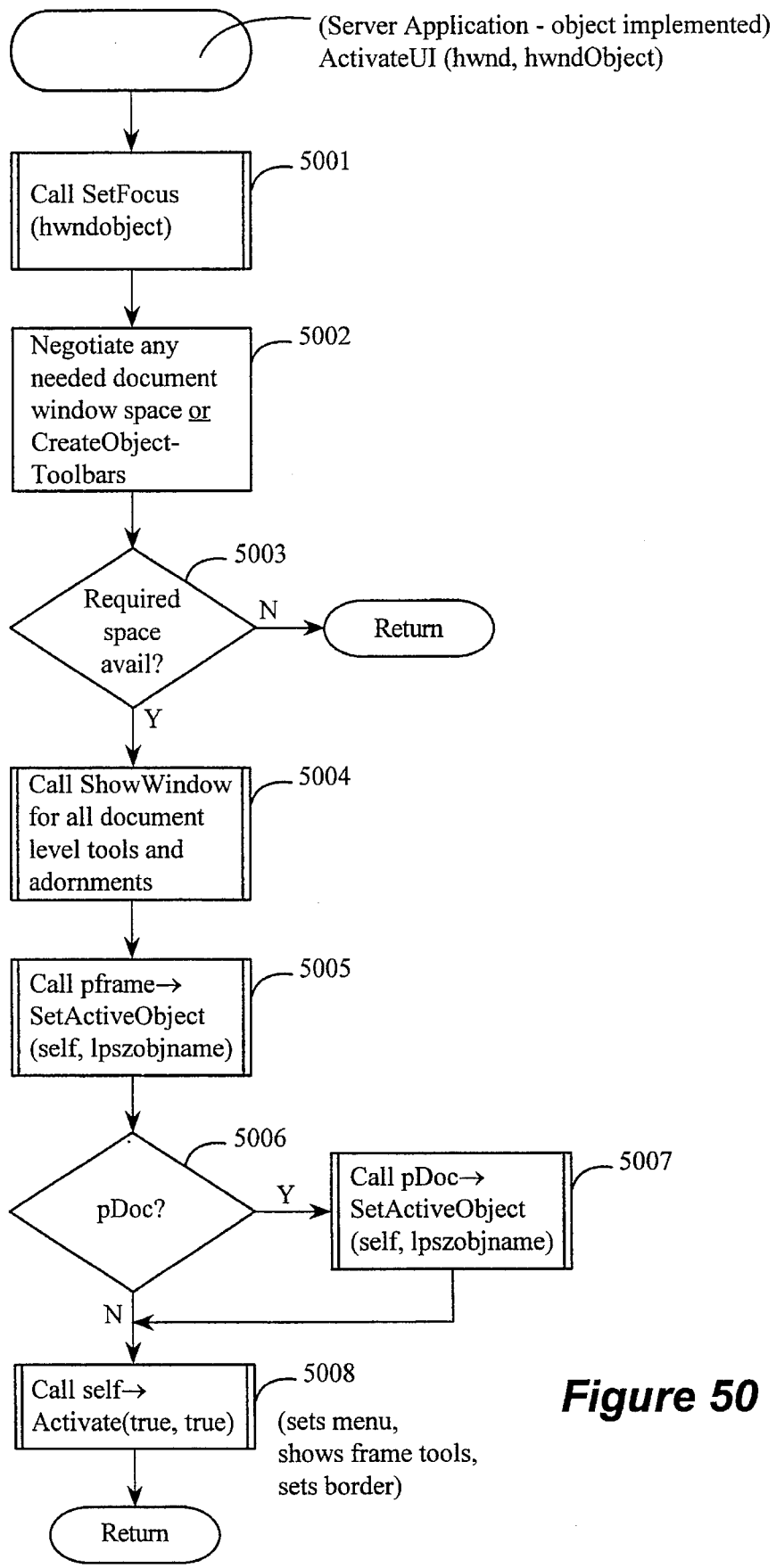
FIG. 50 is a flow diagram of a typical implementation of the ActivateUI function implemented by a server application.

FIG. 50 is a flow diagram of a typical implementation of the ActivateUI function implemented by a server application. The function takes one parameter: a window handle of a containee object window. In step 5001, the function sets the keyboard focus to the designated window. In step 5002, the function negotiates for any needed document space and creates any necessary tools. In step 5003, the function determines whether the requested space is available and, if so, continues at step 5004, else returns. In step 5004, the function displays all desired document level tools and adornments. In step 5005, the function calls the IOLEInPlace- Frame::SetActiveObject method of the top level container to notify it that the corresponding object is becoming the current UI active object. Likewise, in step 5006, if there is an intermediate level container (document window), then in step 5007, the function invokes the IOLEInPlaceUIWindow::SetActiveObject method associated with the document window, and continues in step 5008. If in step 5006 there is no intermediate document window, then the function continues at step 5008. In step 5008, the function calls the Activate method Of its own IOLEInPlaceActiveObject interface, and then returns.

6.3.7 Object Linking and Embedding Facilities Helper Functions

In addition to interface definitions, the object linking and embedding facilities provide a set of helper functions to be used by container and server applications. In this alternate embodiment, the following functions are included and are preferably the same as those described in Section 4.5: ObjectCreateSharedMenu, ObjectDestroySharedMenu, and ObjectSetMenuDescriptor. Also recall that the SetActiveObjectHwnd and GetActiveObjectHwnd functions are replaced by methods on the document and frame window interfaces. In addition, the ObjectShade function is removed because each server application preferably implements the in-place border in its own fashion.

6.4 Use of In-Place Interaction API With Inside-Out Objects

The object linking and embedding facilities can be invoked to activate and deactivate both inside-out and outside-in objects. Section 5 describes use of the in-place interaction API to activate and deactivate outside-in objects. The following sections describe how use of these API differs with respect to activating and deactivating inside-out objects.

6.4.1 Determining the Activation Model of Objects

Inside-out and outside-in objects can be intermixed within a single container. In addition, a container can choose whether to treat a containee object as an inside-out or outside-in object if the server application implementing the containee object supports both models of activation. It is preferred that a given object should be treated in a consistent style for the entire existence of that object in a given container. However, an object that supports both inside-out and outside-in activation can be treated differently by different containers. Also, a container can impose outside-in behavior on any object by hiding the object window each time the containee object is deactivated.

Two miscellaneous status bits INSIDEOUT and ACTIVATE_WHEN_VISIBLE are supported through the global registry for use by container applications that wish to support inside-out interaction. Container applications that do not support inside-out interaction will typically not examine these status bits. To ensure proper deactivation behavior, container applications that do not wish to support inside-out interaction (regardless of the contained object's support or preference) preferably invoke DoVerb (HIDE) immediately after invoking the IOLEInPlaceObject::UIDeactivate method of a contained object. This procedure will ensure that the object window of an inside-out object will be hidden on UI deactivation and thus force the object to behave as an outside-in object. The DoVerb (HIDE) call will not have any effect on outside-in objects as they would have hidden their windows as part of UI deactivation anyway.

Container applications that wish to support inside-out interaction will examine these status bits. Server applications implementing inside-out objects preferably register and set these status bits appropriately in the persistent global registry. In summary, the ACTIVATE_WHEN_VISIBLE status bit is set by those server applications that prefer or require inside-out behavior for their implemented objects. If neither status bit is set, then the server application does not support inside-out activation, and a container application preferably treats the object as an outside-in object. If instead the INSIDEOUT status bit is set, but the ACTIVATE_WHEN_VISIBLE status bit is not set, then the server application supports inside-out interaction, but prefers its objects to be treated as outside-in objects. Thus, a container application desiring to treat such objects as inside-out objects can treat them as inside-out objects even though the server application has indicated that it prefers its objects to be treated as outside-in objects. On the other hand, if both the INSIDE-OUT and ACTIVATE_WHEN_VISIBLE status bits are set, then the server application supports inside-out interaction and the preferred behavior for the object is inside-out interaction. Thus, the ACTIVATE_WHEN_VISIBLE status bit is a hint to container applications that the object prefers to be treated as an inside-out object.

6.4.2 Activating Objects

As described earlier, once objects have been linked or embedded into a container, the user can select objects and request that certain actions be performed upon the selected objects. If the objects are outside-in objects, then the user must explicitly select them and then explicitly request an action. For example, outside-in objects can be activated in place by either double-clicking on them with the mouse or by selecting them and then selecting an action to perform from a menu. On the other hand, an inside-out object is placed in its window visible state (and is thus user accessible) when the server application implementing its immediate container loads its containee objects, when a containee object comes into view, or at some later time. Then, when the user wishes to activate the user interface of an inside-out object in place, the user selects the object with a single mouse click.

For example, FIG. 32 illustrates an inside-out object, a drop-down list 3207, that is activated in place on the budget entry form object 3205. The typical user interface behavior of a drop-down list inside-out object is as follows. When the user single-clicks on the drop-down arrow 3211, the server application responds by displaying a user interface tool, the list 3212 of possible user selections. Then, in response to the user selecting one of the items of list 3212, the server application invokes the IOLEInPlaceObject::UIDeactivate method of the drop-down list 3207 to return the drop-down list 3207 to the window visible, non-UI active, state.

The process of activating the inside-out drop-down list 3207 is accomplished in several steps. First, the window procedure for the underlying object window corresponding to the drop-down list windows 3207 is invoked by the underlying window system in response to user selection of the drop-down arrow 3211 (see, e.g., FIG. 35). (The window procedure belongs to the server application implementing the drop-down list 3207. This example presumes that there is one server application implementing all of the objects comprising the drop-down list 3207 object.) To recall, the mouse button down event causes the window procedure to wait for a button up event. Second, when the mouse button up event occurs, the window procedure invokes the DoInPlaceActivate function, requesting the server application to put the drop-down list 3207 in the UI-active state. (See, e.g., steps 3503–3504 and 3507–3511 in FIG. 35.) Third, the DoInPlaceActivate function invokes the appropriate activation methods of the server application to request the server application to transition the drop-down list 3207 into the UI active state and to process the single mouse click appropriately.

Figure 51A:
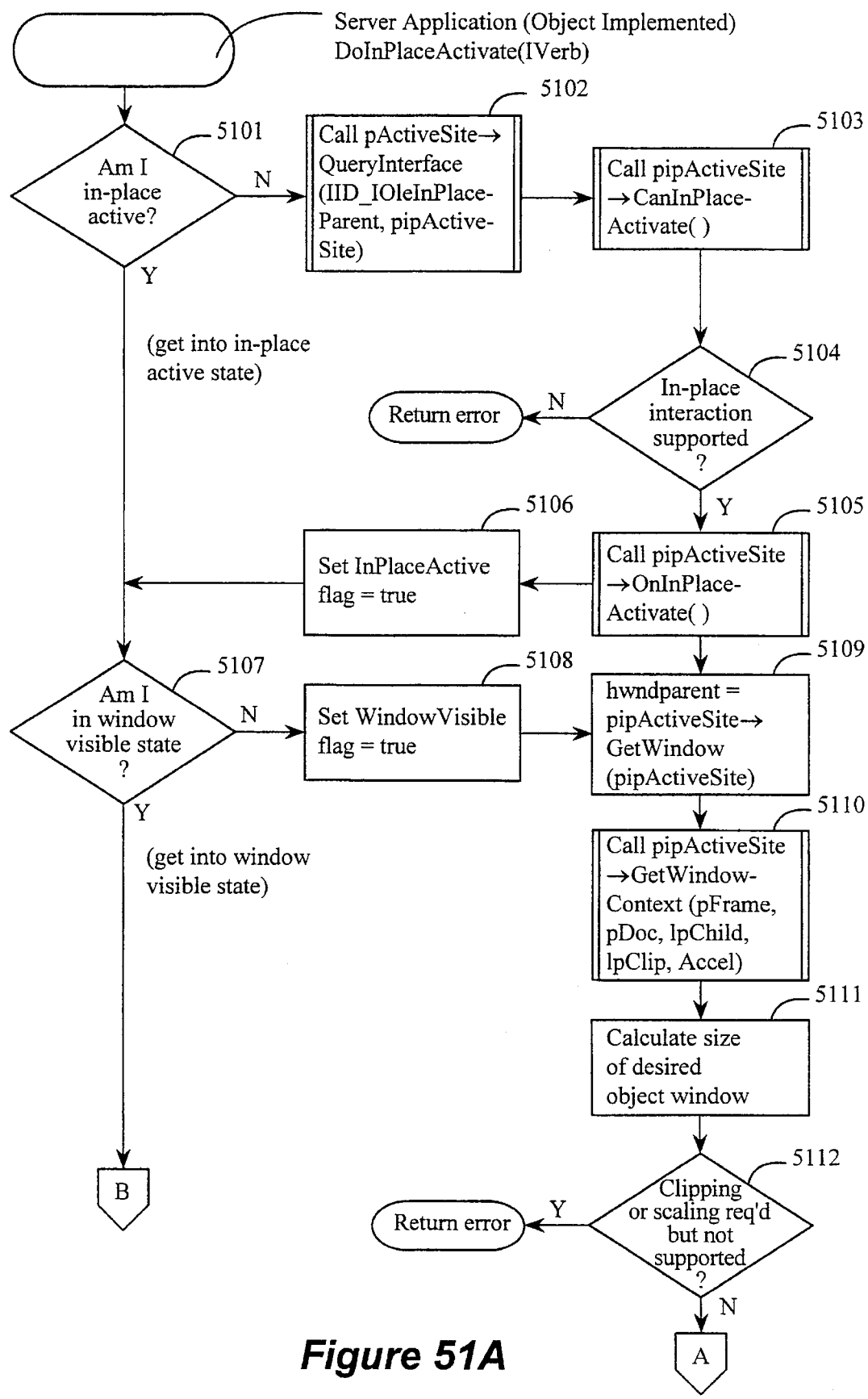
FIGS. 51A abd 51B are flow diagrams of a typical implementation of the DoInPlaceActivate function implemented by a server application.
Figure 51B:
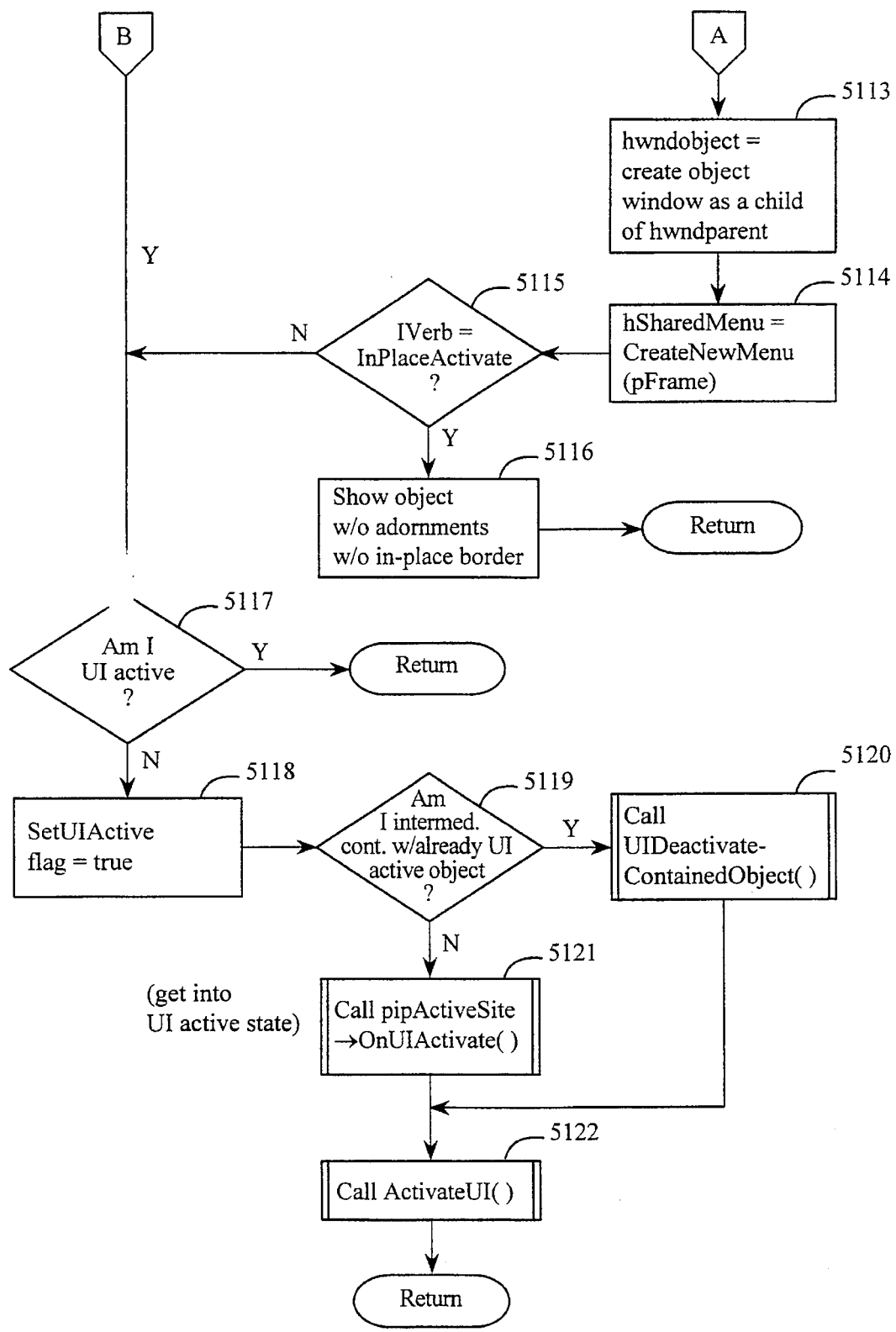

FIG. 51 is a flow diagram of a typical implementation of the DoInPlaceActivate function implemented by a server application. The function takes one parameter, an indication of an action (a verb) to perform. The function is divided into three parts. First, the function performs the actions necessary to transition the corresponding object into the in-place active state. Second, the function performs the actions necessary to transition the corresponding object into the window visible state. If the verb parameter indicates that this function has been invoked to activate an object without displaying its user interface, then the function returns at this point. Otherwise, the function continues in its third part, where it performs the actions necessary to transition the corresponding object into the UI active state.

Specifically, in steps 5101–5106, the function transitions the corresponding object into the in-place active state if the object is not already in that state. In step 5101, the function determines whether the object is already in the in-place active state and, if so, continues in step 5107, else continues in step 5102. In step 5102, the function calls the IOLEClientSite::QueryInterface method of the object's immediate container to obtain a pointer to the IOLEInPlaceParent interface of the immediate container (its in-place site). In step 5103, the function invokes the IOLEInPlaceParent::CanInPlaceActivate method to determine whether the object's immediate container application supports in-place interaction. In step 5104, if the container application supports in-place interaction, the method continues at step 5105, else returns an error. In step 5105, the function calls the IOLEInPlaceParent::OnInPlaceActivate method to enable the in-place site of the container to remember this object as being in-place active. In step 5106, the function sets a flag indicating that the object is in the in-place active state, and continues in step 5107.

In steps 5107–5116, the function transitions the corresponding object into the window visible state if the object is not already in that state. Specifically, in step 5107, the function determines whether the object is already in the window visible state and, if so, continues in step 5117, else continues at step 5108. In step 5108, the function sets a flag to indicate that the object is in the window visible state. In step 5109, the function invokes the IOLEInPlaceParent::GetWindow method in order to obtain the window handle of the immediate container object for later use in incorporating the object window hierarchy into the parent container window hierarchy. In step 5110, the function invokes the IOLEInPlaceParent::GetWindowContext method to obtain pointers to the interfaces of the top level container, the immediate container, the rectangle reserved for the object window, the clip rectangle applicable to the object, and an accelerator information structure. In step 5111, the function calculates the size of the desired object window in the parent container. In step 5112, the function determines whether the immediate container object does not support the clipping or scaling needed by the object and, if so, returns an error, else continues in step 5113. In step 5113, the function creates an object window as a child of the window handle of the immediate container object. In step 5114, the function invokes the CreateNewMenu function to create the new composite menu bar (see Code Table 2). In step 5115, the function determines whether the requested action is INPLACEACTIVATE and, if so, continues in step 5116, else continues in step 5117. The verb INPLACEACTIVATE is an indication that the object is to be placed in window visible state without transitioning it to the UI active state. In step 5116, the function displays the created object window without any adornments and without the in-place border, and returns. This step places an inside-out object into the intermediate window visible state so that it can receive user input.

In steps 5117–5122, the function transitions the corresponding object into the UI active state if the object is not already in that state. Specifically, in step 5117, the function determines whether the object is already UI active and, if so, returns, else continues in step 5118. In step 5118, the function sets a flag to indicate that the object is in the UI active state. In step 5119, the function determines whether the object is an intermediate container that contains the current UI active object somewhere in its containment hierarchy. If so, in step 5120, the function invokes the function UIDeactivateContainedObject to deactivate the object that is or contains the current UI active object, and continues in step 5122. Otherwise, the function invokes the IOLEInPlaceParent::OnUIActivate method to enable the object's immediate container application to remove its user interface resources in preparation for activation of the object as the current UI active object, and returns.

In order to support both inside-out and outside-in interaction, the process of activating an outside-in object is slightly modified from that discussed above in Section 5.1. As described in Section 5.1, activating an outside-in object is accomplished in several steps. First, the window procedure for the frame window (the top level container) of the container object is invoked by the underlying window system in response to a double click on a containee object indicating a desire to activate the object in place or in response to user selection of a menu item on a selected containee object. Second, when either a selected menu event is received or the double click is processed, the window procedure invokes the function Process_Object_Activation. (See, e.g., steps 3404, 3409, and 3411 in FIG. 34.) Third, the Process_Object_Activation function loads the data for the containee object using the object linking and embedding API function, ObjectLoad (see FIG. 28). Finally, the Process_Object_Activation function invokes the DoVerb method of the containee object to request the server application implementing the containee object to perform the selected action or to process the double click message.

Figure 52:
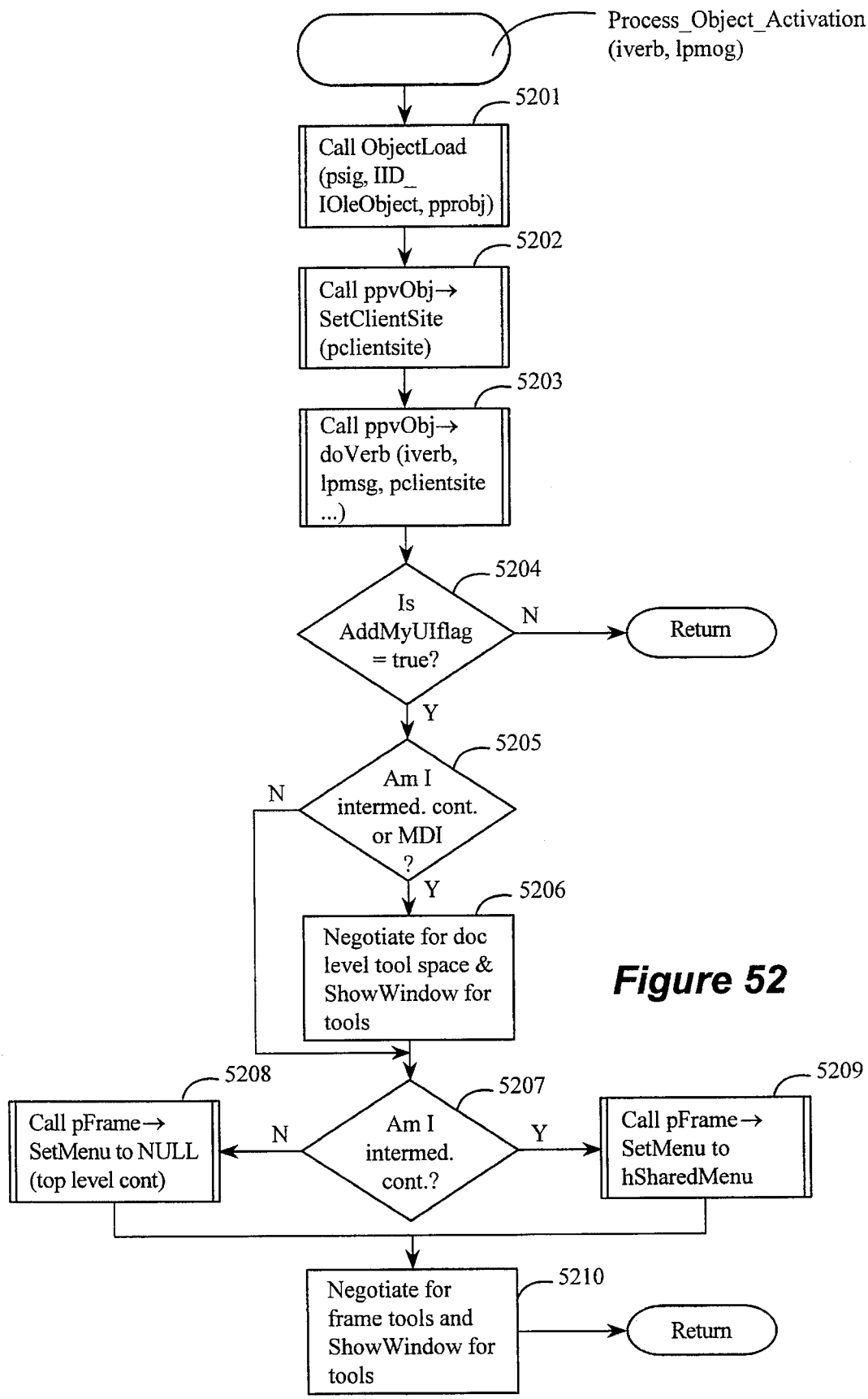
FIG. 52 is a flow diagram of a typical implementation of the Process_Object_Activation function implemented by a container application.

FIG. 52 is a flow diagram of a typical implementation of the Process_Object_Activation function implemented by a container application. The function takes two parameters: a pointer to a requested action (verb), and a pointer to the message event that caused invocation of this function. The function loads the selected object and invokes its DoVerb method to perform the requested action. In step 5201, the function invokes the object linking and embedding API function, ObjectLoad, passing it a pointer to the storage for the object and an indication that it wants a pointer to the IOLEObject interface. The ObjectLoad function returns a pointer to the IOLEObject interface of the loaded object (see FIG. 28). In step 5202, the function invokes the IOLEObject::SetClientSite method of the containee object to hand the containee object a pointer to its associated parent container interface (its "client site"). In step 5203, the function invokes the loaded object's IOLEObject::DoVerb method, passing the requested action, an indication of whether the action was selected by a double click or other window message, and the previously created IOLEClientSite interface for the object. Then, in steps 5204–5410, the function determines whether it is necessary to display the container object's user interface resources. Specifically, in step 5204, the function checks to see if the flag indicating the need to display the container object's user interface resources is true, and if so, continues in step 5205, else returns. (This flag is set in the IOLEInPlaceParent::OnUIDeactivate method.) In step 5205, the function determines whether the container is an intermediate container or an MDI window and, if so, continues in step 5206, else continues in step 5207. In step 5206, the function negotiates for any document level tool space and displays these tools. In step 5207, the function determines whether the container is an intermediate container and, if so, continues in step 5209, else continues in step 5208. In step 5209, the function displays the composite menu bar and continues in step 5210. In step 5208, the function displays the container's frame menu bar and continues in step 5210. In step 5210, the function negotiates for space for frame level tools, displays these tools, and returns.

Figure 53A:
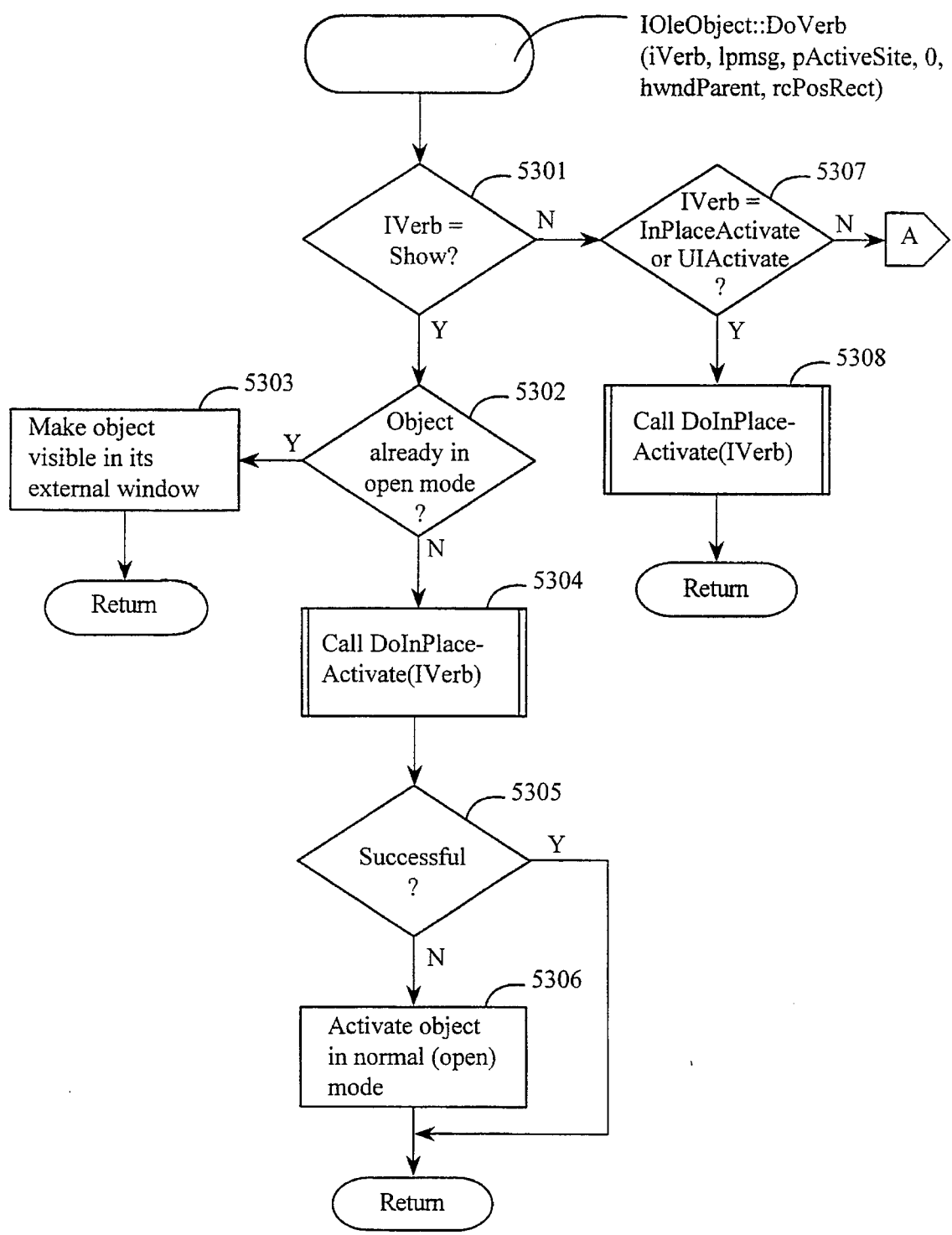
FIGS. 53A and 53B are flow diagrams of a typical implementation of the IOLEObject::DoVerb method implemented by a server application.
Figure 53B:
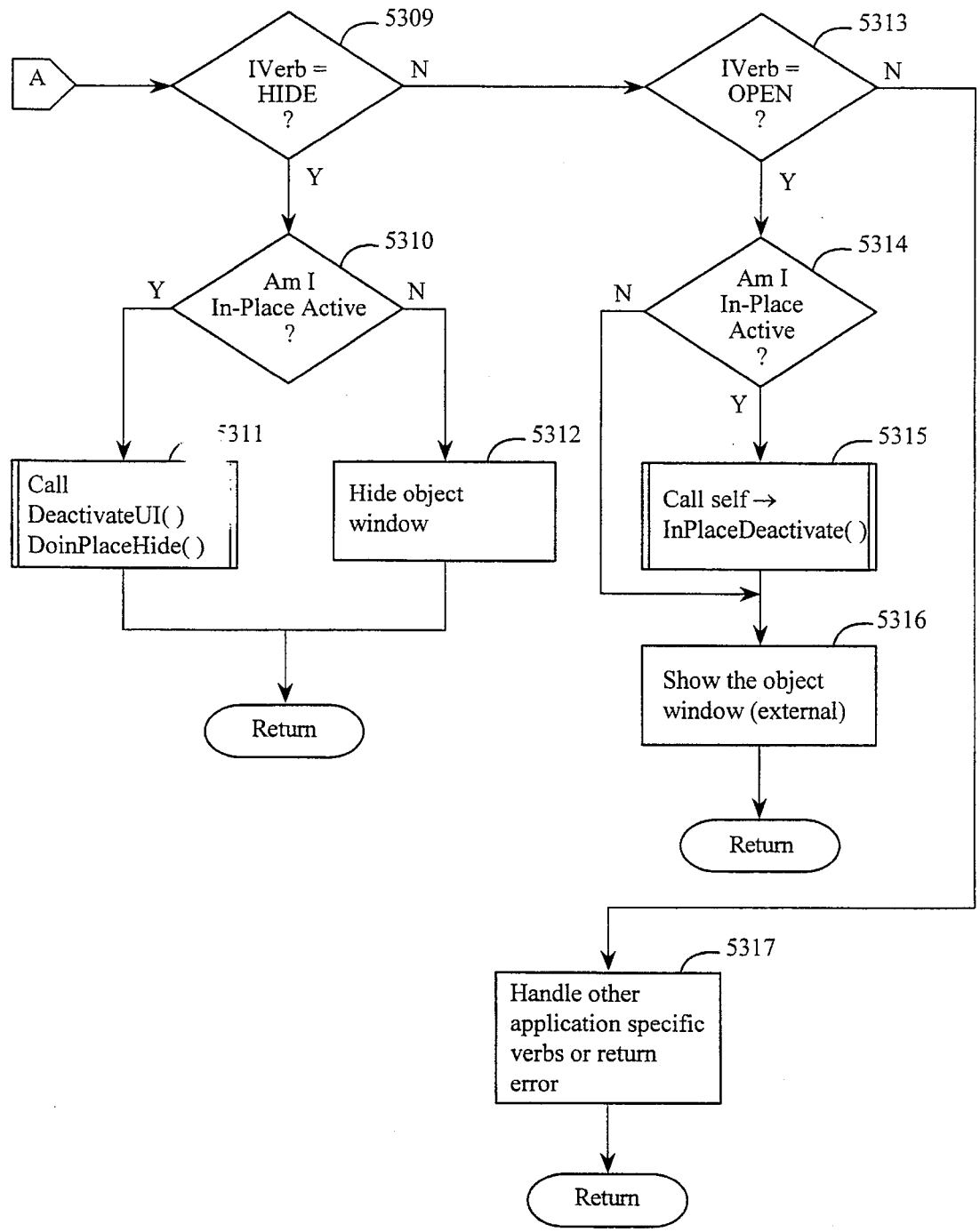

FIG. 53 is a flow diagram of a typical implementation of the IOLEObject::DoVerb method implemented by a server application. This method is the primary method for interacting with an outside-in object. It can also be invoked to request an inside-out object to transition to another activation state. However, in a preferred embodiment, once the inside-out object has been made window visible, the server application receives user input directly and does not need to invoke the DoVerb method. Instead, the server application can directly invoke the DoInPlaceActivate function (see step 3509 in FIG. 35).

The DoVerb method is a high-level routine for deciding what activation routine or deactivation routine to invoke and with what parameters. The method takes six parameters: a requested action. a pointer to the message structure received by the application window procedure when the action was requested, a pointer to the IOLEClientSite interface of the specified object, the window handle of its immediate container, a pointer to the bounding rectangle where the container object will display the specified object, and a set of flags controlling the execution of the requested action (verb).

The DoVerb method comprises four parts. In steps 5301–5306, the method processes a request to show the specified object in an external window. In steps 5307–5308, the method processes a request to put the specified object in either the in-place active state or the UI active state. In steps 5309–5312, the method processes a request to hide the specified object's resources and window. In steps 5313–5316, the method processes a request to open the specified object in an external window.

Specifically, in steps 5301–5306 the method shows the specified object in an external window. In step 5301, the method determines whether the requested action is SHOW and, if so, continues in step 5302, else continues in step 5307. In step 5302, the method determines whether the object is already in OPEN mode and, if so, continues in step 5303, else continues in step 5304. (Recall that a request to place an object in OPEN mode is an indication to put the object in its own external window and not to activate it in place.) In step 5303, the method makes the object visible in its own external window and returns. In step 5304, the method invokes the DoInPlaceActivate routine with the verb SHOW. In step 5305, the method determines whether the call to DoInPlaceActivate was successful and, if so returns, else continues in step 5306. In step 5306, the method activates the object in OPEN mode, and returns.

In steps 5307–5308, the method requests the specified object to transition to the in-place active or the UI active state. Specifically, in step 5307, the method determines whether the requested action is INPLACEACTIVATE or UIACTIVATE and, if so, continues in step 5308, else continues in step 5309. In step 5308, the method invokes the DoInPlaceActivate function with the requested action, and returns.

In steps 5309–5312, the method hides the specified object. Specifically, in step 5309, the method determines whether the requested action is HIDE and, if so, continues in step 5310, else continues in step 5313. In step 5310, the method determines whether the object is currently in the in-place active state. If so, in step 5311, the method invokes the specified object's DeactivateUI and DoInPlaceHide functions, and returns. Otherwise, in step 5312, the method hides the object window, and returns.

In steps 5313–5316, the method opens the specified object in an external window. Specifically, in step 5313, the method determines whether the requested action is OPEN and, if so, continues in step 5314, else continues in step 5317. In step 5314, the method determines whether the object is currently in the in-place active state and, if so, continues in step 5313, else continues in step 5316. In step 5315, the method invokes the object's InPlaceDeactivate method to transition the object out of all in-place interaction states so that the object can be placed in the OPEN state. In step 5316, the method makes the object visible in an external window, and returns. In step 5317, the method handles other application-specific verbs, or returns errors as appropriate, and returns.

6.4.2.1 Activating Inside-Out Objects Within a Multiple Document Interface Application When an object is activated within an MDI container application (which application by definition can interact with multiple document windows at the same time), then activation and deactivation occurs whenever the document (MDI) window containing the object is selected or deselected. The window procedure for the document window receives a special activation message from the underlying window system whenever the user selects an MDI document window (for example, by clicking in the title bar of the MDI window). The window procedure for the document window will receive a deactivation message when the user selects a different MDI document window. In response to these messages, the window procedure for the MDI document window will invoke a function (e.g., Process_Activation_Message) to perform the activation and deactivation of the document window and any activated object contained within it. This process occurs for both outside-in and inside-out objects.

Figure 54:
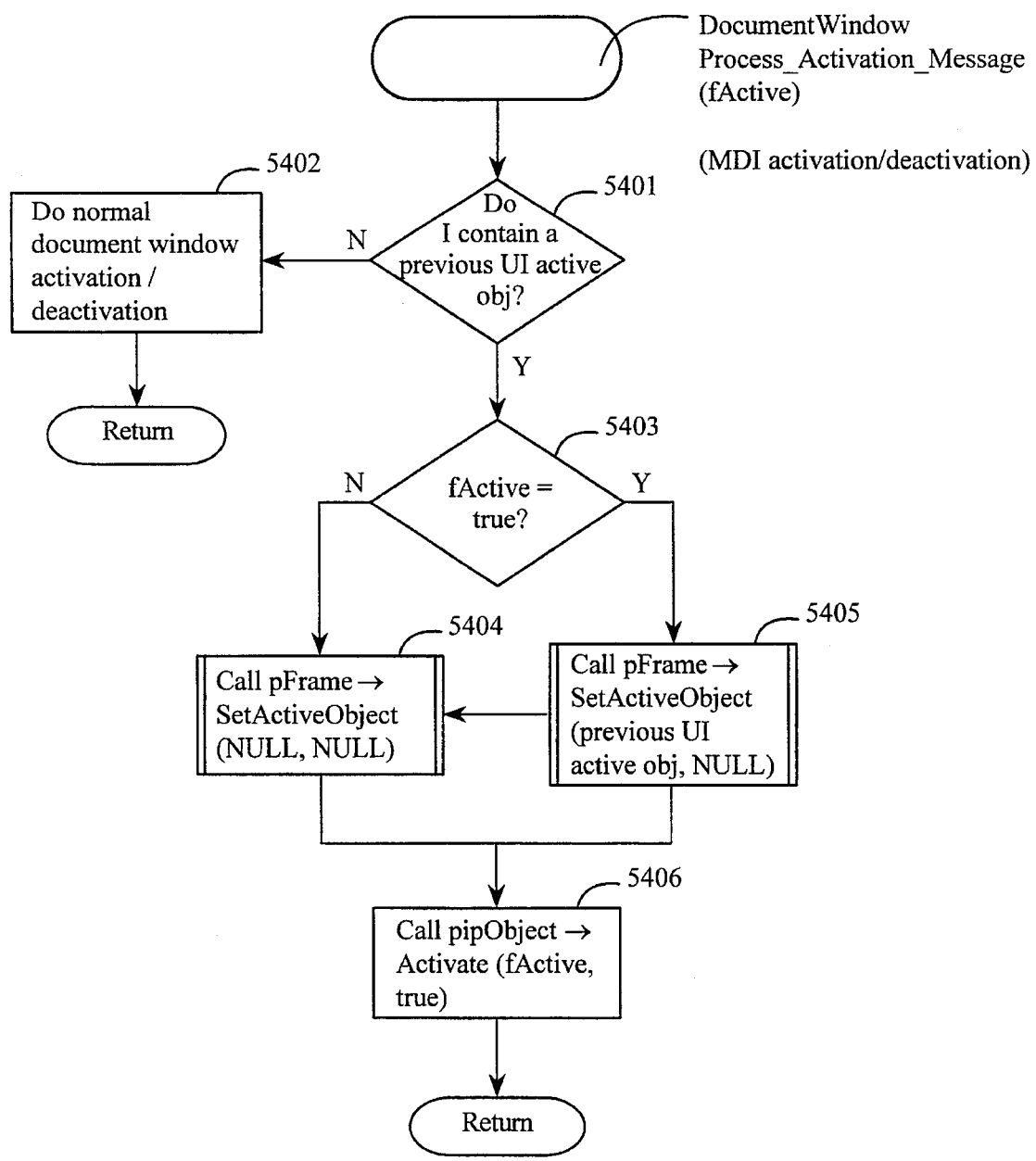
FIG. 54 is a flow diagram of a typical implementation of the Process_Activation_Message function invoked by the window procedure of an MDI document window to process MDI activation and deactivation messages.

FIG. 54 is a flow diagram of a typical implementation of the Process_Activation_Message function invoked by the window procedure of an MDI document window to process MDI activation and deactivation messages. The function determines whether the window contains an object that was previously activated in place when the MDI document window was last active. (This object was the current UI active object when the MDI document window was last selected.) If so, the function activates or deactivates that object, otherwise the function activates or deactivates the MDI document window in its normal fashion. This function is similar to FIG. 30, with the addition of two steps to inform the top level container (frame window) of the status of the contained object.

Specifically, in step 5401, the function determines whether the MDI document window contains a previously UI active object and, if so, continues in step 5403, else continues in step 5402. In step 5402, the function performs its normal activation and deactivation procedures, and returns. In step 5403, the function determines whether it should activate or deactivate the object. If activation is requested, then the function calls IOLEInPlaceFrame::SetActiveObject to notify the top level container of the new current UI active object, and continues in step 5406. Otherwise, the function invokes the IOLEInPlace- Frame::SetActiveObject with null parameters to inform the top level container that it is removing the current UI active object, and the function continues in step 5406. In step 5406, the function invokes the IOLEInPlaceActiveObject::Activate method to install or remove the object's frame level tools and composite menu bar according to the designated flag to activate or deactivate, and returns.

6.4.3 Deactivating Objects

When the user selects an area outside an inside-out object activated in place, the user interface of the object is removed, and the object is transitioned to the window visible state instead of the UI active state. In general, this behavior preferably occurs when the user clicks with a mouse button outside of the object window corresponding to the inside-out object. For example, referring to FIG. 32, when the user clicks on the drop-down list 3206, the drop-down list 3207 is deactivated and placed in the window visible state. Therefore, generally speaking, the deactivation methods of the in-place interaction API are invoked by a container or server application in response to processing a mouse button event.

For example, referring to FIG. 32, when the user clicks on the drop-down list 3206 (an inside-out object), the window procedure of the server application implementing drop-down list 3206 receives the mouse button up event. In response, the window procedure invokes the DoInPlaceActivate function of the same server application with an indication that the user wishes to activate the user interface of the object. (See steps 3503, 3507, 3508, and 3509 in FIG. 35.) In the process of transitioning the drop-down list 3206 into UI active state, the DoInPlaceActivate function invokes the OnUIActivate method of its parent container (see step 21 in FIG. 51). In FIG. 32, the parent container is implemented by the container application corresponding to budget entry form 3205. The IOLEInPlaceParent::OnUIActivate method of budget entry form 3205 determines whether it contains the current UI active object and, if it does, it then invokes the UIDeactivateContainedObject function to deactivate the contained object. (See, for example, steps 4001 and 4002 in FIG. 40.) This deactivation (the call to UIDeactivateContainedObject) will nest downwards until the object that is actually the current UI active object is deactivated in all of its nested containers. The parent container application does not need to propagate the OnUIActivate call when the parent container contains the current UI active object, because the parent container contains both the object to deactivate and the object that will next be activated.

On the other hand, if the user instead clicks on the project icon control object 3213, then a different set of steps would be executed. First, the DoInPlaceActivate function of the VAC3 project icon (3213) would invoke the OnUIActivate method of the (container) form object 3204. In doing so, because the container object window corresponding to form object 3204 does not contain the current UI active object, the OnUIActivate method of form object 3204 preferably propagates the OnUIActivate method call to its immediate container in order for drop-down list 3207 to be properly deactivated. In the illustrated example, the OnUIActivate method of form object 3204 invokes the OnUIActivate method of the top level container 3201. (See steps 4003–4009 in FIG. 40.) The top level container object IOLEInPlaceParent::OnUIActivate method determines that it does contain an object which is in UI active state and calls its UIDeactivateContainedObject routine to deactivate this contained object. In this example, the IOLEInPlaceParent::OnUIActivate method of the top level container invokes UIDeactivateContainedObject, which in turn deactivates the budget entry form 3205 and subsequently its containee object, drop-down list 3207. (See steps 4501–4503 in FIG. 45 and steps 4401–4404 in FIG. 44.)

If the user instead clicks on the top level container object 3201, then a special function (such as Process_Mouse_LButtonDown) is invoked to deactivate the drop-down list 3207. This function is invoked in response to a mouse click in the top level container regardless of the activation model of the current UI active object. Typically, this function is invoked from the container application window procedure (for example, between steps 3503 and 3508 in FIG. 35).

Figure 55:
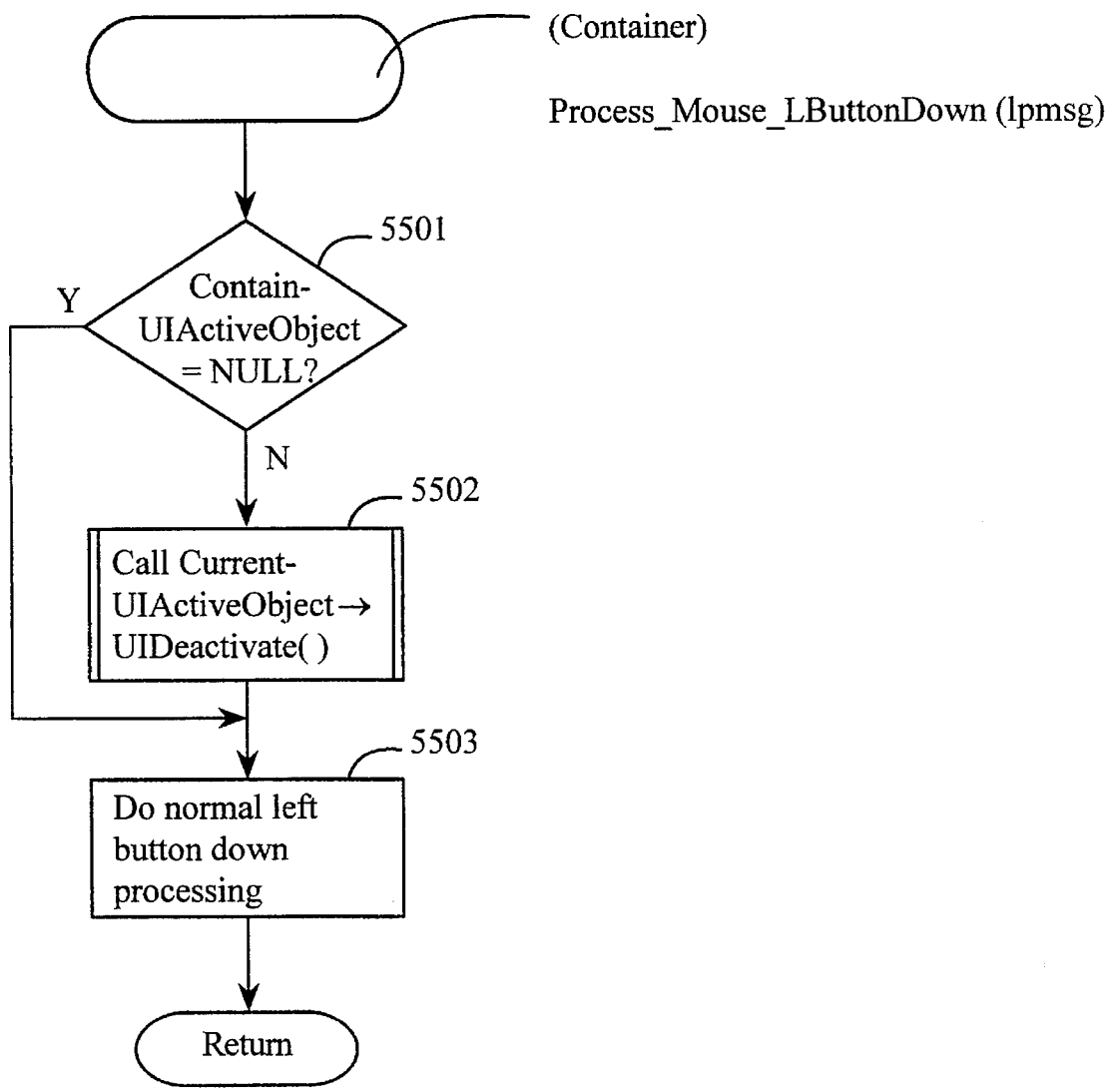
FIG. 55 is a flow diagram of a typical implementation of the Process_Mouse_LButtonDown function implemented by a container application.

FIG. 55 is a flow diagram of a typical implementation of the Process_Mouse_LButtonDown function implemented by a container application. This function processes the input event signaled by the receipt of the mouse left button down message. One skilled in the art will recognize that such a function could be invoked upon receipt of any kind of input event, and that other events can be used to select and deselect objects. This function is typically invoked by a top level container when it wishes to deactivate a contained object before activating its own user interface. This routine need not be invoked if a user activates a different containee object in place, because the top level container will have another opportunity to deactivate a previously activated object (in response to an invocation of the OnUIActivate method of the top level container from within the DoInPlaceActivate function). See step 21 in FIG. 51. Specifically, in step 5501, the function determines whether the container contains the current UI active object at some nesting level and, if so, continues at step 5503, else continues at step 5502. In step 5502, the function calls the UIDeactivate method of the contained object that is or contains the current UI active object. In step 5503, the function continues its normal left button down processing, and returns.

6.4.4 Closing the Container Application

Sometime after a container application is no longer able to perform an Undo operation (which might re-activate a previously in-place activated object), and before the container application is closed by the user, the container application preferably ensures that embedded or linked objects are placed in the running state. As part of a container object closing, the container application implementing the container object invokes the Close method on each of its embedded or linked objects. The Close method of the containee object then invokes IOLEInPlaceObject::InPlaceDeactivate to transition the specified object to its running state.

Figure 56:
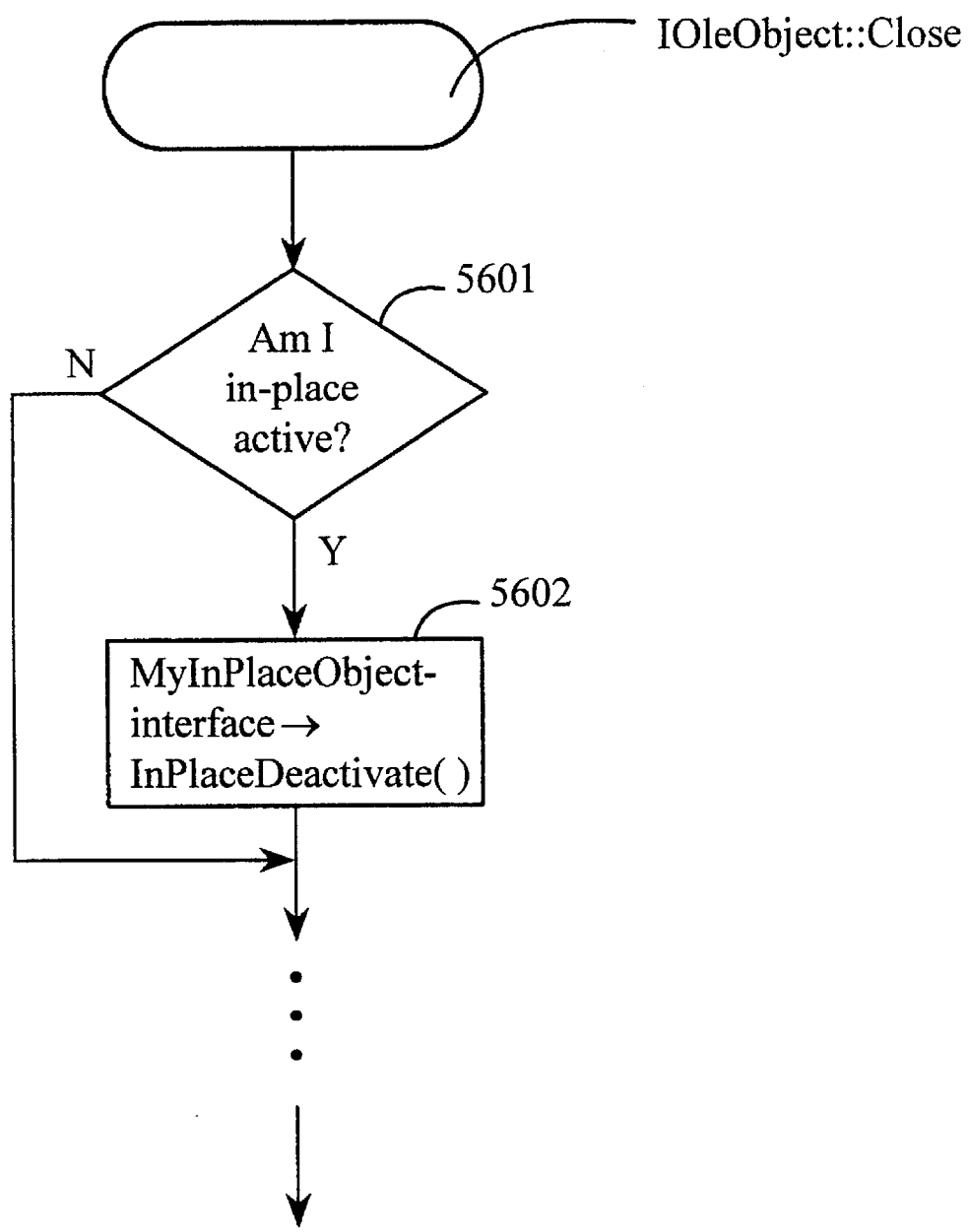
FIG. 56 is a flow diagram of a typical implementation of the IOLEObject::Close method implemented by a server application.

FIG. 56 is a flow diagram of a typical implementation of the IOLEObject::Close method implemented by a server application. As can be seen in FIG. 56, in step 5602, the containee object invokes its own IOLEInPlaceObject::InPlaceDeactivate method to transition to the running state.

Although the present invention has been described in terms of preferred embodiments, it is not intended that the invention be limited to these embodiments. Equivalent methods, structures, processes, steps, and other modifications within the spirit of the invention fall within the scope of the present invention. The scope of the present invention is defined by the claims which follow.

We claim:

1. A method in a computer system of activating a containee object contained within a container object, the computer system having an operating system fox scheduling execution of code, the container object having container application code with a container window environment with container resources for interacting with the container object, the cornsince object having server application code with server resources for interacting with the containee object, the method comprising the steps of:

executing the container application code as a separately scheduled entity of the operating system;

under control of rite separately executing container application code, displaying the container window environment; and displaying the containee object wiflfin the displayed container window enviromnent;

activating the containee object;

integrating and displaying a plurality of the server resources of the server application code with the container resources of the displayed container window enviroment, the server application code being separately schedulable by the operating system;

when a user selects a resource from among the integrated resources, determining whether to invoke the container application code or the server application code; and when the selected resource is a server resource, executing the server application code as a separately scheduled entity to process the server resource selection.

2. The method of claim 1, the container application code having container menus allocated and managed by the container application code and the server application code having server menus allocated and managed by the server application code, and wherein the step of integrating and displaying a plurality of server resources comprises the substeps of:

generating a composite menu bar; and storing a server menu and a container menu in the generated composite menu bar.

3. The method of claim 2 wherein the step of storing interleaves server menus and container menus in the composite menu bar.

4. The method of claim 2, the container window having a menu bar for displaying a plurality of menus and wherein the composite menu bar is displayed as the menu bar of the container window.

5. The method of claim 1 wherein the step of activating the containee object further comprises the steps of:

selecting the containee object; and specifying an operation to be performed on the containee object.

6. A method in a computer system of interacting with a containee object contained within a container object, the computer system having an operating system for scheduling and executing code, the container object having container application code with a container window enviromnent, the containee object having server application code with server resources for interacting with the containee object, the method comprising the steps of:

executing the container application code as a separately scheduled entity of the operating system;

displaying the container window environment, the container window environment having container resources for interacting with the container object;

activating the containee object within the container window environment;

integrating and displaying a plurality of the server resources within the container window environment, the server resources being part of the server application code, the server application code being separately schedulable by the operating system;

in response to selection of a server resource from among the integrated is server resources, invoking the server application code as a separately scheduled entity to process the server resource selection; and in response to selection of a container resource from the displayed container window environment, invoking the container application code to process the container resource selection.

7. The method of claim 6, the container application code having a window within the displayed container window environment for displaying data and further comprising the step of, under control of the server application code, negotiating with the container application code to place server resources within the window.

8. The method of claim 6 wherein the step of integrating and displaying the plurality of server resources within the container window environment is performed without the container application code knowing, in advance or at the time of displaying, what server resources are to be displayed.

9. The method of claim 6 wherein the container application code and the server application code execute as separate threads in a single computer process.

10. The method of claim 6, further comprising the step of, after integating the plurality of the server resources, displaying the containee object within the container window environment with highlighting to indicate that server resources are available for user selection.

11. The method of claim 6, the container application code having a container message handler for receiving and processing messages and the server application code having a server message handler for receiving and processing messages, the container object having a current message handler for receiving and processing messages, the current message handler initially set to the container message handler, wherein the step of integrating and displaying the plurality of server resources further comprises setting the current message handler of the container object to a special message handler that sends container resource selection messages to the container message handler when a container resource is selected and that sends server resource selection messages to the server message handler when a server resource is selected.

12. The method of claim 6, the container window environment having a window and the server application code having a server window environment with a window, and including the steps of:

designating the server window environment window as having input focus for receiving user input;

receiving a menu command from a user; and in response to receiving the menu command, designating the container window environment window as having input focus for receiving user input;

receiving a menu mnemonic; and in response to receiving the menu nmemonic, redesignating the server window environment window as having input focus for receiving user input.

13. The method of claim 12 where the container window environment window is an application frame window.

14. The method of claim 6, the computer system having a keyboard for inputting keys, the container application code having a plurality of accelerator key combinations for selecting container resources, the server application code having a plurality of accelerator key combinations for selecting server resources, and further comprising the step of, upon the container application code receiving an accelerator key combination, invoking the separately scheduled server application code to determine whether a server resource is selected.

15. A method in a computer system of interacting with a containee object contained within a container object, the computer system having an operating system for scheduling execution of code, the container object having associated container application code with a plurality of container menus, the container application code having an associated menu bar for displaying a list of menus, the containee object having associated server application code with a plurality of server menus, the method comprising the steps of:

generating a composite menu list that includes a container menu and a server menu;

displaying the composite menu list in the menu bar;

in response to selection of a displayed container menu, invoking the container application code as a separately scheduled entity of the operating system to process the selected container menu; and in response to selection of a displayed server menu, invoking the server application code as a separately scheduled entity of the operating system to process the selected server menu.

16. A method in a computer system for integrating menus from a plurality of applications executed as separately scheduled entities of an operating system, the method comprising the steps of:

executing each of the plurality of applications as a seperately scheduled entity:

specifying a set of menu groups for each executing application, each menu group having a plurality of menu items;

combining the specified menu groups from the plurality of executing applications into a composite menu;

displaying the composite menu on a display device;

selecting a menu item of a menu group of the displayed composite menu; and invoking the executing application that defines the menu group of the selected menu item.

17. The method of claim 16 wherein the plurality of separately scheduled applications includes a container application and a server application and wherein the step of displaying the composite menu displays the composite menu as a menu of the container application.

18. A computer system for activating a coatsinee object contained within a container object, the computer system having an operating system for scheduling execution of code, the container object having container application code with a container window environment with container resources for interacting with the container object file containce object having server application code with server resources for interacting with the containee object, the system comprising:

means for displaying the container window environment;

means for displaying the containee object within the displayed container window environment;

means for activating the containee object within the displayed container window environment;

means for integrating and displaying a plurality of file server resources with the container resources of the displayed container window environment;

means for determining whether to execute the container application code or the server application code when a resource is selected from among the integrated and displayed server resources; and means for executing the server application as a separately scheduled entity of the operating system when a server resource is the selected resource, and for processing the server resource selection.

19. The system of claim 18, the container application code having container menus allocated and managed by the container application code and the server application code having server menus allocated and managed by the server application code, and wherein the integrating and displaying means includes means for generating a composite menu bar and storing a server menu and a container menu within the composite menu bar.

20. The system of claim 19 wherein the generating and storing means includes means for interleaving server menus and container menus in the composite menu bar.

21. The method of claim 19 wherein the container window environment has a menu bar that displays a plurality of menus and wherein the composite menu bar is displayed as the menu bar of the container window environment.

22. The system of claim 18 wherein the means for activating selects the containee object and specified an operation to be performed on the containee object.

23. A computer system for interacting with a containee object contained within a container object, the computer system having an operating system for scheduling execution of code, the container object having container application code with a container window environment, the containee object having server application code with server resources for interacting with the containee object, the system comprising:

means for executin the container application code as a separate scheduled entity of the operating system:

means for displaying the container window environment on a display device, the container windown environment having container resources for interacting with the container object;

means for activating the containee object within the displayed container window environment;

means for integrating and displaying a plurality of the server resources of the server application code within the container window enviromnent when the containee object is activated;

means for selecting a server resource from among the integrated and displayed server resources;

means for executing the server application as a separate scheduled entity of the operating system and for invoking the executing server application to process the server resource selection when a server resource is selected;

means for selecting a container resource from among the integrated and displayed server resources; and means for invoking the executing container application code to process the container resource selection when a container resource is selected.

24. The system of claim 23, the container application code having a window within the container window environment for displaying data and wherein the integrating and displaying means includes means for negotiating with the container application code to place server resources within the window.

25. The system of claim 23, wherein the means for integrating and displaying the plurality of the server resources within the container window environment is accomplished without the container application code knowing, in advance or at the time of displaying, what server resources are to be displayed.

26. The system of claim 23 wherein the container application code and the server application code execute as separate threads in a single computer process.

27. The system of claim 23, further comprising means for displaying the containee object within the container window environment with highlighting to indicate that server resources are available for user selection.

28. The system of claim 23, the computer system including a keyboard for inputting keys, the container application code having a plurality of accelerator key combinations for selecting container resources, the server application code having a plurality of accelerator key combinations for selecting server resources, and including means for invoking the server application code as a separate executed entity to determine if a server resource is selected upon receiving an accelerator key combination.

29. A method in a computer system for activating a containee object contained within a container object, the computer system having an operating system for scheduling execution of code and having a window system for displaying windows and for receiving user input, the computer system having an indicator for choosing an object, the container object having container application code with a container window environment with container resources for interacting with the container object, the containee object having server application code wih server resources for interacting with the containee object, the method comprising the computer-implemented steps of:

to executing the container application code as a separately scheduled entity of the operating system;

displaying fire container window environment;

executing the server application code as a separately scheduled entity of the operating system;

displaying the containee object integrated within the displayed container window environment;

in response to a user mnoving the indicator over the displayed containee object, under control of the window system, generating an input event ands, under control of the window system, sending notification of the input event directly to the executing server application code; and in response to indicating an action to perform on the containee object, integrating the server resources of axe setvet application code into container resources of the displayed container window environment such that, when a user selects a server resource from amongst the integrated server resources, the executing server application code processes the server resource selection.

30. The method of claim 29, wherein the indicator is controlled by a computer morose, and wherein the step of integrating the server resources of the server application code occurs in response to a mouse button up event.

31. A method in a coinpater system for interacting with a non-native data object, the computer system having an operating system for scheduling execution of code and having a window system for displaying windows and for receiving user input and having an indicator for choosing a data object, the computer system having a container object for containing the non-native data object and for containing a native data object, the container object having container application code with a container window envirnment for interacting with the container object and the native data object, the non-native data object having server application code for interacting with the non-native data object, the method comprising the computer-implemented steps of:

executing the container application code and the server application code as two separately scheduled entities of the operating system;

displaying the container window environment;

displaying the native data object integrated within the displayed is container window environment;

displaying the non-native data object integrated within tile displayed container window environment wherein, from the perspective of a user, initiating interaction with the non-native data object is substantially similar to initiating interaction with the native data object;

in response to the user moving the indicator over the displayed native data object, under control of the window system, generating a first input event and, under control of the window system sending tile first input event directly to the executing nontamer application code; and in response to the user moving the indicator over the displayed non-native data object, under control of the window system, generating a second input event and, under control of the window system, sending notification of the second input event directly to the executing server application code.

32. The method of claim 30, wherein the server application code has user interface resources for interacting with the non-native data object, and wherein the method further comprises the step of, in response to indicating an action to perform on the non-native data object, integrating the user interface resources of the server application code into the displayed container window environment such that, when a user selects a user interface resource, the scheduled and executing server application code processes the user intexface resource selection.

33. The method of claim 32, wherein the indicator is controlled by a computer mouse, and wherein the step of integrating the user interface resources of the server application code occurs in response to a single mouse click.

34. The method of claim 32, wherein the container application code has user interface resources for interacting with the native data object, and wherein the method further comprises the steps of:

in response to indicating an action to perform on the native data object, removing the integrated user interface resources of the executing server application code from the displayed container window environment; and after removing the integrated user interface resources of the server application code, displaying the user interface resources of the executing container application code.

35. The method of claim 34, wherein the method further comprises the step of, after displaying the user interface resources of the separately scheduled and executing container application code, in response to indicating an action to perform on the non-native data object, generating a third input event and sending the third input event directly to the separately scheduled and executing server application code.

36. A method in a computer system for interacting with a containee object contained within a container object, the computer system having an operating system for scheduling execution of code and having a window system for displaying windows and for receiving user input and having an indicator for choosing an object, the container object having container application code with a container window environment with container resources for interacting with the container object, the containee object having server application code with server resources for interacting with the containee object, the method comprising the computer-implemented steps of:

executing the container application code as a separately scheduled entity of the operating system;

displaying the container window environment;

executing tim server application code as a separately scheduled entity of the operating system;

displaying the containee object integrated within the displayed container window environment;

in response to a user moving the indicator over the displayed containee object, under control of the window system, generating an input event and, under control of the window system, sending notification of the input event directly to the separately scheduled and executing server application code;

in response to indicating an action to perform on rite containee object, integrating the server resources of the server application code into the container resources of the displayed container window environment, wherein, when a user selects a server resource from amongst the integrated server resources, the separately scheduled and executing server application processes the server resource selection; and in response to indicating an action to perform on the container object, removing the integrated server resources from being integrated inlo the container resources of the displayed container window environment.

37. A method in a computer system for activating a plurality of containee objects within a container object, the computer system having an operating system for scheduling execution of code and having a window system for displaying windows and for receiving user input, the computer system having an indicator for choosing an object, the container object having container application code with a container window environment for interacting with the container object, each of the phrality of containee objects having server application code for interacting with the containee object, the method comprising the computer-implemented steps of:

executing the container application code as a separately scheduled entity of the operating system;

displaying the container window enviromnent;

displaying a first containee object integrated within the displayed container window environment;

displaying a second containee object within the displayed container window environment;

executing the server application code of the first containee object as a separately scheduled entity;

in response to a user moving the indicator over the displayed first containee object, under control of the window system, generating a first input event and, under control of the windows system, sending notification of the first input event directly to the executing server application code of the first containee object;

executing the server application code of the second containee object as a separately scheduled entity; and in response to a user moving the indicator over axe displayed second containee object, under control of the window system, generating a second input event and, under control of the window system, sending notification of the second input event directly to the executing server application code of the second containee object.

38. The method of claim 37, wherein each of the plurality of containee objects has user interface resources for interacting with the containee object, and wherein the method further comprises the steps of:

in response to indicating an action to perform on the first containee object, integrating the user interface resources of the first containee object into the displayed container window environment;

in response to indicating an action to perform on the second containee object, removing the integrated user interface resources of the first containee object from the displayed container window environment; and after removing the integrated user interface resources of the first containee object, integrating the user interface resources of the second containee object into the displayed container window environment.

39. The method of claim 38, further comprising the steps of:

after integrating the user interface resources of the first containee object, displaying the integrated user interface resources; and after integrating the user interface resources of the second containee object, displaying the integrated user interface resources.

40. A method in a computer system for activating an inside-out activation style containee object within a container object, the container object having container application code that manages a container window environment with container resources, the inside-out activation style containee object having an inside-out window for receiving user input-and having server application code for interacting with the containee object, the server application code having user interface resources for interacting with the containee object, the computer system having an indicator for choosing an object, having an operating system for scheduling execution of code, and having a window system for displaying windows and for receiving user input, the method comprising the computer-implemented steps of:

executing the container application code as a separate executable entity of the operating system;

displaying the container window environment;

displaying the inside-out activation style containee object integrated within the container window enviromnent, wherein the inside-out window is displayed;

in response to a user moving the indicator over the displayed inside-out window, cxecutixtg the server application code as a separate executable entity of the operating system and, under control of the window system, generating an input event and sending notification of the input event directly to the separately executing server application code;

in response to selecting the displayed inside-out window, integrating the user interface resources of the server application code into the container resources of the container window environment; and in response to selecting a user interface resource of the server application code from amongst the integrated user interface resources, under control of the separately executing the server application code processing the selected user interface resource.

41. A method in a computer system for activating an inside-out activation style containee object and an outside-in activation style containee object within a container object, the container object having a container window environment, the inside-out activation style containce objcct having an inside-out window for receiving user input and having corresponding server application code for interacting with the containee object, the outside-in activation style containee object having an outside-in window for receiving user input and having corresponding server application code for interacting with the containce object, each server application code having user interface resources for interacting with the corresponding containee object, the cornpurer system having an indicator for choosing an object, having an operating system for scheduling execution of code, and having a window system for displaying windows and for receiving user input, the method comprising the computer-implemented steps of:

executing the container application code as a separate executable entity of the operating system;

displaying the container window environment;

displaying the inside-out activation style containee object integrated within the container window environment, wherein the inside-out window is displayed;

displaying the outside-in activation sWle containee object integrated within the container window environment without displaying the outside-in window;

upon selection of the outside-in activation style containee object, displaying the outside-in window;

executing the server application code of the outside-in activation style containee object as a separate executable entity of the operating system;

executing the server application code of the inside-out activation style containee object as a separate executable entity of the operating system;

in response to a user moving the indicator over the displayed outside-in window, under control of the window system, generating a first input event and sending notification of the first input event directly to the separately executing server application code corresponding to the outside-in activation style containee object; and in response to a user moving the indicator over the displayed inside-out window, under control of the window system, generating a second input event and sending notification of the second input event directly to the separately executing server application code corresponding to the inside-out activation style containee object.

42. The method of claim 41, the method further comprising the step of, after displaying the outside-in window, upon selection of an object other than the outside-in activation style containee object, removing the outside-in window from the display.

43. A computer system for activating a containee object contained within a container object, the container object having container application code with a container window for interacting with the container object, the containee object having server application code with user interface resources for interacting with the containee object, the computer system comprising:

an indicator for choosing an object;

an operating systems for starting execution of the container application code as a separately schedduled entity and for starting execution of the server application code as a separately scheduled entity;

a window system that displays axe container window environment and that displays the eontainee object integrated within the displayed container window environment;

an input event generating mid handling mechanism, flint in response to moving the indicator over the displayed containee object, generates an input event, directs the operating system to start execution of the container application code and the server application code, and sends notification of the input event directly to the executing server application code; and a resource integration mechanism, that in response to indicating an action to perform on the coatsince object, integrates the user interface resources of the server application code into the displayed container window environment such that, when a user selects a user interface resource from amongst the integrarod user interface resource, the separately scheduled and executing server application code processes the user interface resource selection.

44. The computer system of claim 43, wherein the indicator is controlled by a computer mouse, and wherein the resource integration mechanism is responsive to a mouse button up event.

45. A computer system for interacting with a non-native data object and a native data object, the non-native data object having server application code for interacting with the non-native data object, the computer system comprising:

a container object that contains the non-native data object and contains the native data object, the eontainer object having container application code with a container window environment for interacting with the container object and the native data object;

an indicator for choosing an object;

an operating system for starting execution of the container application code and the server application code as separate executable entities, each separate executable entity being a process or a thread;

a window system that displays the container window environment, that displays the native data object integrated within the displayed container window environment, and that displays file non-native data object integrated within the displayed container window environment such that, from the perspective of a user, initiating interaction with the non-native data object is substantially similar to initiating interaction with the nativc data object even though the native data object and the non-native data object are managed by two separately executing application code entities;

an input event generating and handling mechtanism, that in response to moving the indicator over the displayed native data object, generates a first input event and sends notification of the first input event directly to the separately executing container application code; and an input event generating and handling mechanism, that in response to moving the indicator over the displayed non-native data object generates a second input event and sends notification of the second input event directly to the separately executing server application code.

46. The computer system of claim 45, wherein the server application code has user interface resources for interacting with the non-native data object, the system further including a resource integration mechanism, that in response to indicating an action to perform on the containee object, integrates the user interface resources of the server application code, into the displayed container window environment such that when a user selects a user interface resource from amongst the integrated user interface resources, the separately executing server application code processes the user interface resource selection.

47. A method in a computer system of activating a containee object contained within a container object, the container object having a container application with a container window environment, the container window environment having container resources for interacting with the container object, the containee object having a server application with server resources for interacting with the containee object, the method comprising the steps of:

executing the container application as a separate executable entity of an operating system;

under control of the container application,
   displaying the container window environment;
   displaying the containee object integrated within the displayed container window environment;
   selecting the containee object; and
   in response to selecting the containee object, executing the server application as a separate executable entity of the operating system;

under control of the separately executing server application,
   indicating the server resources to the container application;

under control of the container application,
   integrating the indicated server resources within the displayed container window environment; and
   in response to selection of a server resource front the integrated server resources, sending to the separately executing server application all indication that the server resource is selected; and under control of the server application, performing a behavior associated with the selected server resource.

48. A method in a computer system of activating a containee object contained witfin a container object, the computer system having an operating system for scheduling and executing code, the container object having container application code implemented as a separately schedulable and executable application program and having a container window environment with container resources, the containee object having associated server application code implemented as a loadable code module which is loadable into a memory address space of a separately schedulable and executable application program, the server application code having server resources for interacting with the containee object, the containee object having a class identifier for identifying tile server application code, the method comprising the computer implemented steps of:

executing the container application code as a separately scheduled program with a memory address space;

displaying the container window enviromnent;

displaying the containee object integrated within the displayed container window enviromnent;

selecting the containee object;

in response to selection of the containee object,
   determining the class identifier of the containee object;
   based upon the determined class identifier, determining from a persistent registry the associated server application code;
   loading the determined server application code into the memory address space of the container application code;
   under control of the loaded server application code, determining a plurality of server resources; and
   integrating and displaying the plurality of the server resources of the loaded server application code into the container resources of the displayed container window environment, without the container application code knowing what server resources are being integrated and displayed; and in response to selection of a scarer resource from among the integrated and displayed server resources, executing the server application code to process the server resource selection.

* * * * *

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 66, claim 1, line 7, following "the", please delete "cornsince" and insert --containee--.

In column 67, claim 1, line 5, following "of", please delete "rite" and insert --the--.

In column 67, claim 1, line 8, following "object", please delete "wiflfin" and insert --within--.

In column 67, claim 1, line 9, following "window", please delete "enviromnent" and insert --environment--.

In column 67, claim 1, line 14, please delete "enviroment" and insert --environment--.

In column 67, claim 6, line 5, following "window", please delete "enviromnent" and insert --environment--.

In column 67, claim 6, line 22, following "integrated", please delete "is".

In column 69, claim 18, line 1, following "a", please delete "coatsinee" and insert --containee--.

In column 69, claim 18, lines 6 and 7, following "object", please delete "file containce" and insert -- , the containee--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 69, claim 18, line 14, following "window", please delete "enviromnent" and insert -- environment--.

In column 69, claim 18, line 15, following "of", please delete "file" and insert --the--.

In column 70, claim 23, line 9, following "for", please delete "executin" and insert --executing--

In column 70, claim 23, line 12, following "container", please delete "windown" and insert -- window--.

In column 71, claim 29, line 13, please delete "to".

In column 71, claim 29, line 15, following "displaying", please delete "fire" and insert --the--.

In column 71, claim 29, line 20, following "user", please delete "mnoving" and insert --moving--

In column 71, claim 29, line 22, following "event", please delete "ands" and insert --and--.

In column 71, claim 29, lines 27 and 28, following "of", please delete "axe setvet" and insert -- the server--.

In column 71, claim 30, line 2, following "computer", please delete "morose" and insert -- mouse--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 71, claim 31, line 1, following "a', please delete "coinpater" and insert --computer--.

In column 71, claim 31, line 9, following "window", please delete "envirnment" and insert --environment--.

In column 72, claim 31, line 2, following "displayed", please delete "is".

In column 72, claim 31, line 3, following "within", please delete "tile" and insert --the--.

In column 72, claim 31, line 11, following "system" please insert --,--.

In column 72, claim 31, line 11, following "sending", please delete "tile" and insert --the--.

In column 72, claim 31, line 12, following "executing", please delete "nontamer" and insert --container--.

In column 72, claim 32, line 1, following "claim", please delete "30" and insert --31--.

In column 72, claim 32, line 8, following "the" please insert --separately--.

In column 72, claim 32, line 9, following "user", please delete "intexface" and insert --interface--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 73, claim 36, line 12, following "on", please delete "rite" and insert --the--.

In column 73, claim 37, line 9, following "the", please delete "phrality" and insert --plurality--.

In column 73, claim 37, line 18, following "object", please insert --integrated--.

In column 73, claim 37, line 25, following "the", please delete "windows" and insert --window--.

In column 73, claim 37, line 30, following "over", please delete "axe" and insert --the--.

In column 73, claim 38, line 6, please delete "eontainee" and insert --containee--.

In column 74, claim 40, line 19, following "window", please delete "enviromnent" and insert --environment--.

In column 74, claim 40, line 22, following "window", please delete "enviromnent" and insert --environment--.

In column 74, claim 40, line 22, following "window", please delete "cxecutixtg" and insert executing--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 75, claim 41, line 2, following "the", please delete "cornpurer" and insert --computer--.

In column 75, claim 41, line 14, following "activation", please delete "sWle" and insert --style--.

In column 75, claim 43, line 10, following "separately", please delete "schedduled" and insert --scheduled--.

In column 75, claim 43, line 13, following "displays", please delete "axe" and insert --the--.

In column 75, claim 43, line 14, following "the", please delete "eontainee" and insert --containee--.

In column 75, claim 43, line 17, following "generating", please delete "mid" and insert --and--.

In column 75, claim 43, line 17, following "mechanism", please delete "flint" and insert --that--.

In column 76, claim 43, line 2, following "the", please delete "coatsince" and insert --containee--.

In column 76, claim 43, line 6, following "the", please delete "integrarod" and insert --integrated--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges, Barry B. MacKicchan, Richard McDaniel, Rao V. Remala and Antony S. Williams It is certified that error appears in the above-indentified patent and that said Letters Patent is hereby corrected as shown below:

In column 76, claim 45, line 6, following "the", please delete "eontainer" and insert --container--.

In column 76, claim 45, line 18, following "displays", please delete "file" and insert --the--.

In column 76, claim 46, line 7, following "code", please delete ",".

In column 77, claim 47, line 18, following "resource", please delete "front" and insert --from--.

In column 77, claim 48, line 2, following "contained", please delete "witfin" and insert --within--.

UNITED STATES PATENT AND TRADEMARK OFFICE
CERTIFICATE OF CORRECTION

PATENT NO. : 5,613,058
DATED : March 18, 1997
INVENTOR(S) : Srinivasa R. Koppolu, C. Douglas Hodges,
Barry B. Mackicchan, Richard McDaniel,,
Rao V. Remala, and Antony S. Williams It is certified that error appears in the above-indentified patent and that said Letters Patent is hereby corrected as shown below:

In column 78, claim 48, line 4, following "identifying", please delete "tile" and insert --the--.

In column 78, claim 48, line 8, following "window", please delete "enviromnent" and insert --environment--.

In column 78, claim 48, line 10, following "window", please delete "enviromnent" and insert --environment--.

Signed and Sealed this

Fourteenth Day of October, 1997

Attest:

BRUCE LEHMAN

Attesting Officer

Commissioner of Patents and Trademarks